(12) United States Patent
Yoscovich et al.

(10) Patent No.: US 10,886,832 B2
(45) Date of Patent: Jan. 5, 2021

(54) MULTI-LEVEL INVERTER

(71) Applicant: Solaredge Technologies Ltd., Herzeliya (IL)

(72) Inventors: Ilan Yoscovich, Ramat Gan (IL); Tzachi Glovinsky, Petach Tikva (IL); Guy Sella, Bitan Aharon (IL); Yoav Galin, Raanana (IL)

(73) Assignee: Solaredge Technologies Ltd., Herzeliya (IL)

(*) Notice: Subject to any disclaimer, the term of this patent is extended or adjusted under 35 U.S.C. 154(b) by 0 days.

(21) Appl. No.: 16/870,025

(22) Filed: May 8, 2020

(65) Prior Publication Data

US 2020/0266698 A1    Aug. 20, 2020

Related U.S. Application Data

(63) Continuation of application No. 16/442,214, filed on Jun. 14, 2019, now Pat. No. 10,700,588, which is a
(Continued)

(51) Int. Cl.
| | | |
|---|---|---|
| *H02M 1/08* | (2006.01) | |
| *H02M 7/537* | (2006.01) | |
| *H02M 1/12* | (2006.01) | |
| *H02M 7/483* | (2007.01) | |
| *H02M 1/14* | (2006.01) | |
| *H02M 1/00* | (2006.01) | |

(52) U.S. Cl.
CPC ............ *H02M 1/08* (2013.01); *H02M 1/126* (2013.01); *H02M 1/143* (2013.01); *H02M 7/483* (2013.01); *H02M 7/537* (2013.01); *H02M 2001/0054* (2013.01); *H02M 2007/4835* (2013.01)

(58) Field of Classification Search
CPC ......... H02M 1/088; H02M 2007/4835; H02M 7/487; H02M 7/483
See application file for complete search history.

(56) References Cited

U.S. PATENT DOCUMENTS

| 2,367,925 A | 1/1945 | Brown |
| 2,758,219 A | 8/1956 | Miller |
(Continued)

FOREIGN PATENT DOCUMENTS

| AU | 2073800 A | 9/2000 |
| AU | 2005262278 A1 | 1/2006 |
(Continued)

OTHER PUBLICATIONS

Yeong-Chau Kuo et al., "Novel Maximum-Power-Point-Tracking Controller for Photovoltaic Energy Conversion System", IEEE Transactions on Industrial Electronics, vol. 48, No. 3, Jun. 2001.
(Continued)

*Primary Examiner* — Kyle J Moody
*Assistant Examiner* — Lakaisha Jackson
(74) *Attorney, Agent, or Firm* — Banner & Witcoff, Ltd.

(57) ABSTRACT

A multi-level inverter having one or more banks, each bank containing a plurality of low voltage MOSFET transistors. A processor configured to switch the plurality of low voltage MOSFET transistors in each bank to switch at multiple times during each cycle.

27 Claims, 46 Drawing Sheets

Related U.S. Application Data continuation of application No. 15/054,647, filed on Feb. 26, 2016, now Pat. No. 10,404,154, which is a continuation of application No. 14/485,682, filed on Sep. 13, 2014, now Pat. No. 9,318,974.

(60) Provisional application No. 61/970,788, filed on Mar. 26, 2014.

(56) References Cited

U.S. PATENT DOCUMENTS

| | | |
|---|---|---|
| 2,852,721 A | 9/1958 | Harders et al. |
| 3,369,210 A | 2/1968 | Manickella |
| 3,392,326 A | 7/1968 | Lamberton |
| 3,496,029 A | 2/1970 | King et al. |
| 3,566,143 A | 2/1971 | Paine et al. |
| 3,581,212 A | 5/1971 | McMurray |
| 3,596,229 A | 7/1971 | Hohorst |
| 3,657,657 A | 4/1972 | Jefferson |
| 3,696,286 A | 10/1972 | Ule |
| 3,867,643 A | 2/1975 | Baker et al. |
| 3,958,136 A | 5/1976 | Schroeder |
| 4,060,757 A | 11/1977 | McMurray |
| 4,101,816 A | 7/1978 | Shepter |
| 4,104,687 A | 8/1978 | Zulaski |
| 4,129,788 A | 12/1978 | Chavannes |
| 4,146,785 A | 3/1979 | Neale |
| 4,161,771 A | 7/1979 | Bates |
| 4,170,735 A | 10/1979 | Codina et al. |
| 4,171,861 A | 10/1979 | Hohorst |
| 4,183,079 A | 1/1980 | Wachi |
| 4,257,087 A | 3/1981 | Cuk |
| 4,270,163 A | 5/1981 | Baker |
| 4,296,461 A | 10/1981 | Mallory et al. |
| 4,321,581 A | 3/1982 | Tappeiner et al. |
| 4,327,318 A | 4/1982 | Kwon et al. |
| 4,336,613 A | 6/1982 | Hewes |
| 4,346,341 A | 8/1982 | Blackburn et al. |
| 4,356,542 A | 10/1982 | Bruckner et al. |
| 4,363,040 A | 12/1982 | Inose |
| 4,367,557 A | 1/1983 | Stern et al. |
| 4,375,662 A | 3/1983 | Baker |
| 4,382,382 A | 5/1983 | Wang |
| 4,384,321 A | 5/1983 | Rippel |
| 4,394,607 A | 7/1983 | Lemirande |
| 4,404,472 A | 9/1983 | Steigerwald |
| 4,405,977 A | 9/1983 | Bhagwat et al. |
| 4,412,142 A | 10/1983 | Ragonese et al. |
| 4,452,867 A | 6/1984 | Conforti |
| 4,453,207 A | 6/1984 | Paul |
| 4,458,204 A | 7/1984 | Weber |
| 4,460,232 A | 7/1984 | Sotolongo |
| 4,470,213 A | 9/1984 | Thompson |
| 4,479,175 A | 10/1984 | Gille et al. |
| 4,481,654 A | 11/1984 | Daniels et al. |
| 4,488,136 A | 12/1984 | Hansen et al. |
| 4,526,553 A | 7/1985 | Guerrero |
| 4,545,997 A | 10/1985 | Wong et al. |
| 4,549,254 A | 10/1985 | Kissel |
| 4,554,502 A | 11/1985 | Rohatyn |
| 4,554,515 A | 11/1985 | Burson et al. |
| 4,564,895 A | 1/1986 | Glennon |
| 4,574,250 A | 3/1986 | Senderowicz |
| 4,580,090 A | 4/1986 | Bailey et al. |
| 4,591,965 A | 5/1986 | Dickerson |
| 4,598,330 A | 7/1986 | Woodworth |
| 4,602,322 A | 7/1986 | Merrick |
| 4,604,567 A | 8/1986 | Chetty |
| 4,608,686 A | 8/1986 | Barsellotti |
| 4,623,753 A | 11/1986 | Feldman et al. |
| 4,626,983 A | 12/1986 | Harada et al. |
| 4,631,565 A | 12/1986 | Tihanyi |
| 4,637,677 A | 1/1987 | Barkus |
| 4,639,844 A | 1/1987 | Gallios et al. |
| 4,641,042 A | 2/1987 | Miyazawa |
| 4,641,079 A | 2/1987 | Kato et al. |
| 4,644,458 A | 2/1987 | Harafuji et al. |
| 4,649,334 A | 3/1987 | Nakajima |
| 4,652,770 A | 3/1987 | Kumano |
| 4,670,828 A | 6/1987 | Shekhawat et al. |
| 4,683,529 A | 7/1987 | Bucher, II |
| 4,685,040 A | 8/1987 | Steigerwald et al. |
| 4,686,617 A | 8/1987 | Colton |
| 4,706,181 A | 11/1987 | Mercer |
| 4,719,553 A | 1/1988 | Hinckley |
| 4,720,667 A | 1/1988 | Lee et al. |
| 4,720,668 A | 1/1988 | Lee et al. |
| 4,736,151 A | 4/1988 | Dishner |
| 4,772,994 A | 9/1988 | Harada et al. |
| 4,783,728 A | 11/1988 | Hoffman |
| 4,816,736 A | 3/1989 | Dougherty et al. |
| 4,819,121 A | 4/1989 | Saito et al. |
| RE33,057 E | 9/1989 | Clegg et al. |
| 4,864,213 A | 9/1989 | Kido |
| 4,868,379 A | 9/1989 | West |
| 4,873,480 A | 10/1989 | Lafferty |
| 4,888,063 A | 12/1989 | Powell |
| 4,888,702 A | 12/1989 | Gerken et al. |
| 4,899,269 A | 2/1990 | Rouzies |
| 4,903,851 A | 2/1990 | Slough |
| 4,906,859 A | 3/1990 | Kobayashi et al. |
| 4,910,518 A | 3/1990 | Kim et al. |
| 4,928,056 A | 5/1990 | Pease |
| 4,947,100 A | 8/1990 | Dhyanchand et al. |
| 4,951,117 A | 8/1990 | Kasai |
| 4,978,870 A | 12/1990 | Chen et al. |
| 4,987,360 A | 1/1991 | Thompson |
| 5,001,415 A | 3/1991 | Watkinson |
| 5,013,990 A | 5/1991 | Weber |
| 5,027,051 A | 6/1991 | Lafferty |
| 5,027,059 A | 6/1991 | de Montgolfier et al. |
| 5,045,988 A | 9/1991 | Gritter et al. |
| 5,081,558 A | 1/1992 | Mahler |
| 5,093,583 A | 3/1992 | Mashino et al. |
| 5,138,422 A | 8/1992 | Fujii et al. |
| 5,143,556 A | 9/1992 | Matlin |
| 5,144,222 A | 9/1992 | Herbert |
| 5,155,670 A | 10/1992 | Brian |
| 5,159,255 A | 10/1992 | Weber |
| 5,172,309 A | 12/1992 | DeDoncker et al. |
| 5,191,519 A | 3/1993 | Kawakami |
| 5,196,781 A | 3/1993 | Jamieson et al. |
| 5,233,509 A | 8/1993 | Ghotbi |
| 5,235,266 A | 8/1993 | Schaffrin |
| 5,237,194 A | 8/1993 | Takahashi |
| 5,268,832 A | 12/1993 | Kandatsu |
| 5,280,133 A | 1/1994 | Nath |
| 5,280,232 A | 1/1994 | Kohl et al. |
| 5,287,261 A | 2/1994 | Ehsani |
| 5,289,361 A | 2/1994 | Vinciarelli |
| 5,289,998 A | 3/1994 | Bingley et al. |
| 5,327,071 A | 7/1994 | Frederick et al. |
| 5,329,222 A | 7/1994 | Gyugyi et al. |
| 5,345,375 A | 9/1994 | Mohan |
| 5,361,196 A | 11/1994 | Tanamachi et al. |
| 5,373,433 A | 12/1994 | Thomas |
| 5,379,209 A | 1/1995 | Goff |
| 5,381,327 A | 1/1995 | Yan |
| 5,402,060 A | 3/1995 | Erisman |
| 5,404,059 A | 4/1995 | Loffler |
| 5,408,171 A | 4/1995 | Eitzmann et al. |
| 5,412,558 A | 5/1995 | Sakurai et al. |
| 5,413,313 A | 5/1995 | Mutterlein et al. |
| 5,442,358 A | 8/1995 | Keeler et al. |
| 5,446,645 A | 8/1995 | Shirahama et al. |
| 5,460,546 A | 10/1995 | Kunishi et al. |
| 5,472,614 A | 12/1995 | Rossi |
| 5,475,818 A | 12/1995 | Molyneaux et al. |
| 5,479,337 A | 12/1995 | Voigt |
| 5,493,154 A | 2/1996 | Smith et al. |
| 5,497,289 A | 3/1996 | Sugishima et al. |
| 5,504,415 A | 4/1996 | Podrazhansky et al. |
| 5,504,418 A | 4/1996 | Ashley |
| 5,504,449 A | 4/1996 | Prentice |

(56) References Cited

U.S. PATENT DOCUMENTS

| | | |
|---|---|---|
| 5,508,658 A * | 4/1996 | Nishioka .............. H03F 1/0238 330/146 |
| 5,513,075 A | 4/1996 | Capper et al. |
| 5,517,378 A | 5/1996 | Asplund et al. |
| 5,530,335 A | 6/1996 | Decker et al. |
| 5,539,238 A | 7/1996 | Malhi |
| 5,548,504 A | 8/1996 | Takehara |
| 5,563,780 A | 10/1996 | Goad |
| 5,565,855 A | 10/1996 | Knibbe |
| 5,566,022 A | 10/1996 | Segev |
| 5,576,941 A | 11/1996 | Nguyen et al. |
| 5,580,395 A | 12/1996 | Yoshioka et al. |
| 5,585,749 A | 12/1996 | Pace et al. |
| 5,598,326 A | 1/1997 | Liu et al. |
| 5,604,430 A | 2/1997 | Decker et al. |
| 5,616,913 A | 4/1997 | Litterst |
| 5,625,539 A | 4/1997 | Nakata et al. |
| 5,625,545 A | 4/1997 | Hammond |
| 5,626,619 A | 5/1997 | Jacobson et al. |
| 5,631,534 A | 5/1997 | Lewis |
| 5,635,864 A | 6/1997 | Jones |
| 5,636,107 A | 6/1997 | Lu et al. |
| 5,638,263 A | 6/1997 | Opal et al. |
| 5,642,275 A | 6/1997 | Peng et al. |
| 5,644,212 A | 7/1997 | Takahashi |
| 5,644,219 A | 7/1997 | Kurokawa |
| 5,644,483 A | 7/1997 | Peng et al. |
| 5,646,501 A | 7/1997 | Fishman et al. |
| 5,648,731 A | 7/1997 | Decker et al. |
| 5,659,465 A | 8/1997 | Flack et al. |
| 5,677,833 A | 10/1997 | Bingley |
| 5,684,385 A | 11/1997 | Guyonneau et al. |
| 5,686,766 A | 11/1997 | Tamechika |
| 5,703,390 A | 12/1997 | Itoh |
| 5,708,576 A | 1/1998 | Jones et al. |
| 5,719,758 A | 2/1998 | Nakata et al. |
| 5,722,057 A | 2/1998 | Wu |
| 5,726,615 A | 3/1998 | Bloom |
| 5,731,603 A | 3/1998 | Nakagawa et al. |
| 5,734,565 A | 3/1998 | Mueller et al. |
| 5,747,967 A | 5/1998 | Muljadi et al. |
| 5,751,120 A | 5/1998 | Zeitler et al. |
| 5,751,138 A | 5/1998 | Venkata et al. |
| 5,773,963 A | 6/1998 | Blanc et al. |
| 5,777,515 A | 7/1998 | Kimura |
| 5,777,858 A | 7/1998 | Rodulfo |
| 5,780,092 A | 7/1998 | Agbo et al. |
| 5,790,396 A | 8/1998 | Miyazaki et al. |
| 5,793,184 A | 8/1998 | O'Connor |
| 5,798,631 A | 8/1998 | Spee et al. |
| 5,801,519 A | 9/1998 | Midya et al. |
| 5,804,894 A | 9/1998 | Leeson et al. |
| 5,812,045 A | 9/1998 | Ishikawa et al. |
| 5,814,970 A | 9/1998 | Schmidt |
| 5,821,734 A | 10/1998 | Faulk |
| 5,822,186 A | 10/1998 | Bull et al. |
| 5,838,148 A | 11/1998 | Kurokami et al. |
| 5,844,439 A | 12/1998 | Zortea |
| 5,847,549 A | 12/1998 | Dodson, III |
| 5,859,772 A | 1/1999 | Hilpert |
| 5,869,956 A | 2/1999 | Nagao et al. |
| 5,873,738 A | 2/1999 | Shimada et al. |
| 5,886,882 A | 3/1999 | Rodulfo |
| 5,886,890 A | 3/1999 | Ishida et al. |
| 5,892,354 A | 4/1999 | Nagao et al. |
| 5,892,677 A | 4/1999 | Chang |
| 5,898,585 A | 4/1999 | Sirichote et al. |
| 5,903,138 A | 5/1999 | Hwang et al. |
| 5,905,645 A | 5/1999 | Cross |
| 5,910,892 A | 6/1999 | Lyons et al. |
| 5,917,722 A | 6/1999 | Singh |
| 5,919,314 A | 7/1999 | Kim |
| 5,923,100 A | 7/1999 | Lukens et al. |
| 5,923,158 A | 7/1999 | Kurokami et al. |
| 5,929,614 A | 7/1999 | Copple |
| 5,930,128 A | 7/1999 | Dent |
| 5,930,131 A | 7/1999 | Feng |
| 5,932,994 A | 8/1999 | Jo et al. |
| 5,933,327 A | 8/1999 | Leighton et al. |
| 5,933,339 A | 8/1999 | Duba et al. |
| 5,936,856 A | 8/1999 | Xiang |
| 5,943,229 A | 8/1999 | Sudhoff |
| 5,945,806 A | 8/1999 | Faulk |
| 5,946,206 A | 8/1999 | Shimizu et al. |
| 5,949,668 A | 9/1999 | Schweighofer |
| 5,955,885 A | 9/1999 | Kurokami et al. |
| 5,961,739 A | 10/1999 | Osborne |
| 5,963,010 A | 10/1999 | Hayashi et al. |
| 5,963,078 A | 10/1999 | Wallace |
| 5,973,368 A | 10/1999 | Pearce et al. |
| 5,982,646 A | 11/1999 | Lyons et al. |
| 5,990,659 A | 11/1999 | Frannhagen |
| 6,002,290 A | 12/1999 | Avery et al. |
| 6,005,788 A | 12/1999 | Lipo et al. |
| 6,021,052 A | 2/2000 | Unger et al. |
| 6,026,286 A | 2/2000 | Long |
| 6,031,399 A | 2/2000 | Vu et al. |
| 6,031,736 A | 2/2000 | Takehara et al. |
| 6,031,738 A | 2/2000 | Lipo et al. |
| 6,037,720 A | 3/2000 | Wong et al. |
| 6,038,148 A | 3/2000 | Farrington et al. |
| 6,046,470 A | 4/2000 | Williams et al. |
| 6,046,919 A | 4/2000 | Madenokouji et al. |
| 6,050,779 A | 4/2000 | Nagao et al. |
| 6,058,031 A | 5/2000 | Lyons et al. |
| 6,058,035 A | 5/2000 | Madenokouji et al. |
| 6,060,859 A | 5/2000 | Jonokuchi |
| 6,064,086 A | 5/2000 | Nakagawa et al. |
| 6,075,350 A | 6/2000 | Peng |
| 6,078,511 A | 6/2000 | Fasullo et al. |
| 6,081,104 A | 6/2000 | Kern |
| 6,082,122 A | 7/2000 | Madenokouji et al. |
| 6,083,164 A | 7/2000 | Oppelt et al. |
| 6,087,738 A | 7/2000 | Hammond |
| 6,093,885 A | 7/2000 | Takehara et al. |
| 6,094,129 A | 7/2000 | Baiatu |
| 6,101,073 A | 8/2000 | Takehara |
| 6,105,317 A | 8/2000 | Tomiuchi et al. |
| 6,111,188 A | 8/2000 | Kurokami et al. |
| 6,111,391 A | 8/2000 | Cullen |
| 6,111,767 A | 8/2000 | Handleman |
| 6,130,458 A | 10/2000 | Takagi et al. |
| 6,150,739 A | 11/2000 | Baumgartl et al. |
| 6,151,234 A | 11/2000 | Oldenkamp |
| 6,160,722 A | 12/2000 | Thommes et al. |
| 6,163,086 A | 12/2000 | Choo |
| 6,166,455 A | 12/2000 | Li |
| 6,166,527 A | 12/2000 | Dwelley et al. |
| 6,169,678 B1 | 1/2001 | Kondo et al. |
| 6,175,219 B1 | 1/2001 | Imamura et al. |
| 6,175,512 B1 | 1/2001 | Hagihara et al. |
| 6,191,456 B1 | 2/2001 | Stoisiek et al. |
| 6,205,012 B1 | 3/2001 | Lear |
| 6,205,042 B1 | 3/2001 | Bixel |
| RE37,126 E | 4/2001 | Peng et al. |
| 6,219,623 B1 | 4/2001 | Wills |
| 6,225,793 B1 | 5/2001 | Dickmann |
| 6,236,580 B1 | 5/2001 | Aiello et al. |
| 6,255,360 B1 | 7/2001 | Domschke et al. |
| 6,255,804 B1 | 7/2001 | Herniter et al. |
| 6,256,234 B1 | 7/2001 | Keeth et al. |
| 6,259,234 B1 | 7/2001 | Perol |
| 6,262,555 B1 | 7/2001 | Hammond et al. |
| 6,262,558 B1 | 7/2001 | Weinberg |
| 6,269,010 B1 | 7/2001 | Ma et al. |
| 6,275,016 B1 | 8/2001 | Ivanov |
| 6,281,485 B1 | 8/2001 | Siri |
| 6,285,572 B1 | 9/2001 | Onizuka et al. |
| 6,292,379 B1 | 9/2001 | Edevold et al. |
| 6,301,128 B1 | 10/2001 | Jang et al. |
| 6,301,130 B1 | 10/2001 | Aiello et al. |
| 6,304,065 B1 | 10/2001 | Wittenbreder |
| 6,307,749 B1 | 10/2001 | Daanen et al. |
| 6,311,137 B1 | 10/2001 | Kurokami et al. |

(56) References Cited

U.S. PATENT DOCUMENTS

| | | |
|---|---|---|
| 6,316,716 B1 | 11/2001 | Hilgrath |
| 6,320,769 B2 | 11/2001 | Kurokami et al. |
| 6,331,670 B2 | 12/2001 | Takehara et al. |
| 6,339,538 B1 | 1/2002 | Handleman |
| 6,340,851 B1 | 1/2002 | Rinaldi et al. |
| 6,346,451 B1 | 2/2002 | Simpson et al. |
| 6,350,944 B1 | 2/2002 | Sherif et al. |
| 6,351,130 B1 | 2/2002 | Preiser et al. |
| 6,366,483 B1 | 4/2002 | Ma et al. |
| 6,369,461 B1 | 4/2002 | Jungreis et al. |
| 6,369,462 B1 | 4/2002 | Siri |
| 6,380,719 B2 | 4/2002 | Underwood et al. |
| 6,396,170 B1 | 5/2002 | Laufenberg et al. |
| 6,396,239 B1 | 5/2002 | Benn et al. |
| 6,404,655 B1 | 6/2002 | Welches |
| 6,417,644 B2 | 7/2002 | Hammond et al. |
| 6,422,145 B1 | 7/2002 | Gavrilovic et al. |
| 6,424,207 B1 | 7/2002 | Johnson |
| 6,425,248 B1 | 7/2002 | Tonomura et al. |
| 6,429,546 B1 | 8/2002 | Ropp et al. |
| 6,429,621 B1 | 8/2002 | Arai |
| 6,433,522 B1 | 8/2002 | Siri |
| 6,433,978 B1 | 8/2002 | Neiger et al. |
| 6,441,597 B1 | 8/2002 | Lethellier |
| 6,445,599 B1 | 9/2002 | Nguyen |
| 6,448,489 B2 | 9/2002 | Kimura et al. |
| 6,452,814 B1 | 9/2002 | Wittenbreder |
| 6,459,596 B1 | 10/2002 | Corzine |
| 6,465,910 B2 | 10/2002 | Young et al. |
| 6,469,919 B1 | 10/2002 | Bennett |
| 6,472,254 B2 | 10/2002 | Cantarini et al. |
| 6,480,403 B1 | 11/2002 | Bijlenga |
| 6,483,203 B1 | 11/2002 | McCormack |
| 6,493,246 B2 | 12/2002 | Suzui et al. |
| 6,501,362 B1 | 12/2002 | Hoffman et al. |
| 6,503,649 B1 | 1/2003 | Czajkowski et al. |
| 6,507,176 B2 | 1/2003 | Wittenbreder, Jr. |
| 6,509,712 B1 | 1/2003 | Landis |
| 6,515,215 B1 | 2/2003 | Mimura |
| 6,519,165 B2 | 2/2003 | Koike |
| 6,519,169 B1 | 2/2003 | Asplund et al. |
| 6,528,977 B2 | 3/2003 | Arakawa |
| 6,531,848 B1 | 3/2003 | Chitsazan et al. |
| 6,545,211 B1 | 4/2003 | Mimura |
| 6,548,205 B2 | 4/2003 | Leung et al. |
| 6,556,330 B2 | 4/2003 | Holcombe |
| 6,556,461 B1 | 4/2003 | Khersonsky et al. |
| 6,556,661 B1 | 4/2003 | Ingalsbe et al. |
| 6,560,131 B1 | 5/2003 | vonBrethorst |
| 6,577,087 B2 | 6/2003 | Su |
| 6,587,051 B2 | 7/2003 | Takehara et al. |
| 6,590,793 B1 | 7/2003 | Nagao et al. |
| 6,590,794 B1 | 7/2003 | Carter |
| 6,593,520 B2 | 7/2003 | Kondo et al. |
| 6,593,521 B2 | 7/2003 | Kobayashi |
| 6,603,672 B1 | 8/2003 | Deng et al. |
| 6,608,468 B2 | 8/2003 | Nagase |
| 6,611,130 B2 | 8/2003 | Chang |
| 6,611,441 B2 | 8/2003 | Kurokami et al. |
| 6,621,719 B2 | 9/2003 | Steimer et al. |
| 6,628,011 B2 | 9/2003 | Droppo et al. |
| 6,633,824 B2 | 10/2003 | Dollar, II |
| 6,650,031 B1 | 11/2003 | Goldack |
| 6,650,371 B1 | 11/2003 | Morrish et al. |
| 6,650,560 B2 | 11/2003 | MacDonald et al. |
| 6,653,549 B2 | 11/2003 | Matsushita et al. |
| 6,657,419 B2 | 12/2003 | Renyolds |
| 6,664,762 B2 | 12/2003 | Kutkut |
| 6,672,018 B2 | 1/2004 | Shingleton |
| 6,678,174 B2 | 1/2004 | Suzui et al. |
| 6,690,590 B2 | 2/2004 | Stamenic et al. |
| 6,690,796 B1 | 2/2004 | Farris et al. |
| 6,693,327 B2 | 2/2004 | Priefert et al. |
| 6,693,781 B1 | 2/2004 | Kroker |
| 6,697,271 B2 | 2/2004 | Corzine |
| 6,700,351 B2 | 3/2004 | Blair et al. |
| 6,709,291 B1 | 3/2004 | Wallace et al. |
| 6,724,593 B1 | 4/2004 | Smith |
| 6,731,136 B2 | 5/2004 | Knee |
| 6,738,692 B2 | 5/2004 | Schienbein et al. |
| 6,744,643 B2 | 6/2004 | Luo et al. |
| 6,757,185 B2 | 6/2004 | Rojas Romero |
| 6,765,315 B2 | 7/2004 | Hammerstrom et al. |
| 6,768,047 B2 | 7/2004 | Chang et al. |
| 6,768,180 B2 | 7/2004 | Salama et al. |
| 6,788,033 B2 | 9/2004 | Vinciarelli |
| 6,788,146 B2 | 9/2004 | Forejt et al. |
| 6,795,318 B2 | 9/2004 | Haas et al. |
| 6,800,964 B2 | 10/2004 | Beck |
| 6,801,442 B2 | 10/2004 | Suzui et al. |
| 6,807,069 B2 | 10/2004 | Nieminen et al. |
| 6,809,942 B2 | 10/2004 | Madenokouji et al. |
| 6,810,339 B2 | 10/2004 | Wills |
| 6,812,396 B2 | 11/2004 | Makita et al. |
| 6,837,739 B2 | 1/2005 | Gorringe et al. |
| 6,838,611 B2 | 1/2005 | Kondo et al. |
| 6,838,856 B2 | 1/2005 | Raichle |
| 6,842,354 B1 | 1/2005 | Tallam et al. |
| 6,844,739 B2 | 1/2005 | Kasai et al. |
| 6,850,074 B2 | 2/2005 | Adams et al. |
| 6,850,424 B2 | 2/2005 | Baudelot et al. |
| 6,856,102 B1 | 2/2005 | Lin et al. |
| 6,882,131 B1 | 4/2005 | Takada et al. |
| 6,888,728 B2 | 5/2005 | Takagi et al. |
| 6,894,911 B2 | 5/2005 | Telefus et al. |
| 6,897,370 B2 | 5/2005 | Kondo et al. |
| 6,897,784 B2 | 5/2005 | Goehlich |
| 6,914,418 B2 | 7/2005 | Sung |
| 6,919,714 B2 | 7/2005 | Delepaut |
| 6,927,955 B2 | 8/2005 | Suzui et al. |
| 6,930,899 B2 | 8/2005 | Bakran et al. |
| 6,933,627 B2 | 8/2005 | Wilhelm |
| 6,933,714 B2 | 8/2005 | Fasshauer et al. |
| 6,936,995 B2 | 8/2005 | Kapsokavathis et al. |
| 6,940,735 B2 | 9/2005 | Deng et al. |
| 6,949,843 B2 | 9/2005 | Dubovsky |
| 6,950,323 B2 | 9/2005 | Achleitner et al. |
| 6,954,366 B2 | 10/2005 | Lai et al. |
| 6,963,147 B2 | 11/2005 | Kurokami et al. |
| 6,966,184 B2 | 11/2005 | Toyomura et al. |
| 6,969,967 B2 | 11/2005 | Su |
| 6,980,655 B2 | 12/2005 | Farris et al. |
| 6,980,783 B2 | 12/2005 | Liu et al. |
| 6,984,967 B2 | 1/2006 | Notman |
| 6,984,970 B2 | 1/2006 | Capel |
| 6,987,444 B2 | 1/2006 | Bub et al. |
| 6,996,741 B1 | 2/2006 | Pittelkow et al. |
| 7,030,597 B2 | 4/2006 | Bruno et al. |
| 7,031,176 B2 | 4/2006 | Kotsopoulos et al. |
| 7,038,430 B2 | 5/2006 | Itabashi et al. |
| 7,042,195 B2 | 5/2006 | Tsunetsugu et al. |
| 7,045,991 B2 | 5/2006 | Nakamura et al. |
| 7,046,531 B2 | 5/2006 | Zocchi et al. |
| 7,050,311 B2 | 5/2006 | Lai et al. |
| 7,053,506 B2 | 5/2006 | Alonso et al. |
| 7,061,211 B2 | 6/2006 | Satoh et al. |
| 7,061,214 B2 | 6/2006 | Mayega et al. |
| 7,064,967 B2 | 6/2006 | Ichinose et al. |
| 7,068,017 B2 | 6/2006 | Willner et al. |
| 7,072,194 B2 | 7/2006 | Nayar et al. |
| 7,078,883 B2 | 7/2006 | Chapman et al. |
| 7,079,406 B2 | 7/2006 | Kurokami et al. |
| 7,087,332 B2 | 8/2006 | Harris |
| 7,090,509 B1 | 8/2006 | Gilliland et al. |
| 7,091,707 B2 | 8/2006 | Cutler |
| 7,097,516 B2 | 8/2006 | Werner et al. |
| 7,099,169 B2 | 8/2006 | West et al. |
| 7,119,629 B2 | 10/2006 | Nielsen et al. |
| 7,126,053 B2 | 10/2006 | Kurokami et al. |
| 7,126,294 B2 | 10/2006 | Minami et al. |
| 7,138,786 B2 | 11/2006 | Ishigaki et al. |
| 7,142,997 B1 | 11/2006 | Widner |
| 7,148,669 B2 | 12/2006 | Maksimovic et al. |
| 7,150,938 B2 | 12/2006 | Munshi et al. |

(56) References Cited

U.S. PATENT DOCUMENTS

| | | |
|---|---|---|
| 7,158,359 B2 | 1/2007 | Bertele et al. |
| 7,158,395 B2 | 1/2007 | Deng et al. |
| 7,161,082 B2 | 1/2007 | Matsushita et al. |
| 7,174,973 B1 | 2/2007 | Lysaght |
| 7,183,667 B2 | 2/2007 | Colby et al. |
| 7,190,143 B2 | 3/2007 | Wei et al. |
| 7,193,826 B2 | 3/2007 | Crane et al. |
| 7,193,872 B2 | 3/2007 | Siri |
| 7,202,653 B2 | 4/2007 | Pai |
| 7,208,674 B2 | 4/2007 | Aylaian |
| 7,218,541 B2 | 5/2007 | Price et al. |
| 7,219,673 B2 | 5/2007 | Lemak |
| 7,230,837 B1 | 6/2007 | Huang et al. |
| 7,231,773 B2 | 6/2007 | Crane et al. |
| 7,248,946 B2 | 7/2007 | Bashaw et al. |
| 7,256,566 B2 | 8/2007 | Bhavaraju et al. |
| 7,259,474 B2 | 8/2007 | Blanc |
| 7,262,979 B2 | 8/2007 | Wai et al. |
| 7,276,886 B2 | 10/2007 | Kinder et al. |
| 7,277,304 B2 | 10/2007 | Stancu et al. |
| 7,281,141 B2 | 10/2007 | Elkayam et al. |
| 7,282,814 B2 | 10/2007 | Jacobs |
| 7,291,036 B1 | 11/2007 | Daily et al. |
| RE39,976 E | 1/2008 | Schiff et al. |
| 7,315,052 B2 | 1/2008 | Alter |
| 7,319,313 B2 | 1/2008 | Dickerson et al. |
| 7,319,763 B2 | 1/2008 | Bank et al. |
| 7,324,361 B2 | 1/2008 | Siri |
| 7,336,004 B2 | 2/2008 | Lai |
| 7,336,056 B1 | 2/2008 | Dening |
| 7,339,287 B2 | 3/2008 | Jepsen et al. |
| 7,348,802 B2 | 3/2008 | Kasanyal et al. |
| 7,352,154 B2 | 4/2008 | Cook |
| 7,361,952 B2 | 4/2008 | Miura et al. |
| 7,371,963 B2 | 5/2008 | Suenaga et al. |
| 7,372,709 B2 | 5/2008 | Mazumder et al. |
| 7,372,712 B2 | 5/2008 | Stancu et al. |
| 7,375,994 B2 | 5/2008 | Andreycak |
| 7,385,300 B2 | 6/2008 | Huff et al. |
| 7,385,380 B2 | 6/2008 | Ishigaki et al. |
| 7,385,833 B2 | 6/2008 | Keung |
| 7,388,348 B2 | 6/2008 | Mattichak |
| 7,394,237 B2 | 7/2008 | Chou et al. |
| 7,398,012 B2 | 7/2008 | Koellner |
| 7,405,117 B2 | 7/2008 | Zuniga et al. |
| 7,412,056 B2 | 8/2008 | Farris et al. |
| 7,414,870 B2 | 8/2008 | Rottger et al. |
| 7,420,354 B2 | 9/2008 | Cutler |
| 7,420,815 B2 | 9/2008 | Love |
| 7,432,691 B2 | 10/2008 | Cutler |
| 7,435,134 B2 | 10/2008 | Lenox |
| 7,435,897 B2 | 10/2008 | Russell |
| 7,443,052 B2 | 10/2008 | Wendt et al. |
| 7,443,152 B2 | 10/2008 | Utsunomiya |
| 7,445,178 B2 | 11/2008 | McCoskey et al. |
| 7,450,401 B2 | 11/2008 | Iida |
| 7,456,510 B2 | 11/2008 | Ito et al. |
| 7,456,523 B2 | 11/2008 | Kobayashi |
| 7,463,500 B2 | 12/2008 | West |
| 7,466,566 B2 | 12/2008 | Fukumoto |
| 7,471,014 B2 | 12/2008 | Lum et al. |
| 7,471,524 B1 | 12/2008 | Batarseh et al. |
| 7,471,532 B1 | 12/2008 | Salama et al. |
| 7,479,774 B2 | 1/2009 | Wai et al. |
| 7,482,238 B2 | 1/2009 | Sung |
| 7,492,898 B2 | 2/2009 | Farris et al. |
| 7,495,419 B1 | 2/2009 | Ju |
| 7,495,938 B2 | 2/2009 | Wu et al. |
| 7,499,291 B2 | 3/2009 | Han |
| 7,504,811 B2 | 3/2009 | Watanabe et al. |
| 7,518,346 B2 | 4/2009 | Prexl et al. |
| 7,538,451 B2 | 5/2009 | Nomoto |
| 7,558,087 B2 | 7/2009 | Meysenc et al. |
| 7,560,915 B2 | 7/2009 | Ito et al. |
| 7,573,732 B2 | 8/2009 | Teichmann et al. |
| 7,589,437 B2 | 9/2009 | Henne et al. |
| 7,595,616 B2 | 9/2009 | Prexl et al. |
| 7,598,714 B2 | 10/2009 | Stanley |
| 7,599,200 B2 | 10/2009 | Tomonaga |
| 7,600,349 B2 | 10/2009 | Liebendorfer |
| 7,602,080 B1 | 10/2009 | Hadar et al. |
| 7,605,498 B2 | 10/2009 | Ledenev et al. |
| 7,612,283 B2 | 11/2009 | Toyomura et al. |
| 7,623,663 B2 | 11/2009 | Farris et al. |
| 7,626,834 B2 | 12/2009 | Chisenga et al. |
| 7,633,284 B2 | 12/2009 | Ingram et al. |
| 7,646,116 B2 | 1/2010 | Batarseh et al. |
| 7,649,434 B2 | 1/2010 | Xu et al. |
| 7,663,268 B2 | 2/2010 | Wen et al. |
| 7,667,342 B2 | 2/2010 | Matsumoto et al. |
| 7,679,941 B2 | 3/2010 | Raju et al. |
| 7,701,083 B2 | 4/2010 | Savage |
| 7,709,727 B2 | 5/2010 | Roehrig et al. |
| 7,710,082 B2 | 5/2010 | Escobar Valderrama et al. |
| 7,719,140 B2 | 5/2010 | Ledenev et al. |
| 7,719,864 B2 | 5/2010 | Kernahan et al. |
| 7,723,865 B2 | 5/2010 | Kitanaka |
| 7,733,069 B2 | 6/2010 | Toyomura et al. |
| 7,733,178 B1 | 6/2010 | Delano et al. |
| 7,748,175 B2 | 7/2010 | Liebendorfer |
| 7,759,575 B2 | 7/2010 | Jones et al. |
| 7,763,807 B2 | 7/2010 | Richter |
| 7,768,350 B2 | 8/2010 | Srinivasan et al. |
| 7,780,472 B2 | 8/2010 | Lenox |
| 7,782,031 B2 | 8/2010 | Qiu et al. |
| 7,783,389 B2 | 8/2010 | Yamada et al. |
| 7,787,270 B2 | 8/2010 | NadimpalliRaju et al. |
| 7,787,273 B2 | 8/2010 | Lu et al. |
| 7,796,409 B2 | 9/2010 | Knott |
| 7,800,348 B2 | 9/2010 | Zargari |
| 7,804,282 B2 | 9/2010 | Bertele |
| 7,807,919 B2 | 10/2010 | Powell et al. |
| 7,808,125 B1 | 10/2010 | Sachdeva et al. |
| 7,812,701 B2 | 10/2010 | Lee et al. |
| 7,821,225 B2 | 10/2010 | Chou et al. |
| 7,830,681 B2 | 11/2010 | Abolhassani et al. |
| 7,834,579 B2 | 11/2010 | Nojima |
| 7,839,022 B2 | 11/2010 | Wolfs |
| 7,839,023 B2 | 11/2010 | Jacobson et al. |
| 7,843,085 B2 | 11/2010 | Ledenev et al. |
| 7,864,497 B2 | 1/2011 | Quardt et al. |
| 7,868,599 B2 | 1/2011 | Rahman et al. |
| 7,872,528 B2 | 1/2011 | Bockelman et al. |
| 7,880,334 B2 | 2/2011 | Evans et al. |
| 7,883,808 B2 | 2/2011 | Norimatsu et al. |
| 7,884,278 B2 | 2/2011 | Powell et al. |
| 7,890,080 B2 | 2/2011 | Wu et al. |
| 7,893,022 B2 | 2/2011 | Zhang et al. |
| 7,893,346 B2 | 2/2011 | Nachamkin et al. |
| 7,898,112 B2 | 3/2011 | Powell et al. |
| 7,900,361 B2 | 3/2011 | Adest et al. |
| 7,906,870 B2 | 3/2011 | Ohm |
| 7,919,952 B1 | 4/2011 | Fahrenbruch |
| 7,919,953 B2 | 4/2011 | Porter et al. |
| 7,920,393 B2 | 4/2011 | Bendre et al. |
| 7,925,552 B2 | 4/2011 | Tarbell et al. |
| 7,932,693 B2 | 4/2011 | Lee et al. |
| 7,940,537 B2 | 5/2011 | Abolhassani et al. |
| 7,944,191 B2 | 5/2011 | Xu |
| 7,945,413 B2 | 5/2011 | Krein |
| 7,948,217 B2 | 5/2011 | Oohara et al. |
| 7,948,221 B2 | 5/2011 | Watanabe et al. |
| 7,952,897 B2 | 5/2011 | Nocentini et al. |
| 7,960,650 B2 | 6/2011 | Richter et al. |
| 7,960,950 B2 | 6/2011 | Glovinsky |
| 7,961,817 B2 | 6/2011 | Dong et al. |
| 7,969,126 B2 | 6/2011 | Stanley |
| 7,969,133 B2 | 6/2011 | Zhang et al. |
| 7,986,535 B2 | 7/2011 | Jacobson et al. |
| 8,003,885 B2 | 8/2011 | Richter et al. |
| 8,004,113 B2 | 8/2011 | Sander et al. |
| 8,004,116 B2 | 8/2011 | Ledenev et al. |
| 8,004,117 B2 | 8/2011 | Adest et al. |
| 8,004,866 B2 | 8/2011 | Bucella et al. |

(56) References Cited

U.S. PATENT DOCUMENTS

| | | |
|---|---|---|
| 8,013,472 B2 | 9/2011 | Adest et al. |
| 8,018,331 B2 | 9/2011 | Jang |
| 8,018,748 B2 | 9/2011 | Leonard |
| 8,026,639 B1 | 9/2011 | Sachdeva et al. |
| 8,026,763 B2 | 9/2011 | Dawson et al. |
| 8,031,495 B2 | 10/2011 | Sachdeva et al. |
| 8,039,730 B2 | 10/2011 | Hadar et al. |
| 8,045,346 B2 | 10/2011 | Abolhassani et al. |
| 8,058,747 B2 | 11/2011 | Avrutsky et al. |
| 8,058,752 B2 | 11/2011 | Erickson, Jr. et al. |
| 8,067,855 B2 | 11/2011 | Mumtaz et al. |
| 8,077,437 B2 | 12/2011 | Mumtaz et al. |
| 8,089,780 B2 | 1/2012 | Mochikawa et al. |
| 8,089,785 B2 | 1/2012 | Rodriguez |
| 8,090,548 B2 | 1/2012 | Abdennadher et al. |
| 8,093,756 B2 | 1/2012 | Porter et al. |
| 8,093,757 B2 | 1/2012 | Wolfs |
| 8,098,055 B2 | 1/2012 | Avrutsky et al. |
| 8,102,074 B2 | 1/2012 | Hadar et al. |
| 8,102,144 B2 | 1/2012 | Capp et al. |
| 8,111,052 B2 | 2/2012 | Glovinsky |
| 8,116,103 B2 | 2/2012 | Zacharias et al. |
| 8,130,501 B2 | 3/2012 | Ledezma et al. |
| 8,138,631 B2 | 3/2012 | Allen et al. |
| 8,138,914 B2 | 3/2012 | Wong et al. |
| 8,144,490 B2 | 3/2012 | El-Barbari et al. |
| 8,144,491 B2 | 3/2012 | Bendre et al. |
| 8,158,877 B2 | 4/2012 | Klein et al. |
| 8,169,108 B2 | 5/2012 | Dupuis et al. |
| 8,174,138 B2 | 5/2012 | Castelli Dezza et al. |
| 8,179,147 B2 | 5/2012 | Dargatz et al. |
| 8,184,460 B2 | 5/2012 | O'Brien et al. |
| 8,194,856 B2 | 6/2012 | Farris et al. |
| 8,204,709 B2 | 6/2012 | Presher, Jr. et al. |
| 8,212,408 B2 | 7/2012 | Fishman |
| 8,212,409 B2 | 7/2012 | Bettenwort et al. |
| 8,223,515 B2 | 7/2012 | Abolhassani et al. |
| 8,230,257 B2 | 7/2012 | Wilson |
| 8,232,948 B2 | 7/2012 | Yin et al. |
| 8,233,625 B2 | 7/2012 | Farris et al. |
| 8,271,599 B2 | 9/2012 | Eizips et al. |
| 8,274,172 B2 | 9/2012 | Hadar et al. |
| 8,279,640 B2 | 10/2012 | Abolhassani et al. |
| 8,279,644 B2 | 10/2012 | Zhang et al. |
| 8,284,021 B2 | 10/2012 | Farris et al. |
| 8,289,742 B2 | 10/2012 | Adest et al. |
| 8,294,306 B2 | 10/2012 | Kumar et al. |
| 8,304,932 B2 | 11/2012 | Ledenev et al. |
| 8,310,101 B2 | 11/2012 | Amaratunga et al. |
| 8,314,375 B2 | 11/2012 | Arditi et al. |
| 8,314,602 B2 | 11/2012 | Hosini et al. |
| 8,319,471 B2 | 11/2012 | Adest et al. |
| 8,325,059 B2 | 12/2012 | Rozenboim |
| 8,344,548 B2 | 1/2013 | Stern |
| 8,344,551 B2 | 1/2013 | Nielsen |
| 8,369,113 B2 | 2/2013 | Rodriguez |
| 8,374,009 B2 | 2/2013 | Feng et al. |
| 8,385,091 B2 | 2/2013 | Nielsen |
| 8,391,031 B2 | 3/2013 | Garrity |
| 8,391,032 B2 | 3/2013 | Garrity et al. |
| 8,400,796 B2 | 3/2013 | Dofnas et al. |
| 8,405,248 B2 | 3/2013 | Mumtaz et al. |
| 8,405,349 B2 | 3/2013 | Kikinis et al. |
| 8,405,367 B2 | 3/2013 | Chisenga et al. |
| 8,410,889 B2 | 4/2013 | Garrity et al. |
| 8,411,474 B2 | 4/2013 | Roesner et al. |
| 8,415,552 B2 | 4/2013 | Hadar et al. |
| 8,415,937 B2 | 4/2013 | Hester |
| 8,427,010 B2 | 4/2013 | Bose et al. |
| 8,436,592 B2 | 5/2013 | Saitoh |
| 8,441,820 B2 | 5/2013 | Shen et al. |
| 8,461,809 B2 | 6/2013 | Rodriguez |
| 8,471,514 B2 | 6/2013 | Zargari et al. |
| 8,471,604 B2 | 6/2013 | Permuy et al. |
| 8,472,220 B2 | 6/2013 | Garrity et al. |
| 8,472,221 B1 | 6/2013 | Lee |
| 8,473,250 B2 | 6/2013 | Adest et al. |
| 8,476,689 B2 | 7/2013 | Chang |
| 8,482,156 B2 | 7/2013 | Spanoche et al. |
| 8,492,710 B2 | 7/2013 | Fuhrer et al. |
| 8,493,754 B1 | 7/2013 | Wambsganss et al. |
| 8,498,137 B2 | 7/2013 | Joseph |
| 8,509,032 B2 | 8/2013 | Rakib |
| 8,526,205 B2 | 9/2013 | Garrity |
| 8,531,055 B2 | 9/2013 | Adest et al. |
| 8,542,512 B2 | 9/2013 | Garrity |
| 8,547,717 B2 | 10/2013 | Kshirsagar |
| 8,558,405 B2 | 10/2013 | Brogan et al. |
| 8,559,193 B2 | 10/2013 | Mazumder |
| 8,570,005 B2 | 10/2013 | Lubomirsky |
| 8,570,017 B2 | 10/2013 | Perichon et al. |
| 8,570,776 B2 | 10/2013 | Kolar et al. |
| 8,581,441 B2 | 11/2013 | Rotzoll et al. |
| 8,587,141 B2 | 11/2013 | Bjerknes et al. |
| 8,599,588 B2 | 12/2013 | Adest et al. |
| 8,619,446 B2 | 12/2013 | Liu et al. |
| 8,624,443 B2 | 1/2014 | Mumtaz |
| 8,642,879 B2 | 2/2014 | Gilmore et al. |
| 8,653,689 B2 | 2/2014 | Rozenboim |
| 8,664,796 B2 | 3/2014 | Nielsen |
| 8,669,675 B2 | 3/2014 | Capp et al. |
| 8,670,255 B2 | 3/2014 | Gong et al. |
| 8,674,548 B2 | 3/2014 | Mumtaz |
| 8,674,668 B2 | 3/2014 | Chisenga et al. |
| 8,686,333 B2 | 4/2014 | Arditi et al. |
| 8,751,053 B2 | 6/2014 | Hadar et al. |
| 8,773,236 B2 | 7/2014 | Makhota et al. |
| 8,811,047 B2 | 8/2014 | Rodriguez |
| 8,823,212 B2 | 9/2014 | Garrity et al. |
| 8,823,218 B2 | 9/2014 | Hadar et al. |
| 8,841,916 B2 | 9/2014 | Avrutsky |
| 8,853,886 B2 | 10/2014 | Avrutsky et al. |
| 8,854,019 B1 | 10/2014 | Levesque et al. |
| 8,854,193 B2 | 10/2014 | Makhota et al. |
| 8,860,241 B2 | 10/2014 | Hadar et al. |
| 8,860,246 B2 | 10/2014 | Hadar et al. |
| 8,867,248 B2 | 10/2014 | Wang et al. |
| 8,917,156 B2 | 12/2014 | Garrity et al. |
| 8,922,061 B2 | 12/2014 | Arditi |
| 8,933,321 B2 | 1/2015 | Hadar et al. |
| 8,934,269 B2 | 1/2015 | Garrity |
| 2001/0023703 A1 | 9/2001 | Kondo et al. |
| 2001/0032664 A1 | 10/2001 | Takehara et al. |
| 2001/0034982 A1 | 11/2001 | Nagao et al. |
| 2001/0035180 A1 | 11/2001 | Kimura et al. |
| 2001/0048605 A1 | 12/2001 | Kurokami et al. |
| 2001/0050102 A1 | 12/2001 | Matsumi et al. |
| 2001/0054881 A1 | 12/2001 | Watanabe |
| 2002/0002040 A1 | 1/2002 | Kline et al. |
| 2002/0014262 A1 | 2/2002 | Matsushita et al. |
| 2002/0034083 A1 | 3/2002 | Ayyanar et al. |
| 2002/0038667 A1 | 4/2002 | Kondo et al. |
| 2002/0041505 A1 | 4/2002 | Suzui et al. |
| 2002/0044473 A1 | 4/2002 | Toyomura et al. |
| 2002/0047309 A1 | 4/2002 | Droppo et al. |
| 2002/0056089 A1 | 5/2002 | Houston |
| 2002/0063552 A1 | 5/2002 | Arakawa |
| 2002/0078991 A1 | 6/2002 | Nagao et al. |
| 2002/0080027 A1 | 6/2002 | Conley |
| 2002/0085397 A1 | 7/2002 | Suzui et al. |
| 2002/0113689 A1 | 8/2002 | Gehlot et al. |
| 2002/0118559 A1 | 8/2002 | Kurokami et al. |
| 2002/0149950 A1 | 10/2002 | Takebayashi |
| 2002/0162585 A1 | 11/2002 | Sugawara et al. |
| 2002/0165458 A1 | 11/2002 | Carter et al. |
| 2002/0177401 A1 | 11/2002 | Judd et al. |
| 2002/0179140 A1 | 12/2002 | Toyomura |
| 2002/0180408 A1 | 12/2002 | McDaniel et al. |
| 2003/0002303 A1 | 1/2003 | Riggio et al. |
| 2003/0038615 A1 | 2/2003 | Elbanhawy |
| 2003/0043611 A1 | 3/2003 | Bockle et al. |
| 2003/0047207 A1 | 3/2003 | Aylaian |
| 2003/0058593 A1 | 3/2003 | Bertele et al. |
| 2003/0058662 A1 | 3/2003 | Baudelot et al. |

(56) References Cited

U.S. PATENT DOCUMENTS

| | | |
|---|---|---|
| 2003/0066076 A1 | 4/2003 | Minahan |
| 2003/0066555 A1 | 4/2003 | Hui et al. |
| 2003/0075211 A1 | 4/2003 | Makita et al. |
| 2003/0080741 A1 | 5/2003 | LeRow et al. |
| 2003/0085621 A1 | 5/2003 | Potega |
| 2003/0090233 A1 | 5/2003 | Browe |
| 2003/0094931 A1 | 5/2003 | Renyolds |
| 2003/0156439 A1 | 8/2003 | Ohmichi et al. |
| 2003/0164695 A1 | 9/2003 | Fasshauer et al. |
| 2003/0185026 A1 | 10/2003 | Matsuda et al. |
| 2003/0193821 A1 | 10/2003 | Krieger et al. |
| 2003/0201674 A1 | 10/2003 | Droppo et al. |
| 2003/0212440 A1 | 11/2003 | Boveja |
| 2003/0214274 A1 | 11/2003 | Lethellier |
| 2003/0223257 A1 | 12/2003 | Onoe |
| 2004/0004402 A1 | 1/2004 | Kippley |
| 2004/0022081 A1 | 2/2004 | Erickson et al. |
| 2004/0024937 A1 | 2/2004 | Duncan et al. |
| 2004/0041548 A1 | 3/2004 | Perry |
| 2004/0056768 A1 | 3/2004 | Matsushita et al. |
| 2004/0061527 A1 | 4/2004 | Knee |
| 2004/0076028 A1 | 4/2004 | Achleitner et al. |
| 2004/0117676 A1 | 6/2004 | Kobayashi et al. |
| 2004/0118446 A1 | 6/2004 | Toyomura |
| 2004/0123894 A1 | 7/2004 | Erban |
| 2004/0124816 A1 | 7/2004 | DeLepaut |
| 2004/0125618 A1 | 7/2004 | De Rooij et al. |
| 2004/0140719 A1 | 7/2004 | Vulih et al. |
| 2004/0144043 A1 | 7/2004 | Stevenson et al. |
| 2004/0164718 A1 | 8/2004 | McDaniel et al. |
| 2004/0165408 A1 | 8/2004 | West et al. |
| 2004/0167676 A1 | 8/2004 | Mizumaki |
| 2004/0169499 A1 | 9/2004 | Huang et al. |
| 2004/0170038 A1 | 9/2004 | Ichinose et al. |
| 2004/0189432 A1 | 9/2004 | Yan et al. |
| 2004/0201279 A1 | 10/2004 | Templeton |
| 2004/0201933 A1 | 10/2004 | Blanc |
| 2004/0207366 A1 | 10/2004 | Sung |
| 2004/0211458 A1 | 10/2004 | Gui et al. |
| 2004/0223351 A1 | 11/2004 | Kurokami et al. |
| 2004/0233685 A1 | 11/2004 | Matsuo et al. |
| 2004/0246226 A1 | 12/2004 | Moon |
| 2004/0258141 A1 | 12/2004 | Tustison et al. |
| 2004/0264225 A1 | 12/2004 | Bhavaraju et al. |
| 2005/0002214 A1 | 1/2005 | Deng et al. |
| 2005/0005785 A1 | 1/2005 | Poss et al. |
| 2005/0006958 A1 | 1/2005 | Dubovsky |
| 2005/0017656 A1 | 1/2005 | Takahashi et al. |
| 2005/0017697 A1 | 1/2005 | Capel |
| 2005/0017701 A1 | 1/2005 | Hsu |
| 2005/0030772 A1 | 2/2005 | Phadke |
| 2005/0040800 A1 | 2/2005 | Sutardja |
| 2005/0041442 A1 | 2/2005 | Balakrishnan |
| 2005/0057214 A1 | 3/2005 | Matan |
| 2005/0057215 A1 | 3/2005 | Matan |
| 2005/0068012 A1 | 3/2005 | Cutler |
| 2005/0068820 A1 | 3/2005 | Radosevich et al. |
| 2005/0099138 A1 | 5/2005 | Wilhelm |
| 2005/0103376 A1 | 5/2005 | Matsushita et al. |
| 2005/0105224 A1 | 5/2005 | Nishi |
| 2005/0105306 A1 | 5/2005 | Deng et al. |
| 2005/0109386 A1 | 5/2005 | Marshall |
| 2005/0110454 A1 | 5/2005 | Tsai et al. |
| 2005/0121067 A1 | 6/2005 | Toyomura et al. |
| 2005/0127853 A1 | 6/2005 | Su |
| 2005/0135031 A1 | 6/2005 | Colby et al. |
| 2005/0139258 A1 | 6/2005 | Liu et al. |
| 2005/0139259 A1 | 6/2005 | Steigerwald et al. |
| 2005/0140335 A1 | 6/2005 | Lee et al. |
| 2005/0141248 A1 | 6/2005 | Mazumder et al. |
| 2005/0162018 A1 | 7/2005 | Realmuto et al. |
| 2005/0172995 A1 | 8/2005 | Rohrig et al. |
| 2005/0179420 A1 | 8/2005 | Satoh et al. |
| 2005/0194937 A1 | 9/2005 | Jacobs |
| 2005/0201397 A1 | 9/2005 | Petite |
| 2005/0213272 A1 | 9/2005 | Kobayashi |
| 2005/0225090 A1 | 10/2005 | Wobben |
| 2005/0226017 A1 | 10/2005 | Kotsopoulos et al. |
| 2005/0242795 A1 | 11/2005 | Al-Kuran et al. |
| 2005/0257827 A1 | 11/2005 | Gaudiana et al. |
| 2005/0269988 A1 | 12/2005 | Thrap |
| 2005/0275386 A1 | 12/2005 | Jepsen et al. |
| 2005/0275527 A1 | 12/2005 | Kates |
| 2005/0281064 A1 | 12/2005 | Olsen et al. |
| 2006/0001406 A1 | 1/2006 | Matan |
| 2006/0017327 A1 | 1/2006 | Siri et al. |
| 2006/0034106 A1 | 2/2006 | Johnson |
| 2006/0038692 A1 | 2/2006 | Schnetker |
| 2006/0043792 A1 | 3/2006 | Hjort et al. |
| 2006/0044018 A1 | 3/2006 | Chang |
| 2006/0044857 A1* | 3/2006 | Lemak ............... H02M 7/487 |
| | | 363/132 |
| 2006/0053447 A1 | 3/2006 | Krzyzanowski et al. |
| 2006/0066349 A1 | 3/2006 | Murakami |
| 2006/0068239 A1 | 3/2006 | Norimatsu et al. |
| 2006/0103360 A9 | 5/2006 | Cutler |
| 2006/0108979 A1 | 5/2006 | Daniel et al. |
| 2006/0113843 A1 | 6/2006 | Beveridge |
| 2006/0113979 A1 | 6/2006 | Ishigaki et al. |
| 2006/0118162 A1 | 6/2006 | Saelzer et al. |
| 2006/0132102 A1 | 6/2006 | Harvey |
| 2006/0149396 A1 | 7/2006 | Templeton |
| 2006/0162772 A1 | 7/2006 | Presher et al. |
| 2006/0163946 A1 | 7/2006 | Henne et al. |
| 2006/0164065 A1 | 7/2006 | Hoouk et al. |
| 2006/0171182 A1 | 8/2006 | Siri et al. |
| 2006/0174939 A1 | 8/2006 | Matan |
| 2006/0176029 A1 | 8/2006 | McGinty et al. |
| 2006/0176031 A1 | 8/2006 | Forman et al. |
| 2006/0176036 A1 | 8/2006 | Flatness et al. |
| 2006/0176716 A1 | 8/2006 | Balakrishnan et al. |
| 2006/0185727 A1 | 8/2006 | Matan |
| 2006/0192540 A1 | 8/2006 | Balakrishnan et al. |
| 2006/0197112 A1* | 9/2006 | Uchihara ............... H01L 31/12 |
| | | 257/213 |
| 2006/0208660 A1 | 9/2006 | Shinmura et al. |
| 2006/0222916 A1 | 10/2006 | Norimatsu et al. |
| 2006/0225781 A1 | 10/2006 | Locher |
| 2006/0227578 A1 | 10/2006 | Datta et al. |
| 2006/0231132 A1 | 10/2006 | Neussner |
| 2006/0232220 A1 | 10/2006 | Melis |
| 2006/0237058 A1 | 10/2006 | McClintock et al. |
| 2006/0261751 A1 | 11/2006 | Okabe et al. |
| 2006/0290317 A1 | 12/2006 | McNulty et al. |
| 2007/0001653 A1 | 1/2007 | Xu |
| 2007/0013349 A1 | 1/2007 | Bassett |
| 2007/0019613 A1 | 1/2007 | Frezzolini |
| 2007/0024257 A1 | 2/2007 | Boldo |
| 2007/0027644 A1 | 2/2007 | Bettenwort et al. |
| 2007/0030068 A1 | 2/2007 | Motonobu et al. |
| 2007/0035975 A1 | 2/2007 | Dickerson et al. |
| 2007/0040540 A1 | 2/2007 | Cutler |
| 2007/0044837 A1 | 3/2007 | Simburger et al. |
| 2007/0075689 A1 | 4/2007 | Kinder et al. |
| 2007/0075711 A1 | 4/2007 | Blanc et al. |
| 2007/0081364 A1 | 4/2007 | Andreycak |
| 2007/0103108 A1 | 5/2007 | Capp et al. |
| 2007/0107767 A1 | 5/2007 | Hayden et al. |
| 2007/0119718 A1 | 5/2007 | Gibson et al. |
| 2007/0121648 A1 | 5/2007 | Hahn |
| 2007/0133241 A1 | 6/2007 | Mumtaz et al. |
| 2007/0133421 A1 | 6/2007 | Young |
| 2007/0147075 A1 | 6/2007 | Bang |
| 2007/0158185 A1 | 7/2007 | Andelman et al. |
| 2007/0159866 A1 | 7/2007 | Siri |
| 2007/0164612 A1 | 7/2007 | Wendt et al. |
| 2007/0164750 A1 | 7/2007 | Chen et al. |
| 2007/0165347 A1 | 7/2007 | Wendt et al. |
| 2007/0205778 A1 | 9/2007 | Fabbro et al. |
| 2007/0209656 A1 | 9/2007 | Lee |
| 2007/0211888 A1 | 9/2007 | Corcoran et al. |
| 2007/0227574 A1 | 10/2007 | Cart |
| 2007/0235071 A1 | 10/2007 | Work et al. |
| 2007/0236187 A1 | 10/2007 | Wai et al. |

(56) References Cited

U.S. PATENT DOCUMENTS

| | | |
|---|---|---|
| 2007/0247877 A1 | 10/2007 | Kwon et al. |
| 2007/0271006 A1 | 11/2007 | Golden et al. |
| 2007/0273342 A1 | 11/2007 | Kataoka et al. |
| 2007/0273351 A1 | 11/2007 | Matan |
| 2007/0290636 A1 | 12/2007 | Beck et al. |
| 2007/0290656 A1 | 12/2007 | Lee Tai Keung |
| 2007/0296383 A1 | 12/2007 | Xu et al. |
| 2008/0021707 A1 | 1/2008 | Bou-Ghazale et al. |
| 2008/0024098 A1 | 1/2008 | Hojo |
| 2008/0036440 A1 | 2/2008 | Garmer |
| 2008/0055941 A1 | 3/2008 | Victor et al. |
| 2008/0080177 A1 | 4/2008 | Chang |
| 2008/0088184 A1 | 4/2008 | Tung et al. |
| 2008/0089277 A1 | 4/2008 | Alexander et al. |
| 2008/0097655 A1 | 4/2008 | Hadar et al. |
| 2008/0106250 A1 | 5/2008 | Prior et al. |
| 2008/0111529 A1 | 5/2008 | Shah et al. |
| 2008/0115823 A1 | 5/2008 | Kinsey |
| 2008/0121272 A1 | 5/2008 | Besser et al. |
| 2008/0122449 A1 | 5/2008 | Besser et al. |
| 2008/0122518 A1 | 5/2008 | Besser et al. |
| 2008/0136367 A1 | 6/2008 | Adest et al. |
| 2008/0143188 A1 | 6/2008 | Adest et al. |
| 2008/0143462 A1 | 6/2008 | Belisle et al. |
| 2008/0144294 A1 | 6/2008 | Adest et al. |
| 2008/0147335 A1 | 6/2008 | Adest et al. |
| 2008/0149167 A1 | 6/2008 | Liu |
| 2008/0150366 A1 | 6/2008 | Adest et al. |
| 2008/0150484 A1 | 6/2008 | Kimball et al. |
| 2008/0164766 A1 | 7/2008 | Adest et al. |
| 2008/0179949 A1 | 7/2008 | Besser et al. |
| 2008/0191560 A1 | 8/2008 | Besser et al. |
| 2008/0191675 A1 | 8/2008 | Besser et al. |
| 2008/0198523 A1 | 8/2008 | Schmidt et al. |
| 2008/0205096 A1 | 8/2008 | Lai et al. |
| 2008/0218152 A1 | 9/2008 | Bo |
| 2008/0224652 A1 | 9/2008 | Zhu et al. |
| 2008/0236647 A1 | 10/2008 | Gibson et al. |
| 2008/0236648 A1 | 10/2008 | Klein et al. |
| 2008/0238195 A1 | 10/2008 | Shaver et al. |
| 2008/0238372 A1 | 10/2008 | Cintra et al. |
| 2008/0246460 A1 | 10/2008 | Smith |
| 2008/0246463 A1 | 10/2008 | Sinton et al. |
| 2008/0252273 A1 | 10/2008 | Woo et al. |
| 2008/0264470 A1 | 10/2008 | Masuda et al. |
| 2008/0266919 A1 | 10/2008 | Mallwitz |
| 2008/0291707 A1 | 11/2008 | Fang |
| 2008/0294472 A1 | 11/2008 | Yamada |
| 2008/0303503 A1 | 12/2008 | Wolfs |
| 2008/0304296 A1 | 12/2008 | NadimpalliRaju et al. |
| 2008/0304298 A1 | 12/2008 | Toba |
| 2009/0012917 A1 | 1/2009 | Thompson et al. |
| 2009/0014050 A1 | 1/2009 | Haaf |
| 2009/0020151 A1 | 1/2009 | Fornage |
| 2009/0021877 A1 | 1/2009 | Fornage et al. |
| 2009/0039852 A1 | 2/2009 | Fishelov et al. |
| 2009/0066357 A1 | 3/2009 | Fornage |
| 2009/0066399 A1 | 3/2009 | Chen et al. |
| 2009/0069950 A1 | 3/2009 | Kurokami et al. |
| 2009/0073726 A1 | 3/2009 | Babcock |
| 2009/0080226 A1 | 3/2009 | Fornage |
| 2009/0084570 A1 | 4/2009 | Gherardini et al. |
| 2009/0097172 A1 | 4/2009 | Bremicker et al. |
| 2009/0101191 A1 | 4/2009 | Beck et al. |
| 2009/0102440 A1 | 4/2009 | Coles |
| 2009/0114263 A1 | 5/2009 | Powell et al. |
| 2009/0120485 A1 | 5/2009 | Kikinis |
| 2009/0121549 A1 | 5/2009 | Leonard |
| 2009/0133736 A1 | 5/2009 | Powell et al. |
| 2009/0140715 A1 | 6/2009 | Adest et al. |
| 2009/0141522 A1 | 6/2009 | Adest et al. |
| 2009/0145480 A1 | 6/2009 | Adest et al. |
| 2009/0146667 A1 | 6/2009 | Adest et al. |
| 2009/0146671 A1 | 6/2009 | Gazit |
| 2009/0147554 A1 | 6/2009 | Adest et al. |
| 2009/0150005 A1 | 6/2009 | Hadar et al. |
| 2009/0179662 A1 | 7/2009 | Moulton et al. |
| 2009/0182532 A1 | 7/2009 | Stoeber et al. |
| 2009/0184746 A1 | 7/2009 | Fahrenbruch |
| 2009/0189456 A1 | 7/2009 | Skutt |
| 2009/0190275 A1 | 7/2009 | Gilmore et al. |
| 2009/0195081 A1 | 8/2009 | Quardt et al. |
| 2009/0196764 A1 | 8/2009 | Fogarty et al. |
| 2009/0206666 A1 | 8/2009 | Sella et al. |
| 2009/0207543 A1 | 8/2009 | Boniface et al. |
| 2009/0217965 A1 | 9/2009 | Dougal et al. |
| 2009/0224817 A1 | 9/2009 | Nakamura et al. |
| 2009/0234692 A1 | 9/2009 | Powell et al. |
| 2009/0237042 A1 | 9/2009 | Glovinski |
| 2009/0237043 A1 | 9/2009 | Glovinsky |
| 2009/0242011 A1 | 10/2009 | Proisy et al. |
| 2009/0273241 A1 | 11/2009 | Gazit et al. |
| 2009/0278496 A1 | 11/2009 | Nakao et al. |
| 2009/0282755 A1 | 11/2009 | Abbott et al. |
| 2009/0283129 A1 | 11/2009 | Foss |
| 2009/0283130 A1 | 11/2009 | Gilmore et al. |
| 2009/0284232 A1 | 11/2009 | Zhang et al. |
| 2009/0284998 A1 | 11/2009 | Zhang et al. |
| 2009/0295225 A1 | 12/2009 | Asplund et al. |
| 2009/0322494 A1 | 12/2009 | Lee |
| 2010/0001587 A1 | 1/2010 | Casey et al. |
| 2010/0002349 A1 | 1/2010 | La Scala et al. |
| 2010/0013452 A1 | 1/2010 | Tang et al. |
| 2010/0026097 A1 | 2/2010 | Avrutsky et al. |
| 2010/0052735 A1 | 3/2010 | Burkland et al. |
| 2010/0057267 A1 | 3/2010 | Liu et al. |
| 2010/0060000 A1 | 3/2010 | Scholte-Wassink |
| 2010/0060235 A1 | 3/2010 | Dommaschk et al. |
| 2010/0085670 A1 | 4/2010 | Palaniswami et al. |
| 2010/0115093 A1 | 5/2010 | Rice |
| 2010/0124027 A1 | 5/2010 | Handelsman et al. |
| 2010/0127570 A1 | 5/2010 | Hadar et al. |
| 2010/0127571 A1 | 5/2010 | Hadar et al. |
| 2010/0132757 A1 | 6/2010 | He et al. |
| 2010/0132758 A1 | 6/2010 | Gilmore |
| 2010/0133911 A1 | 6/2010 | Williams et al. |
| 2010/0139734 A1 | 6/2010 | Hadar et al. |
| 2010/0139743 A1 | 6/2010 | Hadar et al. |
| 2010/0176773 A1 | 7/2010 | Capel |
| 2010/0181957 A1 | 7/2010 | Goeltner |
| 2010/0191383 A1 | 7/2010 | Gaul |
| 2010/0207764 A1 | 8/2010 | Muhlberger et al. |
| 2010/0207770 A1 | 8/2010 | Thiemann |
| 2010/0208501 A1 | 8/2010 | Matan et al. |
| 2010/0214808 A1 | 8/2010 | Rodriguez |
| 2010/0229915 A1 | 9/2010 | Ledenev et al. |
| 2010/0244575 A1 | 9/2010 | Coccia et al. |
| 2010/0264736 A1 | 10/2010 | Mumtaz et al. |
| 2010/0266875 A1 | 10/2010 | Somogye et al. |
| 2010/0269430 A1 | 10/2010 | Haddock |
| 2010/0277001 A1 | 11/2010 | Wagoner |
| 2010/0282290 A1 | 11/2010 | Schwarze et al. |
| 2010/0286836 A1 | 11/2010 | Shaver, II et al. |
| 2010/0288327 A1 | 11/2010 | Lisi et al. |
| 2010/0294528 A1 | 11/2010 | Sella et al. |
| 2010/0294903 A1 | 11/2010 | Shmukler et al. |
| 2010/0295680 A1 | 11/2010 | Dumps |
| 2010/0297860 A1 | 11/2010 | Shmukler et al. |
| 2010/0301991 A1 | 12/2010 | Sella et al. |
| 2010/0308662 A1 | 12/2010 | Schatz et al. |
| 2010/0309692 A1 | 12/2010 | Chisenga et al. |
| 2010/0321148 A1 | 12/2010 | Gevorkian |
| 2010/0326809 A1 | 12/2010 | Lang et al. |
| 2010/0327657 A1 | 12/2010 | Kuran |
| 2010/0327659 A1 | 12/2010 | Lisi et al. |
| 2010/0332047 A1 | 12/2010 | Arditi et al. |
| 2011/0006743 A1 | 1/2011 | Fabbro |
| 2011/0012430 A1 | 1/2011 | Cheng et al. |
| 2011/0013438 A1 | 1/2011 | Frisch et al. |
| 2011/0025130 A1 | 2/2011 | Hadar et al. |
| 2011/0031946 A1 | 2/2011 | Egan et al. |
| 2011/0037600 A1 | 2/2011 | Takehara et al. |
| 2011/0043172 A1 | 2/2011 | Dearn |
| 2011/0045802 A1 | 2/2011 | Bland et al. |

(56) References Cited

U.S. PATENT DOCUMENTS

| | | |
|---|---|---|
| 2011/0049990 A1 | 3/2011 | Amaratunga et al. |
| 2011/0050190 A1 | 3/2011 | Avrutsky |
| 2011/0056533 A1 | 3/2011 | Kuan |
| 2011/0061705 A1 | 3/2011 | Croft et al. |
| 2011/0061713 A1 | 3/2011 | Powell et al. |
| 2011/0062784 A1 | 3/2011 | Wolfs |
| 2011/0065161 A1 | 3/2011 | Kwasinski et al. |
| 2011/0079263 A1 | 4/2011 | Avrutsky |
| 2011/0083733 A1 | 4/2011 | Marroquin et al. |
| 2011/0084553 A1 | 4/2011 | Adest et al. |
| 2011/0110136 A1 | 5/2011 | Lacarnoy |
| 2011/0114154 A1 | 5/2011 | Lichy et al. |
| 2011/0115295 A1 | 5/2011 | Moon et al. |
| 2011/0121652 A1 | 5/2011 | Sella et al. |
| 2011/0125431 A1 | 5/2011 | Adest et al. |
| 2011/0132424 A1 | 6/2011 | Rakib |
| 2011/0133552 A1 | 6/2011 | Binder et al. |
| 2011/0139213 A1 | 6/2011 | Lee |
| 2011/0140536 A1 | 6/2011 | Adest et al. |
| 2011/0161722 A1 | 6/2011 | Makhota et al. |
| 2011/0172842 A1 | 7/2011 | Makhota et al. |
| 2011/0173276 A1 | 7/2011 | Eizips et al. |
| 2011/0181251 A1 | 7/2011 | Porter et al. |
| 2011/0181340 A1 | 7/2011 | Gazit |
| 2011/0210610 A1 | 9/2011 | Mitsuoka et al. |
| 2011/0210611 A1 | 9/2011 | Ledenev et al. |
| 2011/0210612 A1 | 9/2011 | Leutwein |
| 2011/0215866 A1 | 9/2011 | Dawson et al. |
| 2011/0218687 A1 | 9/2011 | Hadar et al. |
| 2011/0227411 A1 | 9/2011 | Arditi |
| 2011/0232714 A1 | 9/2011 | Bhavaraju et al. |
| 2011/0245989 A1 | 10/2011 | Makhota et al. |
| 2011/0246338 A1 | 10/2011 | Eich |
| 2011/0254372 A1 | 10/2011 | Haines et al. |
| 2011/0260866 A1 | 10/2011 | Avrutsky et al. |
| 2011/0267859 A1 | 11/2011 | Chapman |
| 2011/0271611 A1 | 11/2011 | Maracci et al. |
| 2011/0273015 A1 | 11/2011 | Adest et al. |
| 2011/0273016 A1 | 11/2011 | Adest et al. |
| 2011/0273302 A1 | 11/2011 | Fornage et al. |
| 2011/0280052 A1* | 11/2011 | Al-Haddad ............ H02M 7/483 363/84 |
| 2011/0285205 A1 | 11/2011 | Ledenev et al. |
| 2011/0290317 A1 | 12/2011 | Naumovitz et al. |
| 2011/0291486 A1 | 12/2011 | Adest et al. |
| 2011/0301772 A1 | 12/2011 | Zuercher et al. |
| 2011/0304204 A1 | 12/2011 | Avrutsky et al. |
| 2011/0304213 A1 | 12/2011 | Avrutsky et al. |
| 2011/0304215 A1 | 12/2011 | Avrutsky et al. |
| 2011/0316346 A1 | 12/2011 | Porter et al. |
| 2012/0007613 A1 | 1/2012 | Gazit |
| 2012/0019966 A1 | 1/2012 | DeBoer |
| 2012/0032515 A1 | 2/2012 | Ledenev et al. |
| 2012/0033463 A1 | 2/2012 | Rodriguez |
| 2012/0039099 A1 | 2/2012 | Rodriguez |
| 2012/0043818 A1 | 2/2012 | Stratakos et al. |
| 2012/0044014 A1 | 2/2012 | Stratakos et al. |
| 2012/0048325 A1 | 3/2012 | Matsuo et al. |
| 2012/0056483 A1 | 3/2012 | Capp et al. |
| 2012/0068555 A1 | 3/2012 | Aiello et al. |
| 2012/0081009 A1 | 4/2012 | Shteynberg et al. |
| 2012/0087159 A1 | 4/2012 | Chapman et al. |
| 2012/0091810 A1 | 4/2012 | Aiello et al. |
| 2012/0106210 A1 | 5/2012 | Xu et al. |
| 2012/0112545 A1 | 5/2012 | Aiello et al. |
| 2012/0113554 A1 | 5/2012 | Paoletti et al. |
| 2012/0119584 A1 | 5/2012 | Hadar et al. |
| 2012/0120691 A1 | 5/2012 | Armschat et al. |
| 2012/0146420 A1 | 6/2012 | Wolfs |
| 2012/0161528 A1 | 6/2012 | Mumtaz et al. |
| 2012/0161858 A1 | 6/2012 | Permuy et al. |
| 2012/0163057 A1 | 6/2012 | Permuy et al. |
| 2012/0174961 A1 | 7/2012 | Larson et al. |
| 2012/0199172 A1 | 8/2012 | Avrutsky |
| 2012/0200163 A1 | 8/2012 | Ito et al. |
| 2012/0205981 A1 | 8/2012 | Varma et al. |
| 2012/0215367 A1 | 8/2012 | Eizips et al. |
| 2012/0217943 A1 | 8/2012 | Haddad |
| 2012/0217973 A1 | 8/2012 | Avrutsky |
| 2012/0218785 A1 | 8/2012 | Li et al. |
| 2012/0218795 A1 | 8/2012 | Mihalache |
| 2012/0223583 A1 | 9/2012 | Cooley et al. |
| 2012/0229264 A1 | 9/2012 | Company Bosch et al. |
| 2012/0240490 A1 | 9/2012 | Gangemi |
| 2012/0253533 A1 | 10/2012 | Eizips et al. |
| 2012/0253541 A1 | 10/2012 | Arditi et al. |
| 2012/0255591 A1 | 10/2012 | Arditi et al. |
| 2013/0002215 A1 | 1/2013 | Ikeda et al. |
| 2013/0014384 A1 | 1/2013 | Xue et al. |
| 2013/0026839 A1 | 1/2013 | Grana |
| 2013/0026840 A1 | 1/2013 | Arditi et al. |
| 2013/0026842 A1 | 1/2013 | Arditi et al. |
| 2013/0026843 A1 | 1/2013 | Arditi et al. |
| 2013/0033907 A1 | 2/2013 | Zhou et al. |
| 2013/0044527 A1 | 2/2013 | Vracar et al. |
| 2013/0051094 A1 | 2/2013 | Bendre et al. |
| 2013/0094262 A1 | 4/2013 | Avrutsky |
| 2013/0128629 A1 | 5/2013 | Clare et al. |
| 2013/0128636 A1 | 5/2013 | Trainer et al. |
| 2013/0134790 A1 | 5/2013 | Amaratunga et al. |
| 2013/0154716 A1 | 6/2013 | Degener et al. |
| 2013/0163292 A1 | 6/2013 | Basic et al. |
| 2013/0181533 A1 | 7/2013 | Capp et al. |
| 2013/0188406 A1 | 7/2013 | Pouliquen et al. |
| 2013/0192657 A1 | 8/2013 | Hadar et al. |
| 2013/0208514 A1 | 8/2013 | Trainer et al. |
| 2013/0208521 A1 | 8/2013 | Trainer et al. |
| 2013/0221678 A1 | 8/2013 | Zhang et al. |
| 2013/0222144 A1 | 8/2013 | Hadar et al. |
| 2013/0223651 A1 | 8/2013 | Hoyerby |
| 2013/0229834 A1 | 9/2013 | Garrity et al. |
| 2013/0229842 A1 | 9/2013 | Garrity |
| 2013/0234518 A1 | 9/2013 | Mumtaz et al. |
| 2013/0235626 A1 | 9/2013 | Jang et al. |
| 2013/0235637 A1 | 9/2013 | Rodriguez |
| 2013/0249322 A1 | 9/2013 | Zhang et al. |
| 2013/0264876 A1 | 10/2013 | Paakkinen |
| 2013/0272045 A1 | 10/2013 | Soeiro et al. |
| 2013/0279210 A1 | 10/2013 | Chisenga et al. |
| 2013/0279211 A1 | 10/2013 | Green et al. |
| 2013/0294126 A1 | 11/2013 | Garrity et al. |
| 2013/0307556 A1 | 11/2013 | Ledenev et al. |
| 2013/0314957 A1 | 11/2013 | Gupta et al. |
| 2013/0322142 A1 | 12/2013 | Raju |
| 2013/0332093 A1 | 12/2013 | Adest et al. |
| 2013/0343106 A1 | 12/2013 | Perreault et al. |
| 2013/0343107 A1 | 12/2013 | Perreault |
| 2014/0003101 A1 | 1/2014 | Tang et al. |
| 2014/0022738 A1 | 1/2014 | Hiller et al. |
| 2014/0046500 A1 | 2/2014 | Varma |
| 2014/0049230 A1 | 2/2014 | Weyh |
| 2014/0097808 A1 | 4/2014 | Clark et al. |
| 2014/0106470 A1 | 4/2014 | Kopacka et al. |
| 2014/0118158 A1 | 5/2014 | Parra et al. |
| 2014/0125241 A1 | 5/2014 | Elferich et al. |
| 2014/0167715 A1 | 6/2014 | Wu et al. |
| 2014/0191583 A1 | 7/2014 | Chisenga et al. |
| 2014/0198542 A1 | 7/2014 | Swamy |
| 2014/0198547 A1 | 7/2014 | Heo et al. |
| 2014/0198548 A1 | 7/2014 | Zhang et al. |
| 2014/0232364 A1 | 8/2014 | Thomas et al. |
| 2014/0246915 A1 | 9/2014 | Mumtaz |
| 2014/0246927 A1 | 9/2014 | Mumtaz |
| 2014/0252859 A1 | 9/2014 | Chisenga et al. |
| 2014/0265579 A1 | 9/2014 | Mumtaz |
| 2014/0293667 A1 | 10/2014 | Schroeder et al. |
| 2014/0300413 A1* | 10/2014 | Hoyerby et al. ..... H03K 17/687 330/251 |
| 2014/0306543 A1 | 10/2014 | Garrity et al. |
| 2014/0327313 A1 | 11/2014 | Arditi et al. |
| 2015/0009734 A1 | 1/2015 | Stahl et al. |
| 2015/0022006 A1 | 1/2015 | Garrity et al. |
| 2015/0028683 A1 | 1/2015 | Hadar et al. |
| 2015/0028692 A1 | 1/2015 | Makhota et al. |

(56) References Cited

U.S. PATENT DOCUMENTS

| | | | | |
|---|---|---|---|---|
| 2015/0258608 A1* | 9/2015 | Chow | | B22D 41/50 164/47 |
| 2015/0280608 A1 | 10/2015 | Yoscovich et al. | | |
| 2017/0310242 A1 | 10/2017 | Kifuji et al. | | |

FOREIGN PATENT DOCUMENTS

| | | |
|---|---|---|
| CA | 1183574 A | 3/1985 |
| CA | 2063243 A1 | 12/1991 |
| CA | 2301657 A1 | 3/1999 |
| CA | 2394761 A1 | 6/2001 |
| CA | 2658087 A1 | 6/2001 |
| CA | 2443450 A1 | 3/2005 |
| CA | 2572452 A1 | 1/2006 |
| CA | 2613038 A1 | 1/2007 |
| CA | 2704605 A1 | 5/2009 |
| CN | 2305016 Y | 1/1999 |
| CN | 1262552 A | 8/2000 |
| CN | 1064487 C | 4/2001 |
| CN | 1309451 A | 8/2001 |
| CN | 1362655 A | 8/2002 |
| CN | 2514538 Y | 10/2002 |
| CN | 1122905 C | 10/2003 |
| CN | 1185782 C | 1/2005 |
| CN | 2672938 Y | 1/2005 |
| CN | 1625037 A | 6/2005 |
| CN | 1245795 C | 3/2006 |
| CN | 1787717 A | 6/2006 |
| CN | 1841254 A | 10/2006 |
| CN | 1841823 A | 10/2006 |
| CN | 1892239 A | 1/2007 |
| CN | 1902809 A | 1/2007 |
| CN | 1929276 A | 3/2007 |
| CN | 1930925 A | 3/2007 |
| CN | 101030752 A | 9/2007 |
| CN | 101050770 A | 10/2007 |
| CN | 100371843 C | 2/2008 |
| CN | 101136129 A | 3/2008 |
| CN | 100426175 C | 10/2008 |
| CN | 101291129 A | 10/2008 |
| CN | 100431253 C | 11/2008 |
| CN | 201203438 Y | 3/2009 |
| CN | 101488271 A | 7/2009 |
| CN | 101488668 A | 7/2009 |
| CN | 101523230 A | 9/2009 |
| CN | 101527504 A | 9/2009 |
| CN | 101546964 A | 9/2009 |
| CN | 201332382 Y | 10/2009 |
| CN | 101692579 A | 4/2010 |
| CN | 101795057 A | 8/2010 |
| CN | 101902143 A | 12/2010 |
| CN | 101917016 A | 12/2010 |
| CN | 101944839 A | 1/2011 |
| CN | 101953060 A | 1/2011 |
| CN | 102013691 A | 4/2011 |
| CN | 102223099 A | 10/2011 |
| CN | 202103601 U | 1/2012 |
| CN | 102355152 A | 2/2012 |
| CN | 102511121 A | 6/2012 |
| CN | 102545681 A | 7/2012 |
| CN | 102594192 A | 7/2012 |
| CN | 202333835 U | 7/2012 |
| CN | 102629836 A | 8/2012 |
| CN | 102651612 A | 8/2012 |
| CN | 102664514 A | 9/2012 |
| CN | 102684204 A | 9/2012 |
| CN | 202444420 U | 9/2012 |
| CN | 102709941 A | 10/2012 |
| CN | 102723734 A | 10/2012 |
| CN | 102739080 A | 10/2012 |
| CN | 102763316 A | 10/2012 |
| CN | 102856881 A | 1/2013 |
| CN | 102868290 A | 1/2013 |
| CN | 102891602 A | 1/2013 |
| CN | 102959843 A | 3/2013 |
| CN | 102983002 | 3/2013 |
| CN | 103001519 A | 3/2013 |
| CN | 202798507 U | 3/2013 |
| CN | 103066573 A | 4/2013 |
| CN | 103066878 A | 4/2013 |
| CN | 103107720 A | 5/2013 |
| CN | 103116665 A | 5/2013 |
| CN | 103123664 A | 5/2013 |
| CN | 103176470 A | 6/2013 |
| CN | 202997660 U | 6/2013 |
| CN | 103199681 A | 7/2013 |
| CN | 103208929 A | 7/2013 |
| CN | 103219738 A | 7/2013 |
| CN | 103219896 A | 7/2013 |
| CN | 103236800 A | 8/2013 |
| CN | 103248112 A | 8/2013 |
| CN | 103280952 A | 9/2013 |
| CN | 103296885 A | 9/2013 |
| CN | 103311947 A | 9/2013 |
| CN | 103312209 A | 9/2013 |
| CN | 103312246 A | 9/2013 |
| CN | 103412528 A | 11/2013 |
| CN | 103441512 A | 12/2013 |
| CN | 103457501 A | 12/2013 |
| CN | 103518300 A | 1/2014 |
| CN | 203398807 U | 1/2014 |
| CN | 203399000 U | 1/2014 |
| CN | 103595284 A | 2/2014 |
| CN | 103607107 A | 2/2014 |
| CN | 103633870 A | 3/2014 |
| CN | 103701145 A | 4/2014 |
| CN | 103701350 A | 4/2014 |
| CN | 103731035 A | 4/2014 |
| CN | 103762873 A | 4/2014 |
| CN | 103762881 A | 4/2014 |
| DE | 3236071 A1 | 1/1984 |
| DE | 3525630 A1 | 1/1987 |
| DE | 3729000 A1 | 3/1989 |
| DE | 4019710 A1 | 1/1992 |
| DE | 4032569 A1 | 4/1992 |
| DE | 4232356 A1 | 3/1994 |
| DE | 4325436 A1 | 2/1995 |
| DE | 4328511 A1 | 3/1995 |
| DE | 19515786 A1 | 11/1995 |
| DE | 19502762 A1 | 8/1996 |
| DE | 19538946 C1 | 4/1997 |
| DE | 19609189 A1 | 9/1997 |
| DE | 19618882 A1 | 11/1997 |
| DE | 19701897 A1 | 7/1998 |
| DE | 19718046 A1 | 11/1998 |
| DE | 19732218 C1 | 3/1999 |
| DE | 19737286 A1 | 3/1999 |
| DE | 19838230 A1 | 2/2000 |
| DE | 19846818 A1 | 4/2000 |
| DE | 19904561 C1 | 8/2000 |
| DE | 19928809 A1 | 1/2001 |
| DE | 019937410 A1 | 2/2001 |
| DE | 19961705 A1 | 7/2001 |
| DE | 10064039 A1 | 12/2001 |
| DE | 10060108 A1 | 6/2002 |
| DE | 10103031 A1 | 7/2002 |
| DE | 10103431 A1 | 8/2002 |
| DE | 10136147 A1 | 2/2003 |
| DE | 10222621 A1 | 11/2003 |
| DE | 202004001246 U1 | 4/2004 |
| DE | 10345302 A1 | 4/2005 |
| DE | 102004043478 A1 | 4/2005 |
| DE | 69734495 T2 | 7/2006 |
| DE | 69735169 T2 | 8/2006 |
| DE | 102005018173 A1 | 10/2006 |
| DE | 102005020937 A1 | 11/2006 |
| DE | 102005030907 A1 | 1/2007 |
| DE | 102005032864 A1 | 1/2007 |
| DE | 102006023563 A1 | 11/2007 |
| DE | 102006026073 A1 | 12/2007 |
| DE | 102007050031 B3 | 4/2009 |
| DE | 102008057874 A1 | 5/2010 |
| DE | 102010010782 A1 | 9/2011 |

(56) References Cited

FOREIGN PATENT DOCUMENTS

| | | |
|---|---|---|
| DE | 112010002784 T5 | 8/2012 |
| DE | 102012202173 A1 | 8/2013 |
| DE | 102012202187 A1 | 8/2013 |
| DE | 102012005974 A1 | 9/2013 |
| EP | 0010811 A1 | 5/1980 |
| EP | 0027405 A1 | 4/1981 |
| EP | 0074848 A2 | 3/1983 |
| EP | 169673 A1 | 1/1986 |
| EP | 0178757 A2 | 4/1986 |
| EP | 0206253 A1 | 12/1986 |
| EP | 0231211 A1 | 8/1987 |
| EP | 0293219 A2 | 11/1988 |
| EP | 0340006 A2 | 11/1989 |
| EP | 419093 A2 | 3/1991 |
| EP | 420295 A1 | 4/1991 |
| EP | 0521467 A2 | 1/1993 |
| EP | 0576271 A2 | 12/1993 |
| EP | 0577334 A2 | 1/1994 |
| EP | 0580341 A2 | 1/1994 |
| EP | 604777 A1 | 7/1994 |
| EP | 0628901 A2 | 12/1994 |
| EP | 0642199 A1 | 3/1995 |
| EP | 0670915 A1 | 9/1995 |
| EP | 756178 A2 | 1/1997 |
| EP | 0756372 A1 | 1/1997 |
| EP | 0780750 A2 | 6/1997 |
| EP | 0809293 A1 | 11/1997 |
| EP | 827254 A2 | 3/1998 |
| EP | 0895146 A1 | 2/1999 |
| EP | 0906660 A1 | 4/1999 |
| EP | 0913918 A2 | 5/1999 |
| EP | 0947905 A2 | 10/1999 |
| EP | 1012886 A1 | 6/2000 |
| EP | 1024575 A2 | 8/2000 |
| EP | 1034465 A1 | 9/2000 |
| EP | 1035640 A1 | 9/2000 |
| EP | 1039620 A2 | 9/2000 |
| EP | 1039621 A2 | 9/2000 |
| EP | 1047179 A1 | 10/2000 |
| EP | 1113570 A1 | 7/2001 |
| EP | 1130770 A2 | 9/2001 |
| EP | 1143594 A2 | 10/2001 |
| EP | 1187291 A2 | 3/2002 |
| EP | 1235339 A2 | 8/2002 |
| EP | 1239573 A1 | 9/2002 |
| EP | 1239576 A2 | 9/2002 |
| EP | 1254505 A2 | 11/2002 |
| EP | 1271742 A2 | 1/2003 |
| EP | 1330009 A2 | 7/2003 |
| EP | 1339153 A2 | 8/2003 |
| EP | 1369983 A1 | 12/2003 |
| EP | 1376706 A2 | 1/2004 |
| EP | 1388774 A1 | 2/2004 |
| EP | 1400988 A2 | 3/2004 |
| EP | 1407534 A2 | 4/2004 |
| EP | 1418482 A1 | 5/2004 |
| EP | 1420976 A1 | 5/2004 |
| EP | 1429393 A2 | 6/2004 |
| EP | 1442473 A2 | 8/2004 |
| EP | 1447561 A1 | 8/2004 |
| EP | 1457857 A2 | 9/2004 |
| EP | 1463188 A2 | 9/2004 |
| EP | 1475882 A2 | 11/2004 |
| EP | 1503490 A1 | 2/2005 |
| EP | 1521345 A1 | 4/2005 |
| EP | 1526633 A2 | 4/2005 |
| EP | 1531542 A2 | 5/2005 |
| EP | 1531545 A2 | 5/2005 |
| EP | 1532727 A2 | 5/2005 |
| EP | 1552563 A2 | 7/2005 |
| EP | 1562281 A1 | 8/2005 |
| EP | 1580862 A1 | 9/2005 |
| EP | 1603212 A2 | 12/2005 |
| EP | 1610571 A2 | 12/2005 |
| EP | 1623495 A1 | 2/2006 |
| EP | 1657557 A1 | 5/2006 |
| EP | 1657797 A1 | 5/2006 |
| EP | 1657809 A1 | 5/2006 |
| EP | 1691246 A2 | 8/2006 |
| EP | 1706937 A1 | 10/2006 |
| EP | 1708070 A1 | 10/2006 |
| EP | 1713168 A2 | 10/2006 |
| EP | 1716272 A1 | 11/2006 |
| EP | 1728413 A1 | 12/2006 |
| EP | 1750193 A1 | 2/2007 |
| EP | 1766490 A1 | 3/2007 |
| EP | 1782146 A2 | 5/2007 |
| EP | 1785800 A1 | 5/2007 |
| EP | 1842121 A2 | 10/2007 |
| EP | 1859362 A1 | 11/2007 |
| EP | 1887675 A2 | 2/2008 |
| EP | 1901419 A2 | 3/2008 |
| EP | 1902349 A2 | 3/2008 |
| EP | 1911101 A1 | 4/2008 |
| EP | 1051799 B1 | 7/2008 |
| EP | 2048679 A1 | 4/2009 |
| EP | 2061088 A2 | 5/2009 |
| EP | 2092625 A2 | 8/2009 |
| EP | 2092631 A2 | 8/2009 |
| EP | 2110939 A1 | 10/2009 |
| EP | 2135348 A2 | 12/2009 |
| EP | 2144133 A1 | 1/2010 |
| EP | 2160828 A1 | 3/2010 |
| EP | 2178200 A1 | 4/2010 |
| EP | 2206159 A2 | 7/2010 |
| EP | 2232690 A1 | 9/2010 |
| EP | 2256579 A1 | 12/2010 |
| EP | 2312739 A1 | 4/2011 |
| EP | 2315328 A2 | 4/2011 |
| EP | 2321894 A1 | 5/2011 |
| EP | 2372893 A1 | 10/2011 |
| EP | 2374190 A1 | 10/2011 |
| EP | 2393178 A2 | 12/2011 |
| EP | 2408081 A1 | 1/2012 |
| EP | 2478610 A1 | 7/2012 |
| EP | 2495766 A1 | 9/2012 |
| EP | 2495858 A1 | 9/2012 |
| EP | 2533299 A1 | 12/2012 |
| EP | 2533412 A2 | 12/2012 |
| EP | 2549635 A1 | 1/2013 |
| EP | 2560276 A1 | 2/2013 |
| EP | 2561596 A2 | 2/2013 |
| EP | 2562776 A1 | 2/2013 |
| EP | 2568589 A1 | 3/2013 |
| EP | 2568591 A1 | 3/2013 |
| EP | 2590312 A1 | 5/2013 |
| EP | 2596980 A2 | 5/2013 |
| EP | 2621045 A1 | 7/2013 |
| EP | 2621076 A1 | 7/2013 |
| EP | 2650999 A2 | 10/2013 |
| EP | 2654201 A2 | 10/2013 |
| EP | 2666222 A1 | 11/2013 |
| EP | 2677653 A1 | 12/2013 |
| EP | 2681835 A2 | 1/2014 |
| EP | 2693622 A1 | 2/2014 |
| EP | 2722979 A1 | 4/2014 |
| EP | 2738933 A1 | 6/2014 |
| EP | 2779251 A1 | 9/2014 |
| EP | 2779410 A2 | 9/2014 |
| EP | 2882084 A3 | 7/2015 |
| EP | 2651024 A3 | 5/2017 |
| ES | 2249147 A1 | 3/2006 |
| ES | 2249149 A1 | 3/2006 |
| FR | 2796216 A1 | 1/2001 |
| FR | 2819653 A1 | 7/2002 |
| GB | 1211885 A | 11/1970 |
| GB | 1261838 A | 1/1972 |
| GB | 1571681 A | 7/1980 |
| GB | 1597508 A | 9/1981 |
| GB | 2327208 A | 1/1999 |
| GB | 2339465 A | 1/2000 |
| GB | 2376801 A | 12/2002 |
| GB | 2399463 A | 9/2004 |
| GB | 2399465 A | 9/2004 |

(56) References Cited

FOREIGN PATENT DOCUMENTS

| | | | |
|---|---|---|---|
| GB | 2415841 A | 1/2006 |
| GB | 2419968 A | 5/2006 |
| GB | 2421847 A | 7/2006 |
| GB | 2476508 A | 6/2011 |
| GB | 2480015 A | 11/2011 |
| GB | 2480015 B | 12/2011 |
| GB | 2482653 A | 2/2012 |
| GB | 2483317 A | 3/2012 |
| GB | 2485527 A | 5/2012 |
| GB | 2486408 A | 6/2012 |
| GB | 2487368 A | 7/2012 |
| GB | 2497275 A | 6/2013 |
| GB | 2498365 A | 7/2013 |
| GB | 2498790 A | 7/2013 |
| GB | 2498791 A | 7/2013 |
| GB | 2499991 A | 9/2013 |
| JP | 61065320 A | 4/1986 |
| JP | H01311874 A | 12/1989 |
| JP | H04219982 A | 8/1992 |
| JP | H04364378 A | 12/1992 |
| JP | 8009557 A | 1/1996 |
| JP | H0897460 A | 4/1996 |
| JP | H08116628 A | 5/1996 |
| JP | H08185235 A | 7/1996 |
| JP | H08227324 A | 9/1996 |
| JP | H08316517 A | 11/1996 |
| JP | H08317664 A | 11/1996 |
| JP | H094692 A | 1/1997 |
| JP | H09148611 A | 6/1997 |
| JP | H09275644 A | 10/1997 |
| JP | 2676789 B2 | 11/1997 |
| JP | H1017445 A | 1/1998 |
| JP | H1075580 A | 3/1998 |
| JP | H10201086 A | 7/1998 |
| JP | H10285966 A | 10/1998 |
| JP | H1110353 A | 1/1999 |
| JP | 11041832 A | 2/1999 |
| JP | H1146457 A | 2/1999 |
| JP | 11103538 A | 4/1999 |
| JP | 2892183 B2 | 5/1999 |
| JP | 11206038 A | 7/1999 |
| JP | H11266545 A | 9/1999 |
| JP | 11289891 A | 10/1999 |
| JP | 11318042 A | 11/1999 |
| JP | 2000020150 A | 1/2000 |
| JP | 3015512 B2 | 3/2000 |
| JP | 2000160789 A | 6/2000 |
| JP | 2000166097 A | 6/2000 |
| JP | 2000174307 A | 6/2000 |
| JP | 2000232791 A | 8/2000 |
| JP | 2000232793 A | 8/2000 |
| JP | 2000316282 A | 11/2000 |
| JP | 2000324852 A | 11/2000 |
| JP | 2000339044 A | 12/2000 |
| JP | 2000341974 A | 12/2000 |
| JP | 2000347753 A | 12/2000 |
| JP | 2000358330 A | 12/2000 |
| JP | 2001060120 A | 3/2001 |
| JP | 2001075662 A | 3/2001 |
| JP | 2001178145 A | 6/2001 |
| JP | 2001189476 A | 7/2001 |
| JP | 2001224142 A | 8/2001 |
| JP | 2001250964 A | 9/2001 |
| JP | 2002073184 A | 3/2002 |
| JP | 2002238246 A | 8/2002 |
| JP | 2002270876 A | 9/2002 |
| JP | 2002300735 A | 10/2002 |
| JP | 2002339591 A | 11/2002 |
| JP | 2002354677 A | 12/2002 |
| JP | 2003102134 A | 4/2003 |
| JP | 2003124492 A | 4/2003 |
| JP | 2003134661 A | 5/2003 |
| JP | 2003134667 A | 5/2003 |
| JP | 2003289674 A | 10/2003 |
| JP | 2004055603 A | 2/2004 |
| JP | 2004111754 A | 4/2004 |
| JP | 2004194500 A | 7/2004 |
| JP | 2004260944 A | 9/2004 |
| JP | 2004-334704 A | 11/2004 |
| JP | 2004312994 A | 11/2004 |
| JP | 3656531 B2 | 6/2005 |
| JP | 2005192314 A | 7/2005 |
| JP | 2005251039 A | 9/2005 |
| JP | 2006041440 A | 2/2006 |
| JP | 2007058845 A | 3/2007 |
| JP | 2010-146047 A | 7/2010 |
| JP | 2010-220364 A | 9/2010 |
| JP | 2010245532 A | 10/2010 |
| JP | 2011-072118 A | 4/2011 |
| JP | 2011-130517 A | 6/2011 |
| JP | 2012-060735 A | 3/2012 |
| JP | 2012-065428 A | 3/2012 |
| JP | 2012511299 A | 5/2012 |
| JP | 2012-257451 A | 12/2012 |
| JP | 2013-055830 A | 3/2013 |
| JP | 2013-526247 A | 6/2013 |
| JP | 2013-258790 A | 12/2013 |
| JP | 2014-003821 A | 1/2014 |
| JP | 2014-050135 A | 3/2014 |
| KR | 20010044490 A | 6/2001 |
| KR | 20040086088 A | 10/2004 |
| KR | 100468127 B1 | 1/2005 |
| KR | 200402282 Y1 | 11/2005 |
| KR | 100725755 B1 | 5/2007 |
| KR | 100912892 B1 | 8/2009 |
| NL | 1011483 C2 | 9/2000 |
| WO | 8202134 A1 | 6/1982 |
| WO | 1982002134 A1 | 6/1982 |
| WO | 1984003402 A1 | 8/1984 |
| WO | 1988004801 A1 | 6/1988 |
| WO | 1992007418 A1 | 4/1992 |
| WO | 1993013587 A1 | 7/1993 |
| WO | 1996007130 A1 | 3/1996 |
| WO | 1996013093 A1 | 5/1996 |
| WO | 1998023021 A2 | 5/1998 |
| WO | 1999028801 A1 | 6/1999 |
| WO | 00/00839 A1 | 1/2000 |
| WO | 00/21178 A1 | 4/2000 |
| WO | 0075947 A1 | 12/2000 |
| WO | 0077522 A1 | 12/2000 |
| WO | 01047095 A2 | 6/2001 |
| WO | 0213364 A1 | 2/2002 |
| WO | 0231517 | 4/2002 |
| WO | 02056126 A1 | 7/2002 |
| WO | 0278164 A1 | 10/2002 |
| WO | 02078164 A1 | 10/2002 |
| WO | 02093655 A1 | 11/2002 |
| WO | 03012569 A1 | 2/2003 |
| WO | 2003012569 A1 | 2/2003 |
| WO | 2003050938 A2 | 6/2003 |
| WO | 2003071655 A1 | 8/2003 |
| WO | 03084041 A1 | 10/2003 |
| WO | 2004001942 A1 | 12/2003 |
| WO | 2004006342 A1 | 1/2004 |
| WO | 2004008619 A2 | 1/2004 |
| WO | 2004023278 A2 | 3/2004 |
| WO | 2004053993 A1 | 6/2004 |
| WO | 2004090993 A2 | 10/2004 |
| WO | 2004098261 A2 | 11/2004 |
| WO | 2004100344 A2 | 11/2004 |
| WO | 2004100348 A1 | 11/2004 |
| WO | 2004107543 A1 | 12/2004 |
| WO | 2005015584 A2 | 2/2005 |
| WO | 2005027300 A1 | 3/2005 |
| WO | 2005053189 A1 | 6/2005 |
| WO | 2005069096 A1 | 7/2005 |
| WO | 2005076444 A1 | 8/2005 |
| WO | 2005076445 A1 | 8/2005 |
| WO | 2005089030 A1 | 9/2005 |
| WO | 2005112551 A2 | 12/2005 |
| WO | 2005119609 A2 | 12/2005 |
| WO | 2005124498 A1 | 12/2005 |
| WO | 2006002380 A2 | 1/2006 |
| WO | 2006005125 A1 | 1/2006 |

(56) References Cited

FOREIGN PATENT DOCUMENTS

| | | |
|---|---|---|
| WO | 2006007198 A1 | 1/2006 |
| WO | 2006011071 A2 | 2/2006 |
| WO | 2006011359 A1 | 2/2006 |
| WO | 2006013600 A2 | 2/2006 |
| WO | 2006027744 A2 | 3/2006 |
| WO | 2006048688 A1 | 5/2006 |
| WO | 2006048689 A2 | 5/2006 |
| WO | 2006071436 A2 | 7/2006 |
| WO | 2006078685 A2 | 7/2006 |
| WO | 2006079503 A2 | 8/2006 |
| WO | 2006089778 A2 | 8/2006 |
| WO | 2006110613 A2 | 10/2006 |
| WO | 2007006564 A2 | 1/2007 |
| WO | 2007007360 A2 | 1/2007 |
| WO | 2007010326 A1 | 1/2007 |
| WO | 2007048421 A2 | 5/2007 |
| WO | 2007072517 A1 | 6/2007 |
| WO | 2007073951 A1 | 7/2007 |
| WO | 2007080429 A2 | 7/2007 |
| WO | 2007084196 A2 | 7/2007 |
| WO | 2007090476 A2 | 8/2007 |
| WO | 2007113358 A1 | 10/2007 |
| WO | 2007124518 A1 | 11/2007 |
| WO | 2008008528 A2 | 1/2008 |
| WO | 2008026207 A2 | 3/2008 |
| WO | 2008041983 A2 | 4/2008 |
| WO | 2008077473 A2 | 7/2008 |
| WO | 2008097591 A2 | 8/2008 |
| WO | 2008125915 A2 | 10/2008 |
| WO | 2008132551 A2 | 11/2008 |
| WO | 2008132553 A2 | 11/2008 |
| WO | 2008142480 A2 | 11/2008 |
| WO | 2009006879 A2 | 1/2009 |
| WO | 2009007782 A2 | 1/2009 |
| WO | 2009012008 A2 | 1/2009 |
| WO | 2009020917 A2 | 2/2009 |
| WO | 2009046533 A1 | 4/2009 |
| WO | 2009051221 A1 | 4/2009 |
| WO | 2009051222 A1 | 4/2009 |
| WO | 2009051853 A1 | 4/2009 |
| WO | 2009056957 A2 | 5/2009 |
| WO | 2009059028 A2 | 5/2009 |
| WO | 2009064683 A2 | 5/2009 |
| WO | 2009/072075 A2 | 6/2009 |
| WO | 2009/073867 A1 | 6/2009 |
| WO | 2009072077 A1 | 6/2009 |
| WO | 2009073868 A1 | 6/2009 |
| WO | 2009073995 A1 | 6/2009 |
| WO | 2009114341 A2 | 9/2009 |
| WO | 2009118682 A2 | 10/2009 |
| WO | 2009118683 A2 | 10/2009 |
| WO | 2009136358 A1 | 11/2009 |
| WO | 2009155392 A1 | 12/2009 |
| WO | 2010/002960 A1 | 1/2010 |
| WO | 2010014116 A1 | 2/2010 |
| WO | 2010037393 A1 | 4/2010 |
| WO | 2010051645 A1 | 5/2010 |
| WO | 2010062662 A2 | 6/2010 |
| WO | 2010065043 A1 | 6/2010 |
| WO | 2010065388 A1 | 6/2010 |
| WO | 2010072717 A1 | 7/2010 |
| WO | 2010078303 A2 | 7/2010 |
| WO | 2010091025 A2 | 8/2010 |
| WO | 2010094012 A1 | 8/2010 |
| WO | 2010134057 A1 | 11/2010 |
| WO | 20100134057 A1 | 11/2010 |
| WO | 2011005339 A1 | 1/2011 |
| WO | 2011011711 A1 | 1/2011 |
| WO | 2011014275 A1 | 2/2011 |
| WO | 2011017721 A1 | 2/2011 |
| WO | 2011023732 A2 | 3/2011 |
| WO | 2011028456 A2 | 3/2011 |
| WO | 2011028457 A2 | 3/2011 |
| WO | 2011059067 A1 | 5/2011 |
| WO | 2011074025 A1 | 6/2011 |
| WO | 2011085259 A2 | 7/2011 |
| WO | 2011-093269 A1 | 8/2011 |
| WO | 2011114816 A1 | 9/2011 |
| WO | 2011119587 A2 | 9/2011 |
| WO | 2011133843 A2 | 10/2011 |
| WO | 2011133928 A2 | 10/2011 |
| WO | 2011151672 A1 | 12/2011 |
| WO | 2012010053 A1 | 1/2012 |
| WO | 2012010054 A1 | 1/2012 |
| WO | 2012024984 A1 | 3/2012 |
| WO | 2012099176 A1 | 7/2012 |
| WO | 2012118654 A2 | 9/2012 |
| WO | 2012122689 A1 | 9/2012 |
| WO | 2012126160 A1 | 9/2012 |
| WO | 2012140008 A2 | 10/2012 |
| WO | 2012144662 A1 | 10/2012 |
| WO | 2013005498 A1 | 1/2013 |
| WO | 2013015921 A1 | 1/2013 |
| WO | 2013017353 A1 | 2/2013 |
| WO | 2013086445 A1 | 6/2013 |
| WO | 2013089425 A1 | 6/2013 |
| WO | 2013091675 A1 | 6/2013 |
| WO | 1998023021 A | 7/2013 |
| WO | 2013110371 A2 | 8/2013 |
| WO | 2013120664 A1 | 8/2013 |
| WO | 2013126660 A2 | 8/2013 |
| WO | 2013130563 A1 | 9/2013 |
| WO | 2013136377 A1 | 9/2013 |
| WO | 2013137749 A1 | 9/2013 |
| WO | 2013143037 A1 | 10/2013 |
| WO | 2013167189 A1 | 11/2013 |
| WO | 2013177303 A2 | 11/2013 |
| WO | 2013185825 A1 | 12/2013 |
| WO | 2014004065 A1 | 1/2014 |
| WO | 2014006200 A1 | 1/2014 |
| WO | 2014007432 A1 | 1/2014 |
| WO | 2014024185 A1 | 2/2014 |
| WO | 2014030202 A1 | 2/2014 |
| WO | 2014042118 A1 | 3/2014 |
| WO | 2014047733 A1 | 4/2014 |
| WO | 2014082221 A1 | 6/2014 |
| WO | 2014082655 A1 | 6/2014 |
| WO | 2014082657 A1 | 6/2014 |
| WO | 2014104839 A1 | 7/2014 |
| WO | 2015120023 A1 | 8/2015 |

OTHER PUBLICATIONS

C. Liu et al., "Advanced Algorithm for MPPT Control of Photovoltaic Systems", Canadian Solar Buildings Conference, Montreal, Aug. 20-24, 2004.
Chihchiang Hua and Chihming Shen, "Study of Maximum Power Tracking Techniques and Control of DC/DC Converters for Photovoltaic Power System", IEEE 1998.
Tore Skjellnes et al., "Load sharing for parallel inverters without communication", Nordic Workshop in Power and Industrial Electronics, Aug. 12-14, 2002.
Giorgio Spiazzi at el., "A New Family of Zero-Current-Switching Variable Frequency dc-dc Converters", IEEE 2000.
Nayar, C.V., M. Ashari and W.W.L Keerthiphala, "A Gridinteractive Photovoltaic Uninterruptible Power Supply System Using Battery Storage and a Back up Diesel Generator", IEEE Transactions on Energy Conversion, vol. 15, No. 3, Sep. 2000, pp. 348?353.
Ph. Strauss et al., "AC coupled PV Hybrid systems and Micro Grids—state of the art and future trends", 3rd World Conference on Photovoltaic Energy Conversion, Osaka, Japan May 11-18, 2003.
Nayar, C.V., abstract, Power Engineering Society Summer Meeting, 2000. IEEE, 2000, pp. 1280-1282 vol. 2.
D. C. Martins et al., "Analysis of Utility Interactive Photovoltaic Generation System using a Single Power Static Inverter", Asian J. Energy Environ., vol. 5, Issue 2, (2004), pp. 115-137.
Rafael C. Beltrame et al., "Decentralized Multi String PV System With Integrated ZVT Cell", Congresso Brasileiro de Automática / 12 a Sep. 16, 2010, Bonito-MS.
Sergio Busquets-Monge et al., "Multilevel Diode-clamped Converter for Photovoltaic Generators With Independent Voltage Con-

(56) References Cited

OTHER PUBLICATIONS trol of Each Solar Array", IEEE Transactions on Industrial Electronics, vol. 55, No. 7, Jul. 2008.
Soeren Baekhoej Kjaer et al., "A Review of Single-Phase Grid-Connected Inverters for Photovoltaic Modules", IEEE Transactions on Industry Applications, vol. 41, No. 5, Sep./Oct. 2005.
Office Action—JP 2011-539491—dated Mar. 26, 2013.
Supplementary European Search Report—EP08857456—dated Dec. 6, 2013.
Extended European Search Report—EP14151651.8—dated Feb. 25, 2014.
Iyomori H et al: "Three-phase bridge power block module type auxiliary resonant AC link snubber-assisted soft switching inverter for distributed AC power supply", Intelec 2003. 25th. International Telecommunications Energy Conference. Yokohama, Japan, Oct. 19-23, 2003; Tokyo, IEICE, JP, Oct. 23, 2003 (Oct. 23, 2003), pp. 650-656, XP031895550, ISBN: 978-4-88552-196-6.
Yuqing Tang: "High Power Inverter EMI characterization and Improvement Using Auxiliary Resonant Snubber Inverter", Dec. 17, 1998 (Dec. 17, 1998), XP055055241, Blacksburg, Virginia Retrieved from the Internet: URL:http:ijscholar.lib.vt.edu/theses/available/etd-012299-165108/unrestricted/THESIS. PDF, [retrieved on Mar. 5, 2013].
Yoshida M et al: "Actual efficiency and electromagnetic noises evaluations of a single inductor resonant AC link snubber-assisted three-phase soft-switching inverter", Intelec 2003. 25th. International Telecommunications Energy Conference. Yokohama, Japan, Oct. 19-23, 2003; Tokyo, IEICE, JP, Oct. 23, 2003 (Oct. 23, 2003), pp. 721-726, XP031895560, ISBN: 978-4-88552-196-6.
Third party observation—EP07874025.5—Mailing date: Aug. 6, 2011.
Extended European Search Report—EP 14159696—dated Jun. 20, 2014.
Meynard, T. A., and Henry Foch. "Multi-level conversion: high voltage choppers and voltage-source inverters." Power Electronics Specialists Conference, 1992. PESC'92 Record., 23rd Annual IEEE. IEEE, 1992.
Extended European Search Report—EP 13152967.9—dated Aug. 28, 2014.
Chen, et al., "Buck-Boost PWM Converters Having Two Independently Controlled Switches", IEEE Power Electronics Specialists Conference, Jun. 2001, Colorado Power Electronics Center Publications.
Chen, et al., "A New Low-Stress Buck-Boost Converter for Universal-Input PFC Applications", IEEE Applied Power Electronics Conference, Feb. 2001, Colorado Power Electronics Center Publications.
Walker, et al., "Photovoltaic DC-DC Module Integrated Converter for Novel Cascaded and Bypass Grid Connection Topologies—Design and Optimisation", 37th IEEE Power Electronics Specialists Conference, Jun. 18-22, 2006, Jeju, Korea.
Sandia Report SAND96-2797 I UC-1290 Unlimited Release, Printed Dec. 1996, "Photovoltaic Power Systems and The National Electrical Code: Suggested Practices", by John Wiles, Southwest Technology Development Institute New Mexico State University Las Cruces, NM.
John Xue, "PV Module Series String Balancing Converters", University of Queensland—School of Information Technology & Electrical Engineering, Nov. 6, 2002.
Mohammad Reza Amini et al., "Quasi Resonant DC Link Inverter with a Simple Auxiliary Circuit", Journal of Power Electronics, vol. 11, No. 1, Jan. 2011.
Walker, et al. "PV String Per-Module Maximum Power Point Enabling Converters", School of Information Technology and Electrical Engineering The University of Queensland, Sep. 28, 2003.
QT Technical Application Papers, "ABB Circuit-Breakers for Direct current Applications", ABB SACE S.p.A., An ABB Group Company, L.V. Breakers, Via Baioni, 35, 24123 Bergamo-Italy, Tel.: +39 035.395.111—Telefax: +39 035.395.306-433, Sep. 2007.
Gow Ja A et al: "A Modular DC-DC Converter and Maximum Power Tracking Controller Formedium to Large Scale Photovoltaic Generating Plant" 8th European Conference on Power Electronics and Applications. Lausaane, CH, Sep. 7-9, 1999, EPE. European Conference on Power Electronics and Applications, Brussls: EPE Association, BE, vol. Conf. 8, Sep. 7, 1999, pp. 1-8, XP000883026.
Chihchiang Hua et al: "Comparative Study of Peak Power Tracking Techniques for Solar Storage System" Applied Power Electronics Conference and Exposition, 1998. APEC '98. Conference Proceedings 1998, Thirteenth Annual Anaheim, CA USA Feb. 15-19, 1998, New York, NY, USA, IEEE, US, Feb. 15, 1998, pp. 679-685, XP010263666.
Matsuo H et al: "Novel Solar Cell Power Supply System Using the Miltiple-input DC-DC Converter" 20th International telecommunications Energy Conference. Intelec '98 San Francisco, CA, Oct. 4-8, 1998, Intelec International Telecommunications Energy Conference, New York, NY: IEEE, US, Oct. 4, 1998, pp. 797-802, XP000896384.
Chihchiang Hua et al: "DSP-based controller application in battery storage of photovoltaic system" Industrial Electronics, Control, and Instrumentation, 1996, Proceedings of the 1996 IEEE IECON 22nd International Conference on Taipei, Taiwan Aug. 5-10, 1996, New York, NY, USA, IEEE, US, Aug. 5, 1996, pp. 1705-1710, XP010203239.
Hua C et al: "Implementation of a DSP-Controlled Photovoltaic System with Peak Power Tracking" IEEE Transactions on industrial Electronics, IEEE, Inc. New York, US, vol. 45, No. 1, Feb. 1, 1998, pp. 99-107, XP000735209.
I. Weiss et al.: "A new PV system technology—the development of a magnetic power transmission from the PV module to the power bus" 16th European Photovoltaic Solar Energy Conference, vol. III, May 1-5, 2000, pp. 2096-2099, XP002193468 Glasgow,UK cited in the application.
Basso, Tim, "IEEE Standard for Interconnecting Distributed Resources With the Electric Power System," IEEE PES Meeting, Jun. 9, 2004.
Boostbuck.com, "The Four Boostbuck Topologies," located at http://www.boostbuck.com/TheFourTopologies.html, 2003.
Sautam, Nalin K. et al., "An Efficient Algorithm to Simulate the Electrical Performance of Solar Photovoltaic Arrays," Energy, vol. 27, No. 4, pp. 347-361, 2002.
Nordmann, T. et al., "Performance of PV Systems Under Real Conditions," European Workshop on Life Cycle Analysis and Recycling of Solar Modules, The "Waste" Challenge, Brussels, Belgium, Mar. 18-19, 2004.
Wiles, John, "Photovoltaic Power Systems and the National Electrical Code: Suggested Practices," Sandia National Laboratories, document No. SAND2001-0674, Mar. 2001.
Hewes, J. "Relays," located at http://web.archive.org/web/20030816010159/www.kpsec.freeuk.com/components/relay.htm, Aug. 16, 2003.
Definition of "remove" from Webster's Third New International Dictionary, Unabridged, 1993.
Definition of "removable" from Webster's Third New International Dictionary, Unabridged, 1993.
Advanced Energy Group, "The Basics of Solar Power Systems," located at http://web.archive.org/web/20010331044156/http://www.solar4power.com/solar-power-basics.html, Mar. 31, 2001.
International Patent Application No. PCT/AU2005/001017, International Search Report and Written Opinion, dated Aug. 18, 2005.
Baek, Ju-Won et al., "High Boost Converter using Voltage Multiplier," 2005 IEEE Conference, IECON 05, pp. 567-572, Nov. 2005.
Wikimedia Foundation, Inc., "Electric Power Transmission," located at http://web.archive.org/web/20041210095723/en.wikipedia.org/wiki/Electric-power-transmission, Nov. 17, 2004.
Jacobsen, K.S., "Synchronized Discrete Multi-Tone (SDMT) Modulation for Cable Modems: Making the Most of the Scarce Reverse Channel Bandwidth," Conference Proceedings of Wescon/97, pp. 374-380, Nov. 4, 1997.
Loyola, L. et al., "A Multi-Channel Infrastructure based on DCF Access Mechanism for Wireless LAN Mesh Networks Compliant with IEEE 802.11," 2005 Asia-Pacific Conference on Communications, pp. 497-501, Oct. 5, 2005.
Lee: "Novel Zero-Voltage-Transition and Zero-Current-Transition Pulse-Width-Modulation Converters", Power Electronics Special-

(56) References Cited

OTHER PUBLICATIONS ists Conference, 1997, PESC '97, Record, 28th Annual IEEE St. Louis, MO, USA, Jun. 22-27, 1997, New York, NY, USA IEEE, US, vol. 1, Jun. 22, 1997, pp. 233-239, XP010241553, ISBN: 978-0-7803-3840-1, pp. 233-236.
International Search Report and Opinion of International Patent Application PCT/2009/051221, dated Oct. 19, 2009.
Sakamoto, "Switched Snubber for High-Frequency Switching Converters", Electronics & Communications in Japan, Part 1—Communications, Wiley, Hoboken, NJ, US, vol. 76, No. 2, Feb. 1, 1993, pp. 30-38, XP000403018 ISSN: 8756-6621, pp. 30-35.
Duarte, "A Family of ZVX-PWM Active-Clamping DC-to-DC Converters: Synthesis, Analysis and Experimentation", Telecommunications Energy Conference, 1995, INTELEC '95, 17th International The Hague, Netherlands, Oct. 29- Nov. 1, 1995, New York, NY, US, IEEE, US, Oct. 29, 1995, pp. 502-509, XP010161283 ISBN: 978-0-7803-2750-4 p. 503-504.
International Search Report and Opinion of International Patent Application PCT/2009/051222, dated Oct. 7, 2009.
Communication in EP07874025.5 dated Aug. 17, 2011.
IPRP for PCT/IB2008/055095 dated Jun. 8, 2010, with Written Opinion.
ISR for PCT/IB2008/055095 dated Apr. 30, 2009.
IPRP for PCT/IL2007/001064 dated Mar. 17, 2009, with Written Opinion dated Mar. 25, 2008.
ISR for PCT/IL07/01064 dated Mar. 25, 2008.
IPRP for PCT/IB2007/004584 dated Jun. 10, 2009, with Written Opinion.
IPRP for PCT/IB2007/004586 dated Jun. 10, 2009, with Written Opinion.
IPRP for PCT/IB2007/004591 dated Jul. 13, 2010, with Written Opinion.
IPRP for PCT/IB2007/004643 dated Jun. 10, 2009, with Written Opinion.
Written Opinion for PCT/IB2008/055092 submitted with IPRP dated Jun. 8, 2010.
IPRP for PCT/US2008/085754 dated Jun. 8, 2010, with Written Opinion dated Jan. 21, 2009.
IPRP for PCT/US2008/085755 dated Jun. 8, 2010, with Written Opinion dated Jan. 20, 2009.
IPRP for PCT/IB2009/051221 dated Sep. 28, 2010, with Written Opinion.
IPRP for PCT/IB2009/051222 dated Sep. 28, 2010, with Written Opinion.
IPRP for PCT/IB2009/051831 dated Nov. 9, 2010, with Written Opinion.
IPRP for PCT/US2008/085736 dated Jun. 7, 2011, with Written Opinion.
IPRP for PCT/IB2010/052287 dated Nov. 22, 2011, with Written Opinion.
ISR for PCT/IB2010/052413 dated Sep. 7, 2010.
UK Intellectual Property Office, Application No. GB1109618.7, Patents Act 1977, Examination Report Under Section 18(3), dated Sep. 16, 2011.
UK Intellectual Property Office, Patents Act 1977: Patents Rules Notification of Grant: Patent Serial No. GB2480015, dated Nov. 29, 2011.
Geoffrey R. Walker Affidavit re: U.S. Appl. No. 11/950,307, submitted in an IDS for U.S. Appl. No. 11/950,271 on Mar. 9, 2010.
Geoffrey R. Walker Affidavit re: U.S. Appl. No. 11/950,271, submitted in an IDS for U.S. Appl. No. 11/950,271 on Mar. 9, 2010.
Gao, et al., "Parallel-Connected Solar PV System to Address Partial and Rapidly Fluctuating Shadow Conditions", IEEE Transactions on Industrial Electronics, vol. 56, No. 5, May 2009, pp. 1548-1556.
IPRP PCT/IB2007/004610—date of issue Jun. 10, 2009.
Extended European Search Report—EP12176089.6—dated Nov. 8, 2012.
Gwon-Jong Yu et al: "Maximum power point tracking with temperature compensation of photovoltaic for air conditioning system with fuzzy controller", May 13, 1996; May 13, 1996-May 17, 1996, May 13, 1996 ( May 13, 1996), pp. 1429-1432, XP010208423.
Extended European Search Report—EP12177067.1—dated Dec. 7, 2012.
GB Combined Search and Examination Report—GB1200423.0—dated Apr. 30, 2012.
GB Combined Search and Examination Report—GB1201499.9—dated May 28, 2012.
GB Combined Search and Examination Report—GB1201506.1—dated May 22, 2012.
GB Combined Search and Examination Report—GB1203763.6—dated Jun. 25, 2012.
Hou, et al., Application of Adaptive Algorithm of Solar Cell Battery Charger, Apr. 2004.
Stamenic, et al., "Maximum Power Point Tracking for Building Integrated Photovoltaic Ventilation Systems", 2000.
"Study of Energy Storage Capacitor Reduction for Single Phase PWM Rectifier", Ruxi Wang et al., Virginia Polytechnic Institute and State University, Feb. 2009.
"Multilevel Inverters: A Survey of Topologies, Controls, and Applications", José Rodriguez et al., IEEE Transactions on Industrial Electronics, vol. 49, No. 4, Aug. 2002.
Extended European Search Report—EP 08878650A—dated Mar. 28, 2013.
Satcon Solstice—Satcon Solstice 100 kW System Solution Sheet—2010.
Robert W. Erickson, "Future of Power Electronics for Photovoltaics", IEEE Applied Power Electronics Conference, Feb. 2009.
Khairy Fathy et al., "A Novel Quasi-Resonant Snubber-Assisted ZCS-PWM DC-DC Converter with High Frequency Link", Journal of Power Electronics, vol. 7, No. 2, Apr. 2007.
Cheng K.W.E., "New Generation of Switched Capacitor Converters", Department of Electrical Engineering, The Hong Kong Polytechnic University, Hung Horn, Hong Kong, Power Electronics Conference, 1998, PESC 98.
1999—Per Karlsson, "Quasi Resonant DC Link Converters—Analysis and Design for a Battery Charger Application", Universitetstryckeriet, Lund University, 1999, ISBN 91-88934-14-4; Added to Lund University Publications on Jun. 4, 2012.
Hsiao Sung-Hsin et al., "ZCS Switched-Capacitor Bidirectional Converters with Secondary Output Power Amplifier for Biomedical Applications", Power Electronics Conference (IPEC) Jun. 21, 2010.
Yuang-Shung Lee et al.,"A Novel QR ZCS Switched-Capacitor Bidirectional Converter", IEEE, 2007.
Antti Tolvanen et al., "Seminar on Solar Simulation Standards and Measurement Principles", May 9, 2006 Hawaii.
J.A. Eikelboom and M.J. Jansen, "Characterisation of PV Modules of New Generations—Results of tests and simulations", Jun. 2000.
Storfer, Lior, "Enhancing Cable Modem TCP Performance," Texas Instruments Inc. white paper, Jul. 2003.
Philips Semiconductors, Data Sheet PSMN005-55B; PSMN005-55P N-channel logic trenchMOS transistor, Oct. 1999, Product specification, pp. 1-11.
International Preliminary Report on Patentability Issued in corresponding international application No. PCT/US04/16668, filed May 27, 2004.
International Application No. PCT/US13/27965, International Preliminary Examination Report, dated Sep. 2, 2014.
International Patent Application PCT/US13/027965, International Search Report and Written Opinion, dated Jun. 2, 2013.
International Application No. PCT/US12/44045, International Preliminary Examination Report, dated Jan. 28, 2014.
International Patent Application No. PCT/US2012/044045, International Search Report and Written Opinion, dated Jan. 2, 2013.
International Patent Application No. PCT/US2009/047734, International Search Report and Written Opinion, dated May 4, 2010.
Linares, Leonor et al., "Improved Energy Capture in Series String Photovoltaics via Smart Distributed Power Electronics," 24th Annual IEEE Applied Power Electronics Conference and Exposition, pp. 904-910, Feb. 15, 2009.
International Patent Application No. PCT/US2010/029929, International Search Report and Written Opinion, dated Oct. 27, 2010.

(56) References Cited

OTHER PUBLICATIONS

Lowe, Electronics Basis: What is a Latch Circuit, http://www.dummies.com/how-to/content/electronics-basics-what-is-a-latch-circuit.html, from Electronics All-in-One for Dummies, Feb. 2012, downloaded Jul. 13, 2014.
International Patent Application No. PCT/US2011/020591, International Search Report and Written Opinion, dated Aug. 8, 2011.
International Patent Application No. PCT/US2011/033544, International Search Report and Written Opinion, dated Nov. 24, 2011.
J. Keller and B. Kroposki, titled, "Understanding Fault Characteristics of Inverter-Based Distributed Energy Resources", in a Technical Report NREL/TP-550-46698, published Jan. 2010, pp. 1 through 48.
International Patent Application No. PCT/US2008/081827, International Search Report and Written Opinion, dated Jun. 24, 2009.
International Patent Application No. PCT/US2010/046274 International Search Report and Written Opinion, dated Apr. 22, 2011.
International Patent Application No. PCT/US2011/033658, International Search Report and Written Opinion, dated Jan. 13, 2012.
International Patent Application No. PCT/US2011/029392, International Search Report and Written Opinion, dated Oct. 24, 2011.
European Patent Application No. 09829487.9, Extended Search Report, dated Apr. 21, 2011.
International Patent Application No. PCT/US2009/062536, International Search Report and Written Opinion, dated Jun. 17, 2010.
International Patent Application No. PCT/US2010/022915, International Search Report and Written Opinion, dated Aug. 23, 2010.
International Patent Application No. PCT/US2010/046272, International Search Report and Written Opinion, dated Mar. 31, 2011.
Exell et al., "The Design and Development of a Solar Powered Refrigerator", [retrieved on Feb. 13, 2013], Retrieved from the Internet <URL: http://www.appropedia.org/The_Design_and_Development_of_a_Solar_Powered_Refrigerator>, pp. 1-64.
"Development of Water-Lithium Bromide Low-Temperature Absorption Refridgerating Machine", 2002 Energy & Environment on Database on Noteworthy contributions for Science and Technology (Japan), Research Data (No. 1748) [online], [retrieved on Aug. 29, 2012]. Retrieved from the Internet: <URL: http://dbnstl.nii.ac.jp/english/detail/1748>, pp. 1-4.
Dictionary.com, "air conditioning" [online], [retrieved on Aug. 28, 2012]. Retrieved from the Internet: <URL: http://dictionary.reference.com/browse/air+conditioning?s=t>, pp. 1-3.
International Patent Application No. PCT/US2010/029936, International Search Report and Written Opinion, dated Nov. 12, 2010.
International Patent Application No. PCT/US08175127, International Search Report and Written Opinion, dated Apr. 28, 2009.
International Patent Application No. PCT/US09/35890, International Search Report and Written Opinion, dated Oct. 1, 2009.
European Patent Appilcation No. 08845104.2, Extended Search Report, dated Jul. 31, 2014.
European Patent Appilcation No. 11772811.3, Extended Search Report, dated Dec. 15, 2014.
International Patent Application No. PCT/US20081082935, International Search Report and Written Opinion, dated Jun. 25, 2009.
Bhatnagar et al., Silicon Carbide High Voltage (400 V) Shottky Barrier Diodes, IEEE Electron Device Letters, vol. 13 (10) p. 501-503 Oct. 10, 1992.
Rodriguez, C., and G. A. J. Amaratunga. "Dynamic stability of grid-connected photovoltaic systems." Power Engineering Society General Meeting, 2004. IEEE, pp. 2194-2200.
Kikuchi, Naoto, et al. "Single phase amplitude modulation inverter for utility interaction photovoltaic system." Industrial Electronics Society, 1999. IECON'99 Proceedings. The 25th Annual Conference of the IEEE vol. 1. IEEE, 1999.
Nonaka, Sakutaro, et al. "Interconnection system with single phase IGBT PWM CSI between photovoltaic arrays and the utility line." Industry Applications Society Annual Meeting, 1990., Conference Record of the 1990 IEEE.
Calais, Martina, et al. "Inverters for single-phase grid connected photovoltaic systems—an overview." Power Electronics Specialists Conference, 2002. pesc 02. 2002 IEEE 33rd Annual. vol. 4. IEEE, 2002.
Marra, Enes Goncalves, and José Antenor Pomilio. "Self-excited induction generator controlled by a VS-PWM bidirectional converter for rural applications." Industry Applications, IEEE Transactions on 35.4 (1999): 877-883.
Xiaofeng Sun, Weiyang Wu, Xin Li, Qinglin Zhao: A Research on Photovoltaic Energy Controlling System with Maximum Power Point Tracking:; Proceedings of the Power Conversion Conference—Osaka 2002 (Cat. No. 02TH8579) IEEE—Piscataway, NJ, USA, ISBN 0-7803-7156-9, vol. 2, p. 822-826, XP010590259: the whole document.
International Search Report for corresponding PCT/GB2005/050198 completed Jun. 28, 2006 by C. Wirner of the EPO.
Brunello, Gustavo, et al., "Shunt Capacitor Bank Fundamentals and Protection," 2003 Conference for Protective Relay Engineers, Apr. 8-10, 2003, pp. 1-17, Texas A&M University, College Station, TX, USA.
Cordonnier, Charles-Edouard, et al., "Application Considerations for Sensefet Power Devices," PCI Proceedings, May 11, 1987, pp. 47-65.
Kotsopoulos, Andrew, et al., "Predictive DC Voltage Control of Single-Phase PV Inverters with Small DC Link Capacitance," IEEE International Symposium, Month Unknown, 2003, pp. 793-797.
Meinhardt, Mike, et al., "Multi-String-Converter with Reduced Specific Costs and Enhanced Functionality," Solar Energy, May 21, 2001, pp. 217-227, vol. 69, Elsevier Science Ltd.
Kimball, et al.: "Analysis and Design of Switched Capacitor Converters"; Grainger Center for Electric Machinery and Electromechanics, University of Illinois at Urbana-Champaign, 1406 W. Green St, Urbana, IL 61801 USA, © 2005 IEEE; pp. 1473-1477.
Martins, et al.: "Interconnection of a Photovoltaic Panels Array to a Single-Phase Utility Line From a Static Conversion System"; Power Electronics Specialists Conference, 2000. PESC 00. 2000 IEEE 31st Annual; Jun. 18, 2000-Jun. 23, 2000; ISSN: 0275-9306; pp. 1207-1211, vol. 3.
International Search Report for corresponding PCT/GB2005/050197, completed Dec. 20, 2005 by K-R Zettler of the EPO.
Kjaer, Soeren Baekhoej, et al., "Design Optimization of a Single Phase Inverter for Photovoltaic Applications," IEEE 34th Annual Power Electronics Specialist Conference, Jun. 15-19, 2003, pp. 1183-1190, vol. 3, IEEE.
Shimizu, Toshihisa, et al., "A Flyback-type Single Phase Utility Interactive Inverter with Low-frequency Ripple Current Reduction on the DC Input for an AC Photovoltaic Module System," IEEE 33rd Annual Power Electronics Specialist conference, Month Unknown, 2002, pp. 1483-1488, vol. 3, IEEE.
Written Opinion of PCT/GB2005/050197, dated Feb. 14, 2006, Enecsys Limited.
Yatsuki, Satoshi, et al., "A Novel AC Photovoltaic Module System based on the Impedance-Admittance Conversion Theory," IEEE 32nd Annual Power Electronics Specialists Conference, Month Unknown, 2001, pp. 2191-2196, vol. 4, IEEE.
International Search Report for corresponding PCT/GB2004/001965, completed Aug. 16, 2004 by A. Roider.
Naik et al., A Novel Grid Interface for Photovoltaic, Wind-Electric, and Fuel-Cell Systems With a Controllable Power Factor or Operation, IEEE, 1995, pp. 995-998.
Petkanchin, Processes following changes of phase angle between current and voltage in electric circuits, Aug. 1999, Power Engineering Review, IEEE vol. 19, Issue 8, pp. 59-60.
Mumtaz, Asim, et al., "Grid Connected PV Inverter Using a Commercially Available Power IC," PV in Europe Conference, Oct. 2002, 3 pages, Rome, Italy.
Koutroulis, Eftichios, et al., "Development of a Microcontroller-Based, Photovoltaic Maximum Power Point Tracking Control System," IEEE Transactions on Power Electronics, Jan. 2001, pp. 46-54, vol. 16, No. 1, IEEE.
Zhang et al., "Capacitor voltage balancing in multilevel flying capacitor inverters by rule-based switching pattern selection", May 2007, p. 339-347.

(56) References Cited

OTHER PUBLICATIONS

Partial European Search Report—EP Appl. 14159869—dated Sep. 14, 2015.
Liu et al. "A Compact Power Converter for High Current and Low Voltage Applications", Industrial Electronics Society, 39th Annual Conference of the IEE, Nov. 2013, p. 140-144.
European Search Report—EP Appl. 15160896.5—dated Oct. 23, 2015.
European Extended Search Report—EP Appl. 14159869.8—dated Jan. 12, 2016.
Su, Gui-Jia: "Multilevel DC-Link Inverter", IEEE Transactions on Industry Applications, IEEE Service Center, Piscataway, NJ, US, vol. 41, No. 3, May 2, 2005, pp. 848-854, XP11132530.
PCT/IB2010/052287 International Search Report and Written Opinion dated Sep. 2, 2010.
Jun. 26, 2017—Chinese Office Action—CN 201410094169.8.
2008—"Simulink Model of Flying Capacitor Multilevel Inverter"—Adrian Schiop, et al.—11th International Conference on Optimization of Electrical and Electronic Equipment.
Jul. 14, 2017—Chinese Office Action—CN 201510133812.8.
Feb. 13, 2017—EP Search Report EP App 17203127.
2012—Konstantinou et al., "The Seven-level Flying Capacitor based ANPC Converter for Grid Intergration of Utility-Scale PV Systems" 3rd IEEE International Symposium on Power Electronics for Distributed Generation Systems (PEDG) p. 592-597.
Oct. 2012—Pulikanti et. al, "DC-Link Voltage Ripple Compensation for Multilevel Active-Neutral-Point-Clamped Converters Operated with SHE-PWM" IEEE Transactions on Power Deliver, vol. 27, No. 4 p. 2176-2184.
2008—Winkelnkemper et. al, "Control of a 6MVA Hybrid Converter for a Permanent Magnet Synchronous Generator for Windpower" Proceedings of the 2008 International Conference on Electrical Machines p. 2-6.
Dec. 5-8, 2011—Muneshima et. al, "A New Time-Sharing Charge 5L Inverter" IEEE PEDS 2011 p. 115-120.
Sep. 20-24, 2009—Li et. al, "An Optimum PWM Strategy for 5-Level Active NPC (ANPC) Converter Based on Real-time Solution for THD Minimization" p. 1976-1982.
Mar. 14-17, 2010—Kieferndorft, et. al, "A New Medium Voltage Drive System Based on ANPC-5L Technology" p. 643-649.
2012—Pulikanti et. al, "Generalisation of flying capacitor-based active-neutral-point-clamped multilevel converter using voltage-level modulation" IET Power Electron, 2012, vol. 5, Issue 4, p. 456-466.
Sep. 15-19, 2013—Wang et. al, "Capacitor Voltage Balancing of Five-Level ANPC Converter based on Zero-Sequence Voltage Injection Using PS-PWM" p. 4035-4040.
Sep. 13, 2013—Notice of Opposition, EP App No. 15160896.5.
Mar. 26, 2014—Yoscovich, et al. "Multi-level Inverter" U.S. Appl. No. 61/970,788.
Sep. 13, 2014—Yoscovich, et al., "Multi-level Inverter" U.S. Appl. No. 14/485,6825.
Cramer, Modulorientierter Stromrichter Geht in Serienfertigung , SPVSE, 1994.
Cramer, String-Wechselrichter Machen Solarstrom Billiger, Elektronik, Sep. 1996.
Engler, Begleitende Untersuchungen zur Entwicklung eines Multi-String-Wechselrichters, SPVSE, Mar. 2002.
Boller, Optimale Ansteuerung von Mittelspannungswechselrichtern, Diss Uni Wuppertal, Nov. 11, 2011.
Choi, Capacitor Voltage Balancing of Flying Capacitor Multilevel Converters by Space Vector PWM, Jul. 2012.
Feng, A Novel Voltage Balancing Control Method for Flying Capacitor Multilevel Converters, IEEE, 2003.
Feng, Modified phase-shifted PWM control for flying capacitor multilevel converters. IEEE Transactions on Power Electronics, 2007.
Fishelov, Immer Maximale Leistung, Elektronik, 2010.
Seipel, Untersuchungen zur Entwicklung modulorientierter Stromrichter für netzgekoppelte Photovoltaik-Anlagen, SPVSE, 1995.

Shias, Voltage Balancing Method for the Multilevel Flying Capacitor Converter Using Phase-Shifted PWM, Dec. 2012.
Hu, Active Power Filtering by a Flying-Capacitor Multilevel Inverter with Capacitor Voltage Balance, IEEE, 2008.
Kang, A Symmetric Carrier Technique of CRPWM for Voltage Balance Method of Flying-Capacitor Multilevel Inverter, Jun. 2005.
Khazraei, A Generalized Capacitor Voltage Balancing Scheme for Flying Capacitor Multilevel Converters, IEEE, 2010.
Khazraei, Active Capacitor Voltage Balancing in Single-Phase Flying-Capacitor Multilevel Power Converters, IEEE, Feb. 2012.
Mcgrath, Analytical Modelling of Voltage Balance Dynamics for a Flying Capacitor Multilevel Converter, 2007.
Niebauer, Solarenergie Optimal Nutzen, Elektronik, 1996.
Schettler, Selbst Geführte pulswechselrichtemit Gleichspannungskreis Fürden Einsatz in Hochspannungsnetzen zur Sicherung der Energiequoitlat mittals Wirk-und Blindleistun, Pulswechselrichter, VDI, 2004.
Shukla, Improved Multilevel Hysteresis Current Regulation and Capacitor Voltage Balancing Schemes for Flying Capacitor Multilevel Inverter, IEEE, Mar. 2008.
Zhang, Three-phase four-leg flying-capacitor multi-level inverter-based active power filter for unbalanced current operation, 2013.
Wang et al, Self-precharge of floating capacitors in a five-level ANPC inverter, Proceedings of The 7th International Power Electronics and Motion Control Conference, 1776-1780, Jun. 2012.
Janik et al, Universal precharging method for de-link and flying capacitors of four-level Flying Capacitor Converter, 6322-6327, 2013.
Mar. 5, 2020—CN Office Action—CN 201811175971.4.
Ciobotaru, et al., Control of single-stage single-phase PV inverter, Aug. 7, 2006.
International Search Report and Written Opinion for PCT/IB2007/004591 dated Jul. 5, 2010.
European Communication for EP07873361.5 dated Jul. 12, 2010.
European Communication for EP078740222 dated Oct. 18, 2010.
European Communication for EP07875148.4 dated Oct. 18, 2010.
Esram, et al., "Comparison of Photovoltaic Array Maximum Power Point Tracking Techniques", IEEE Transactions on Energy Conversion, vol. 22, No. 2, Jun. 2007, pp. 439-449.
International Search Report for PCT/IB2007/004610 dated Feb. 23, 2009.
International Search Report for PCT/IB2007/004584 dated Jan. 28, 2009.
International Search Report for PCT/IB2007/004586 dated Mar. 5, 2009.
International Search Report for PCT/IB2007/004643 dated Jan. 30, 2009.
International Search Report for PCT/US2008/085736 dated Jan. 28, 2009.
International Search Report for PCT/US2008/085754 dated Feb. 9, 2009.
International Search Report for PCT/US2008/085755 dated Feb. 3, 2009.
Kajihara, et al., "Model of Photovoltaic Cell Circuits Under Partial Shading", 2005 IEEE, pp. 866-870.
Knaupp, et al., "Operation of a 10 KW PV Façade with 100 W AC Photovoltaic Modules", 1996 IEEE, 25th PVSC, May 13-17, 1996, pp. 1235-1238, Washington, DC.
Alonso, et al., "Cascaded H-Bridge Multilevel Converter for Grid Connected Photovoltaic Generators with Independent Maximum Power Point Tracking of Each Solar Array", 2003 IEEE 34th, Annual Power Electronics Specialists Conference, Acapulco, Mexico, Jun. 15-19, 2003, pp. 731-735, vol. 2.
Myrzik, et al., "String and Module Integrated Inverters for Single-Phase Grid Connected Photovoltaic Systems—A Review", Power Tech Conference Proceedings, 2003 IEEE Bologna, Jun. 23-26, 2003, p. 8, vol. 2.
Chen, et al., "Predictive Digital Current Programmed Control", IEEE Transactions on Power Electronics, vol. 18, Issue 1, Jan. 2003.
Wallace, et al., "DSP Controlled Buck/Boost Power Factor Correction for Telephony Rectifiers", Telecommunications Energy Conference 2001, INTELEC 2001, Twenty-Third International, Oct. 18, 2001, pp. 132-138.

(56) References Cited

OTHER PUBLICATIONS

Alonso, "A New Distributed Converter Interface for PV Panels", 20th European Photovoltaic Solar Energy Conference, Jun. 6-10, 2005, Barcelona, Spain, pp. 2288-2291.
Alonso, "Experimental Results of Intelligent PV Module for Grid-Connected PV Systems", 21st European Photovoltaic Solar Energy Conference, Sep. 4-8, 2006, Dresden, Germany, pp. 2297-2300.
Enslin, "Integrated Photovoltaic Maximum Power Point Tracking Converter", IEEE Transactions on Industrial Electronics, vol. 44, No. 6, Dec. 1997, pp. 769-773.
Sep. 7-9, 1999—Lindgren, "Topology for Decentralised Solar Energy Inverters with a Low Voltage AC-Bus", Chalmers University of Technology, Department of Electrical Power Engineering, EPE '99—Lausanne.
Nikraz, "Digital Control of a Voltage Source Inverter in a Photovoltaic Applications", 2004 35th Annual IEEE Power Electronics Specialists Conference, Aachen, Germany, 2004, pp. 3266-3271.
Orduz, "Evaluation Test Results of a New Distributed MPPT Converter", 22nd European Photovoltaic Solar Energy Conference, Sep. 3-7, 2007, Milan, Italy.
Palma, "A Modular Fuel Cell, Modular DC-DC Converter Concept for High Performance and Enhanced Reliability", IEEE 2007, pp. 2633-2638.
Sep. 16-19, 1996—Quaschning, "Cost Effectiveness of Shadow Tolerant Photovoltaic Systems", Berlin University of Technology, Institute of Electrical Energy Technology, Renewable Energy Section. EuroSun '96, pp. 819-824.
Roman, "Intelligent PV Module for Grid-Connected PV Systems", IEEE Transactions on Industrial Electronics, vol. 52, No. 4, Aug. 2006, pp. 1066-1073.
Roman, "Power Line Communications in Modular PV Systems", 20th European Photovoltaic Solar Energy Conference, Jun. 6-10, 2005, Barcelona, Spain, pp. 2249-2252.
Uriarte, "Energy Integrated Management System for PV Applications", 20th European Photovoltaic Solar Energy conference, Jun. 6-10, 2005, Barcelona, Spain, pp. 2292-2295.
Walker, "Cascaded DC-DC Converter Connection of Photovoltaic Modules", IEEE Transactions on Power Electronics, vol. 19, No. 4, Jul. 2004, pp. 1130-1139.
Oct. 3-7, 1999—Matsui, et al., "A New Maximum Photovoltaic Power Tracking Control Scheme Based on Power Equilibrium at DC Link", IEEE, 1999, pp. 804-809.
International Preliminary Report on Patentability for PCT/IB2008/055092 dated Jun. 8, 2010.
International Search Report for PCT/IB2008/055092 dated Sep. 8, 2009.
Walker, "Cascaded DC-DC Converter Connection of Photovoltaic Modules", 33rd Annual IEEE Power Electronics Specialists Conference. PESC 2002. Conference Proceedings. Cairns, Queensland, Australia, Jun. 23-27, 2002; [Annual Power Electronics Specialists Conference], New York, NY: IEEE US, vol. 1, Jun. 23, 2002, pp. 24-29, XP010596060 ISBN: 978-0-7803-7262-7, figure 1.

International Search Report and Opinion of International Patent Application WO2009136358 (PCT/IB2009/051831), dated Sep. 16, 2009.
Informal Comments to the International Search Report dated Dec. 3, 2009.
UK Intellectual Property office, Combined Search and Examination Report for GB1100450.4 under Sections 17 and 18(3), dated Jul. 14, 2011.
Jain, et al., "A Single-Stage Grid Connected Inverter Topology for Solar PV Systems with Maximum Power Point Tracking", IEEE Transactions on Power Electronics, vol. 22, No. 5, Sep. 2007, pp. 1928-1940.
Lynch, et al., "Flexible DER Utility Interface System: Final Report", Sep. 2004-May 2006, Northern Power Systems, Inc., Waitsfield, Vermont B. Kroposki, et al., National Renewable Energy Laboratory Golden, Colorado Technical Report NREL/TP-560-39876, Aug. 2006.
Schimpf, et al., "Grid Connected Converters for Photovoltaic, State of the Art, Ideas for improvement of Transformerless Inverters", NORPIE/2008, Nordic Workshop on Power and Industrial Electronics, Jun. 9-11, 2008.
United Kingdom Intellectual Property Office, Combined Search and Examination Report Under Sections 17 and 18(3), GB1020862.7, dated Jun. 16, 2011.
Woyte, et al., "Mains Monitoring and Protection in a European Context", 17th European Photovoltaic Solar Energy Conference and Exhibition, Munich, Germany, Oct. 22-26, 2001, Achim, Woyte, et al., pp. 1-4.
"Implementation and testing of Anti-Islanding Algorithms for IEEE 929-2000 Compliance of Single Phase Photovoltaic Inverters", Raymond M. Hudson, Photovoltaic Specialists Conference, 2002. Conference Record of the Twenty-Ninth IEEE, May 19-24, 2002.
Fairchild Semiconductor, Application Note 9016, IGBT Basics 1, by K.S. OH Feb. 1, 2001.
"Disconnect Switches in Photovoltaic Applications", ABB, Inc., Low Voltage Control Products & Systems, 1206 Hatton Road, Wichita Falls, TX 86302, Phone 888-385-1221, 940-397-7000, Fax: 940-397-7085, 1SXU30119760201, Nov. 2009.
Walker, "A DC Circuit Breaker for an Electric Vehicle Battery Pack", Australasian Universities Power Engineering Conference and IEAust Electric Energy Conference, Sep. 26-29, 1999.
Combined Search and Examination Report for GB1018872.0 dated Apr. 15, 2011, 2 pages.
Baggio, "Quasi-ZVS Activity Auxiliary Commutation Circuit for Two Switches Forward Converter", 32nd Annual IEEE Power Electronics Specialists Conference. PESC 2001. Conference Proceedings. Vancouver, Canada, Jun. 17-21, 2001; [Annual Power Electronics Specialists Conference] New York, NY: IEEE, US.
Ilic, "Interleaved Zero-Current-Transition Buck Converter", IEEE Transactions on Industry Applications, IEEE Service Center, Piscataway, NJ, US, vol. 43, No. 6, Nov. 1, 2007, pp. 1619-1627, XP011197477 ISSN: 0093-9994, pp. 1619-1922.

* cited by examiner

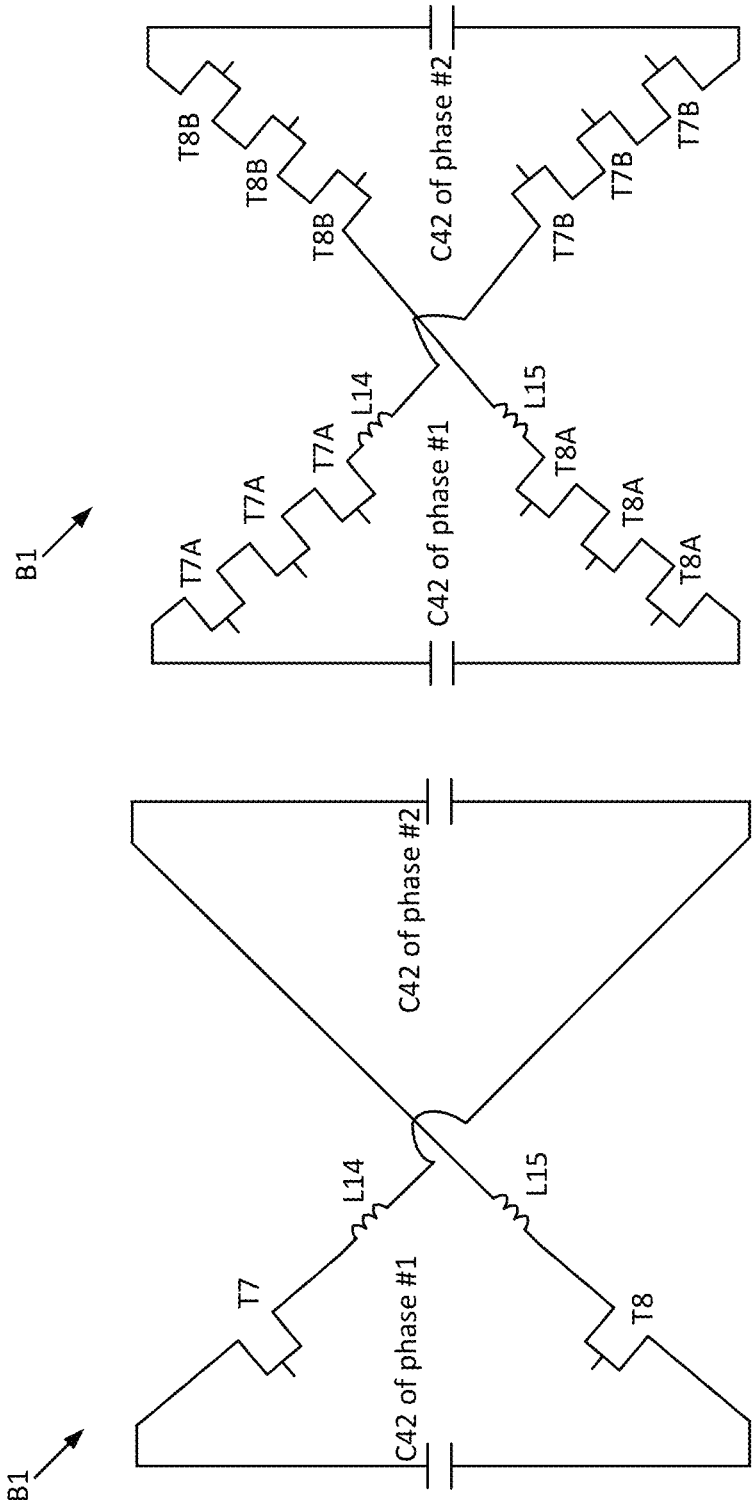

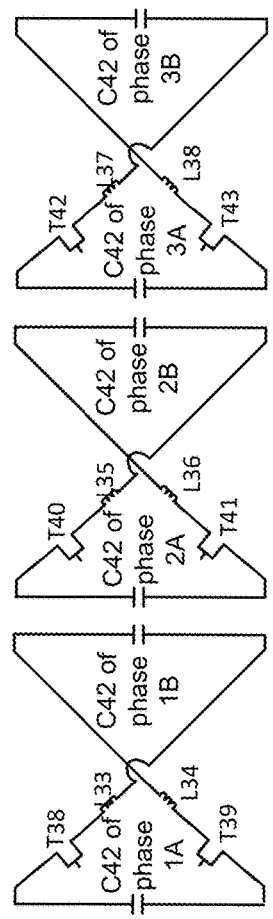
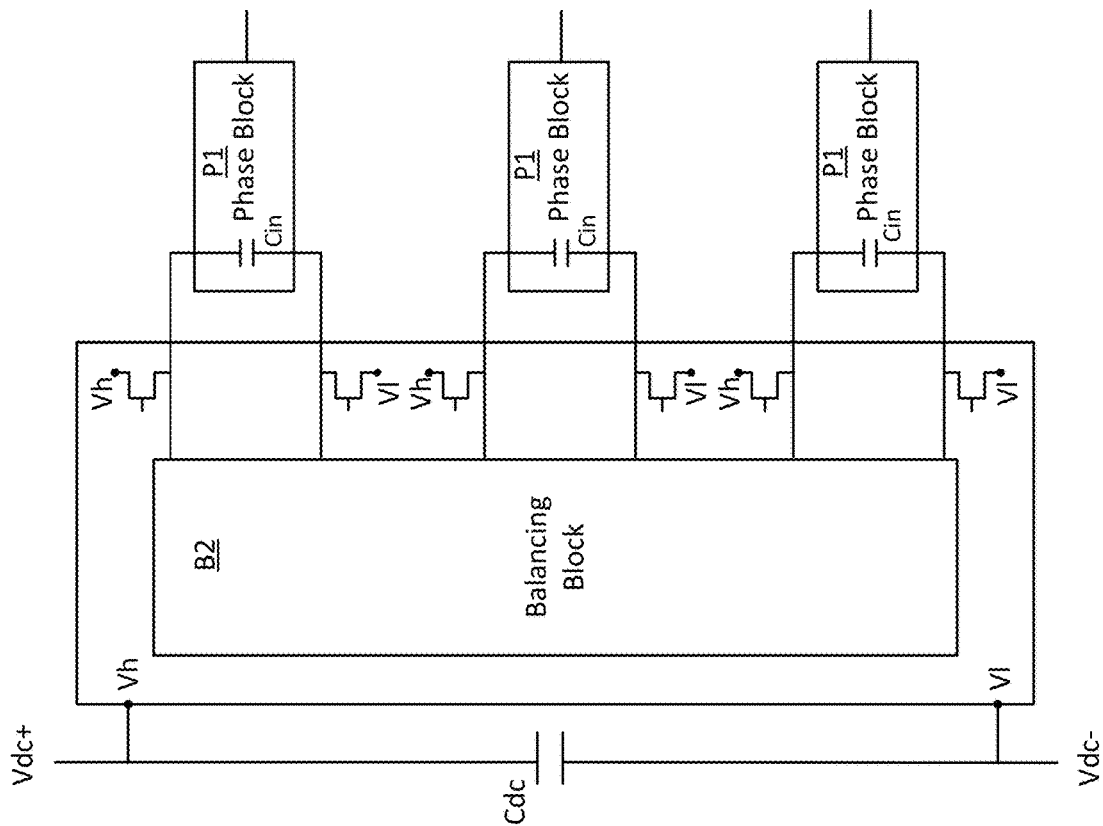
FIG. 18
FIG. 19

MULTI-LEVEL INVERTER

RELATED APPLICATIONS

The present application is a continuation of U.S. Non-Provisional application Ser. No. 16/442,214 entitled "MULTI-LEVEL INVERTER" filed Jun. 14, 2019, which is a continuation of U.S. Non-Provisional application Ser. No. 15/054,647, entitled "MULTI-LEVEL INVERTER WITH FLYING CAPACITOR TOPOLOGY", filed Feb. 26, 2016, which is a continuation of U.S. Non-Provisional application Ser. No. 14/485,682, entitled "MULTI-LEVEL INVERTER" filed Sep. 13, 2014, which claims priority to U.S. Provisional Application No. 61/970,788, entitled "MULTI-LEVEL INVERTER" filed on Mar. 26, 2014. These applications are hereby incorporated by reference in their entirety.

BACKGROUND

Despite many years of research, the search for a more cost-effective inverter implementation (either single phase or three phases) has thus far has been elusive. Some attempts utilize high voltage switches (e.g. 600V IGBTs) in a topology that is aimed at reducing switching losses and/or the size of passive components (mainly magnetics). See, for example, "Multilevel inverters: A survey of Topologies, Control and Applications". These inverters, which are aimed at reducing switching losses typically include high voltage switches (e.g. 600V IGBTs) that switch at a frequency around x10 of the line frequency (50 Hz) or up to 16 kHz. The IGBT switching losses are considerable at this range of frequencies and even at the low end of these frequencies. Further, the low frequency switching causes the choke to approach or exceed 20% of the overall cost of the inverter. Alternative research has sought to use even more advanced switch technology (e.g., Silcon Carbide and/or Galium Nitride) in order to increase frequency and reduce the size of passive components. This research can reduce switching losses to some extent as well but only at the high cost of the advanced switch technology. Despite extensive research, these inverter topologies offer only limited improvements and cannot achieve the cost reduction and efficiencies needed for efficient inverter technologies.

There remains a need for a low cost, high efficiency inverter technology.

SUMMARY

The following summary is for illustrative purposes only, and is not intended to limit or constrain the detailed description.

Embodiments herein may employ a multi-level inverter (e.g., a single phase and/or three phase inverters) with a specialized control system which enables low cost inverters with a high efficiency. In some embodiments discussed herein, a multi-level inverter may be utilized where the output of the inverter (before filtering) has several voltage steps thereby reducing the stress on the magnetics of the inverter and improving the output voltage shaping which allows further reduction in switching frequency.

In exemplary multi-level inverters (either single phase or three phase) described herein, the control system allows the use of low-voltage MOSFETs (e.g. 80V) in order to form an equivalent switch of higher voltage (e.g. using six 80V MOSFETs resulting in an equivalent 480V switch). The conduction and switching characteristics of the low voltage switching multi-level inverter are substantially and unexpectedly improved over other multi-level inverter implementations. In these embodiments, by staggering the turning on and off of the low voltage MOSFETs, a lower frequency modulation may be utilized for each of the multi-level switches, e.g., each of the MOSFETs may be switched at a moderate frequency (e.g. 200 kHz) while maintaining low switching losses compared to other switch technologies and gaining the benefits of an effective frequency of 200 kHz*N where N is the number of switches in series that are staggered in time, thereby reducing the size requirements of the passive parts according to the effective extended frequency. In some embodiments, the MOSFETs may be switched in at staggered times according to a duty cycle ratio (which may or may not change according to the sine-wave), where each MOSFET is shifted by, for example, ⅙ of the switching period (for examples with 6 MOSFETs in a series).

In accordance with embodiments discussed herein, in addition to the advantages with respect to conduction and switching losses discussed herein, these examples offer other major benefits such as the reduction of passive components (e.g., in the main choke magnetics and/or output filter). For example, due to the multi-level voltages and low cost MOSFET switches, a reduction in size and/or cost by a factor of N (e.g. 6 in the example) can be achieved. In addition, exemplary embodiments discussed herein can achieve an effective frequency within the main choke which may be N times the switching frequency (e.g. 6*200 kHz in this example). As a result, in these embodiments, the main choke can be smaller by a factor of N^2 (e.g. 36) relative to a standard design. In embodiments described herein, the overall gain factor in the main choke size relative to a standard IGBT-based inverter system utilizing 16 kHz switching frequency may be, for example, 200 kHz/16 kHz*36=450, rendering the cost of the choke to be so small that it becomes almost negligible in multi-level inverter examples described herein. A similar calculation can be made for the output filter showing even greater advantage in reduction in cost and increases in efficiencies.

As noted above, this summary is merely a summary of some of the features described herein. It is not exhaustive, and it is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIG. 11 illustrates an example of an inter-phase balancing block in accordance with embodiments described herein.

FIG. 12 illustrates another example of an inter-phase balancing block in accordance with embodiments described herein.

FIG. 18 illustrates an example of a six phase balancing block in accordance with embodiments described herein.

FIG. 19 illustrates another embodiment of a multi-level inverter in accordance with embodiments described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1A:
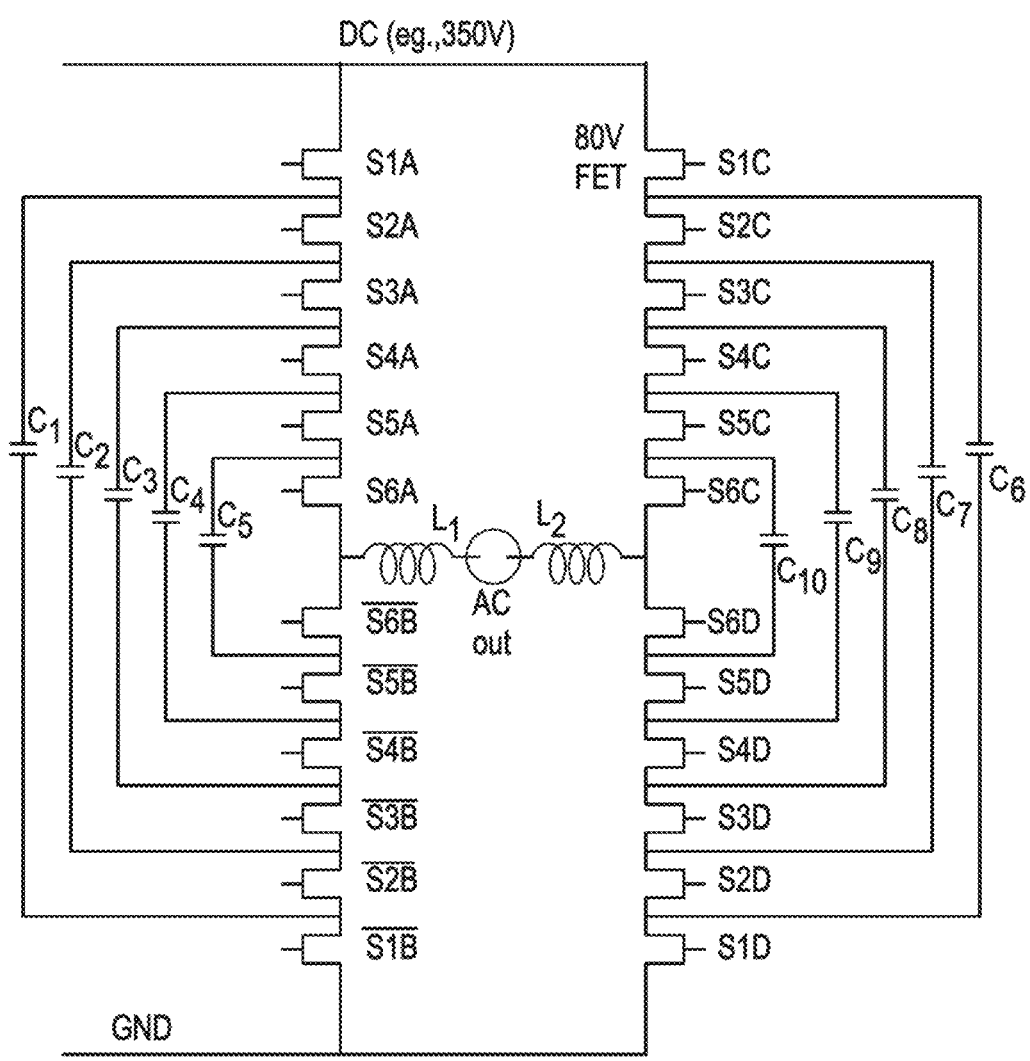
FIG. 1A-1I illustrate various examples multi-level inverter circuits in accordance with embodiments herein.

Referring to FIG. 1A, an exemplary multi-level inverter includes one, two, or more parallel connections each comprising a plurality of different switches disposed across a DC voltage. The switches may be coupled to a number of capacitors and/or inductors which may be utilized to smooth a sine-wave of an AC output of the inverter. For example, a plurality of switch banks S1A-S6A, S6B-S1B, S1C-S6C, and/or S6D-S1D may be disposed in any suitable configuration such as that shown in FIG. 1A. Each of the banks of MOSFET transistors may be variously configured to include two, three, four, five, six, seven, eight, nine, ten, eleven, twelve or more transistors.

Figure 1B:
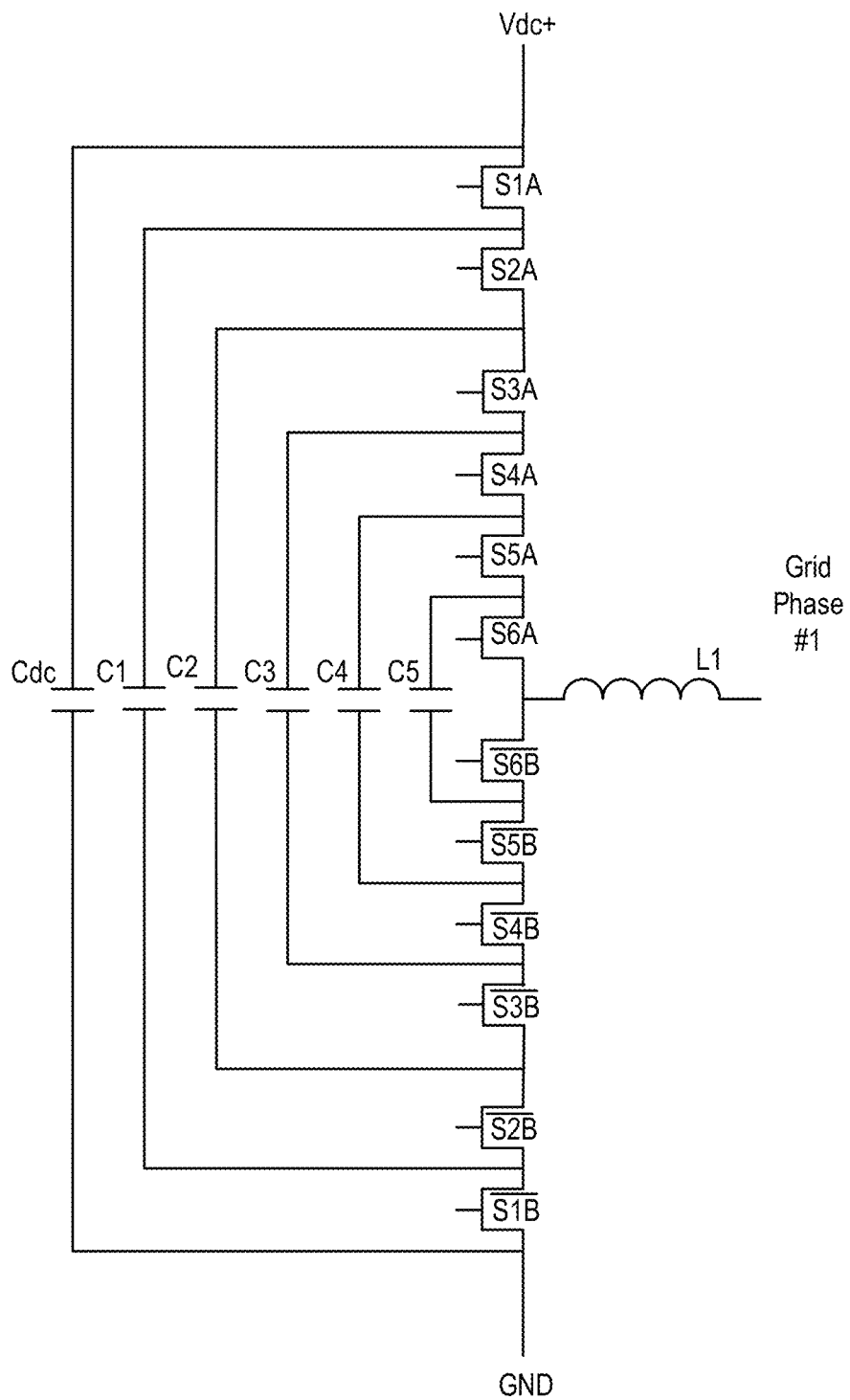

FIG. 1B illustrates half of the circuit illustrated in FIG. 1A. In various embodiments, during steady-state operation the capacitor voltages (C1, C2, C3, C4, and C5) average at $5/6*Vdc$, $4/6*Vdc$, $3/6*Vdc$, $2/6*Vdc$, $1/6*Vdc$ respectively (e.g. multiples of 1/N, where N is the number capacitors or the number switches in a bank, assuming the capacitors are of equal value). For embodiments where the capacitors are not of the same value, steady-state average voltage across each capacitor will scale accordingly.

During periods when the inverter is not operating at steady-state, such as during start-up of the inverter or during standby of the inverter, some embodiments may pre-charge the capacitors to their steady-state operating voltages.

Figure 1C:
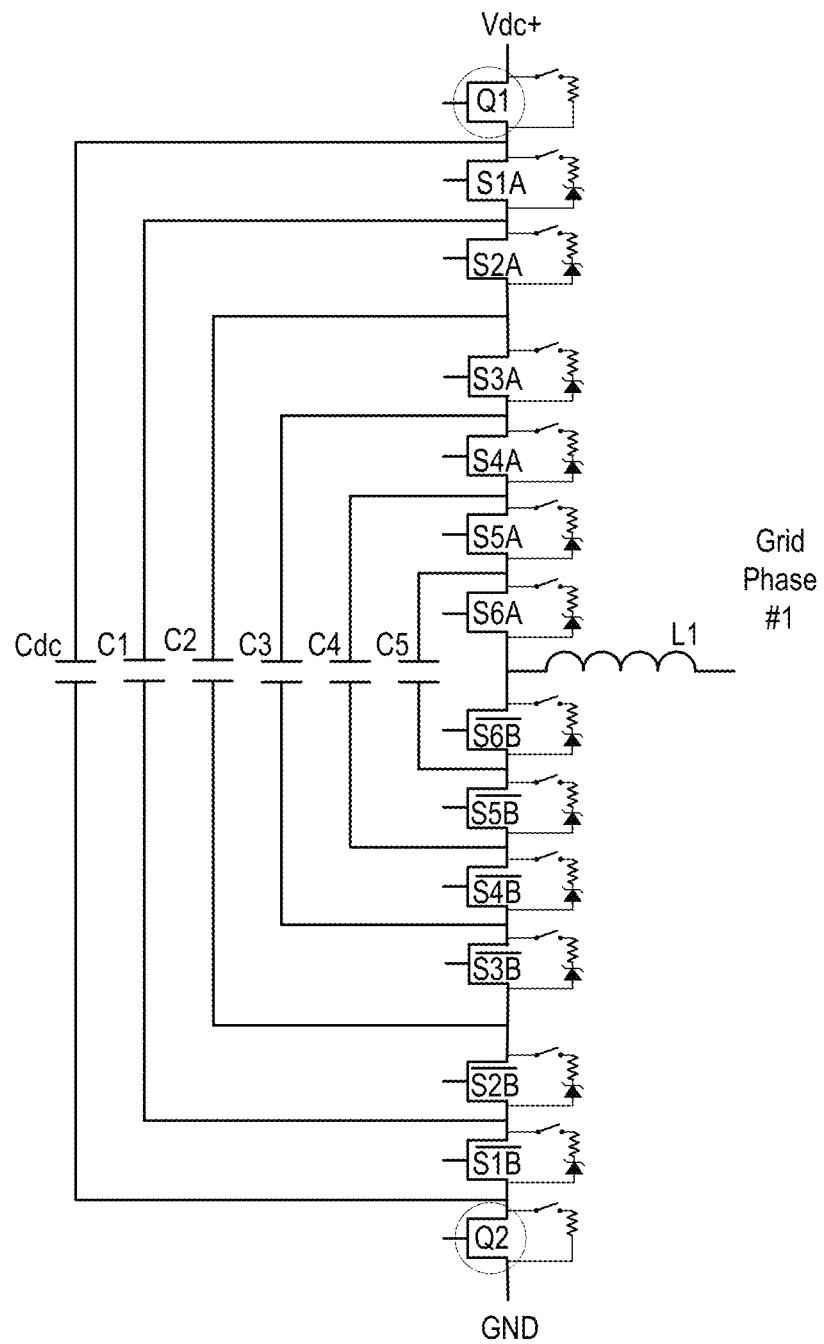

One embodiment for pre-charging capacitor voltage during non-steady-state operation of the inverter includes switching series zener diodes and resistors in parallel to each of the MOSFETs as shown in FIG. 1C. The capacitors are charged according to these resistor dividers, with the zener diodes protecting the MOSFETs from over-voltage. The zener diodes and resistors can be switched off once the capacitors are charged to their voltages for steady state operation of the inverter. In some embodiments, switches Q1 and Q2 may be added, each with a parallel bypass resistor path that can be optionally switched. During charging, Q1 and Q2 can be switched OFF and the parallel bypass switched ON (if a switch is present), such that the resistors in the parallel bypass path to Q1 and Q2 can limit the charging current from Vdc. Once charged, Q1 and Q2 can be switched ON, for normal operation of the inverter. When this option of Q1/Q2 is used, the parallel path to Q1 and Q2 may optionally include series zener diodes.

Figure 1D:
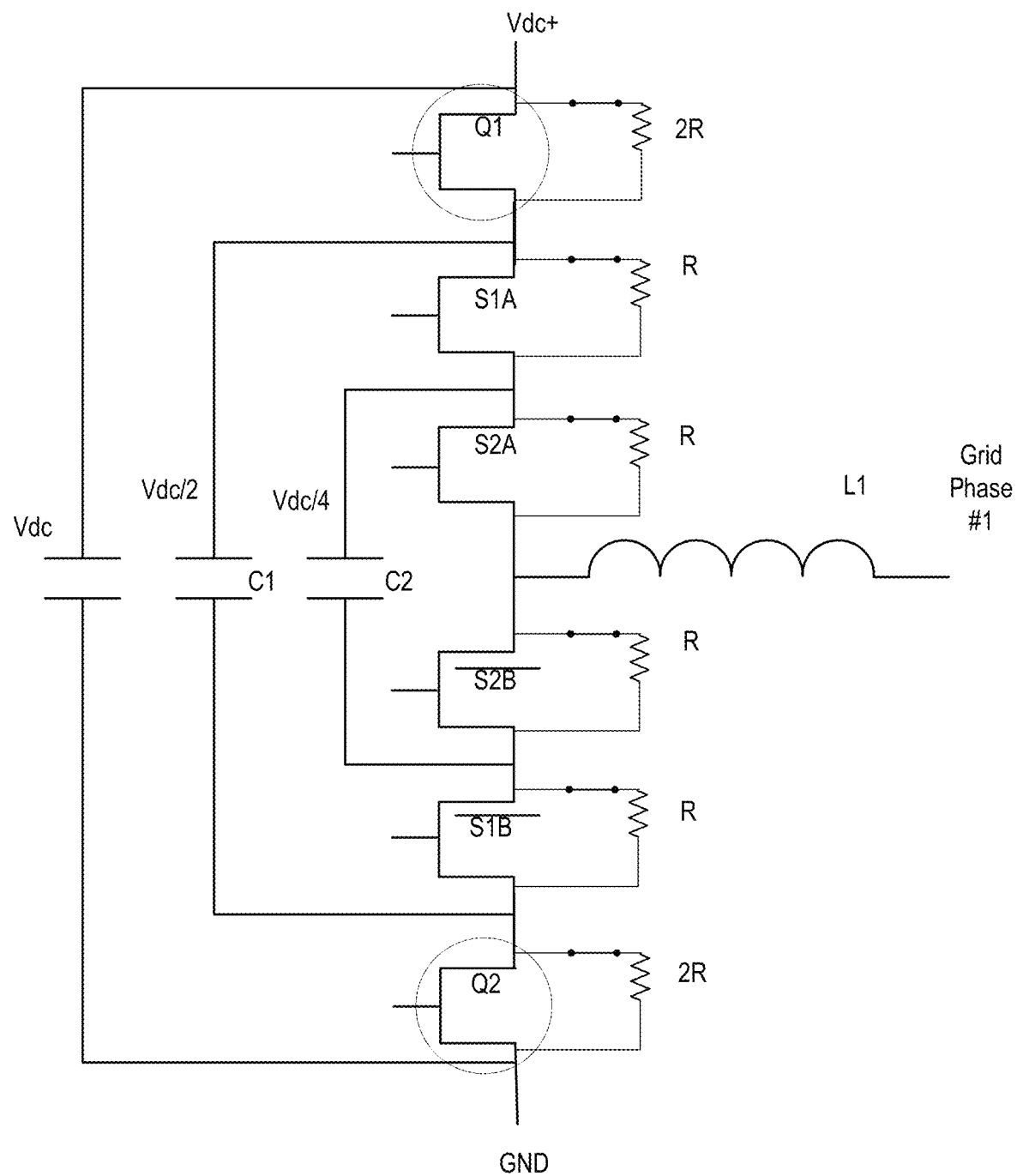

FIG. 1D illustrates another embodiment where N=2 (e.g., two MOSFETs in series). Q1 and Q2 are added in this implementation for operation in the pre-charge process as described with respect to FIG. 1C. In this embodiment, the zener diodes are eliminated from each parallel resistor path. In one example, with the resistance across Q1 and Q2 equaling 2R and the resistance across each inverter switch S1A, S2A, S1B, and S2B equaling R, voltages of Vdc/2 and Vdc/4 are generated with no current draw from the output (as is the case prior to steady-state operation).

Figure 2A:
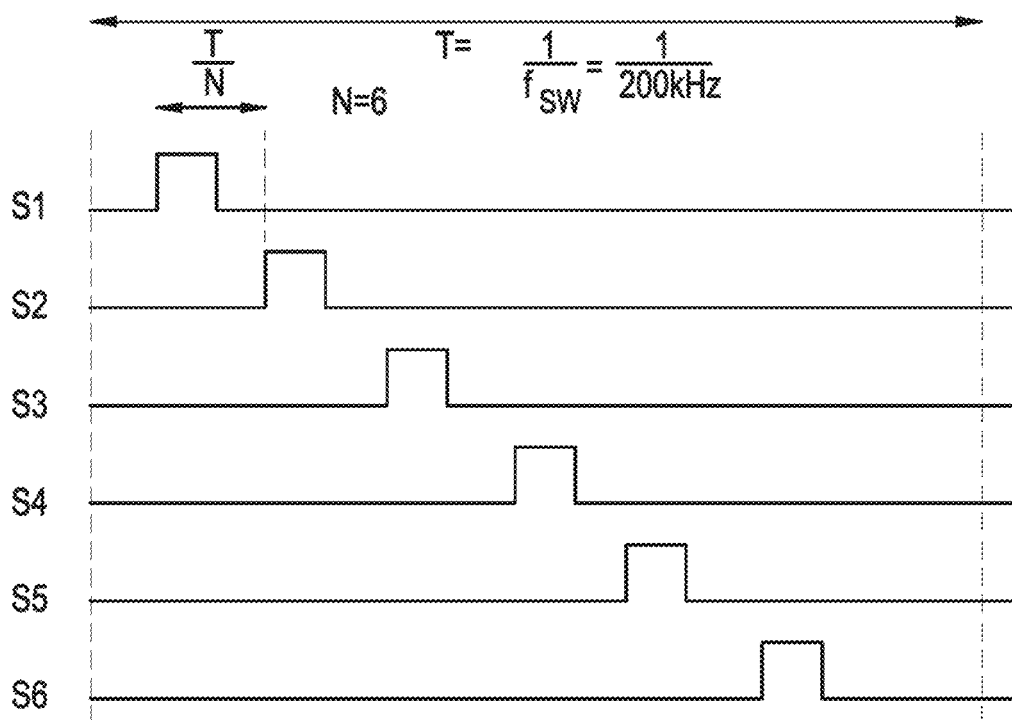
FIGS. 2A-2F illustrate algorithms for controlling multi-level inverter in accordance with embodiments herein.
Figure 3:
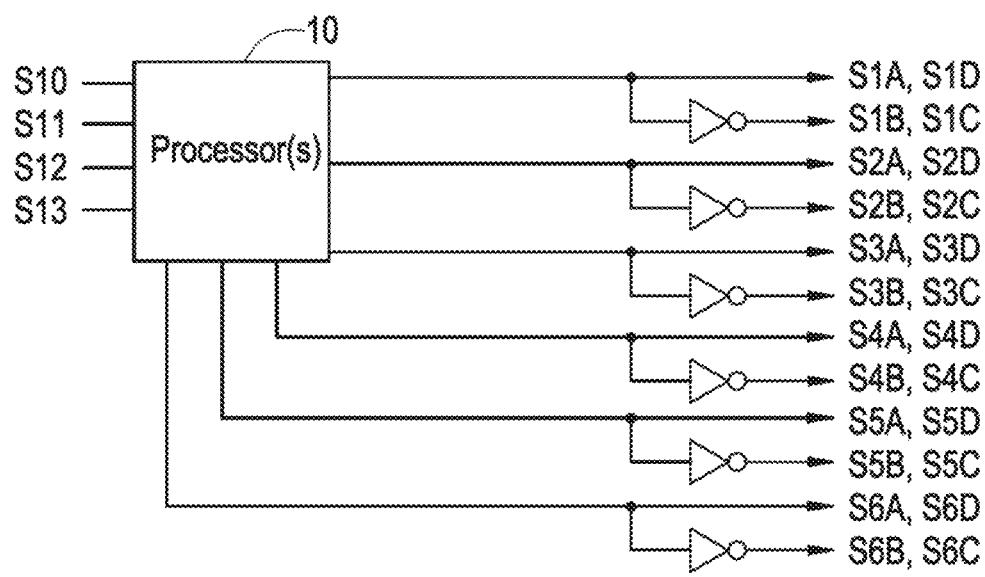
FIG. 3 illustrates an exemplary control for embodiments herein.

Once the capacitors are pre-charged, the inverter may operate in steady-state with the timing shown in FIG. 2A, for example, or with other various timings. Referring to FIG. 3, each of the switches may be controlled by an output from a processor 10 (e.g., logic, one or more processor(s), controls, state machine, controller, microprocessor, software driven control, gate array, and/or other controller). In this embodiment, switch bank A comprises a series of FET transistors S1A-S6A (e.g., 20 v, 40 v, 60 v, 80 v, 100 v, 120 v MOSFET transistors) connected together in, for example, a source to drain configuration to form a first switching bank; switch bank B comprises a series of FET transistors S1B-S6B (e.g., 20 v, 40 v, 60 v, 80 v, 100 v, 120 v MOSFET transistors) connected together in, for example, a source to drain configuration to form a second switching bank; switch bank C comprises a series of FET transistors S1C-S6C (e.g., 20 v, 40 v, 60 v, 80 v, 100 v, 120 v MOSFET transistors) connected together in, for example, a source to drain configuration to form a third switching bank; switch bank D comprises a series of FET transistors S1D-S6D (e.g., 20 v, 40 v, 60 v, 80 v, 100 v, 120 v MOSFET transistors) connected together in, for example, a source to drain configuration to form a fourth switching bank. While six 80 volt FET transistors are used for each switch bank in this example, either more and/or less transistors can be utilized with different voltages e.g., 20 v, 40 v, 60 v, 80 v, 100 v, 120 v. For example, where 12 transistors are utilized in each switching bank, the voltages across those transistors may be adjusted to a suitable voltage such as 40 volts and the switching frequency of the transistors within one cycle may be increased from the example where only 6 transistors are utilized (e.g., switching each transistor at twice the rate).

Referring to FIG. 2A, each of the MOSFETs may be controlled to switch using a high frequency (e.g. around 200 kHz in this example) while still having low switching losses compared to other switch technologies. As shown in FIG. 2A, for this example, the MOSFETs are switched according to the duty cycle ratio (which changes according to the sine-wave) in the following simple manner (shown for six MOSFETs in series), where each MOSFET in series is shifted sequentially by ⅙ of the switching period. The specific timing shown in FIG. 2A is an example of the required duty cycles and a variety of different timings may be used that may have similar or different switching performance.

The duty cycle of the control signals may be varied according to required conversion ratio of the inverter, which may include a full range of duty cycles starting from 0 and ending up at 1 throughout, for example, a 50/60 Hz sine wave. When the required duty cycle D is smaller than T/N, the switch timing does not have any overlap as shown in FIG. 2A. When the required duty cycle is higher than T/N, the control signals start to overlap up to point where there is a full overlap between all control signals at the duty cycle of 1 (all switches are ON constantly).

Figure 2B:
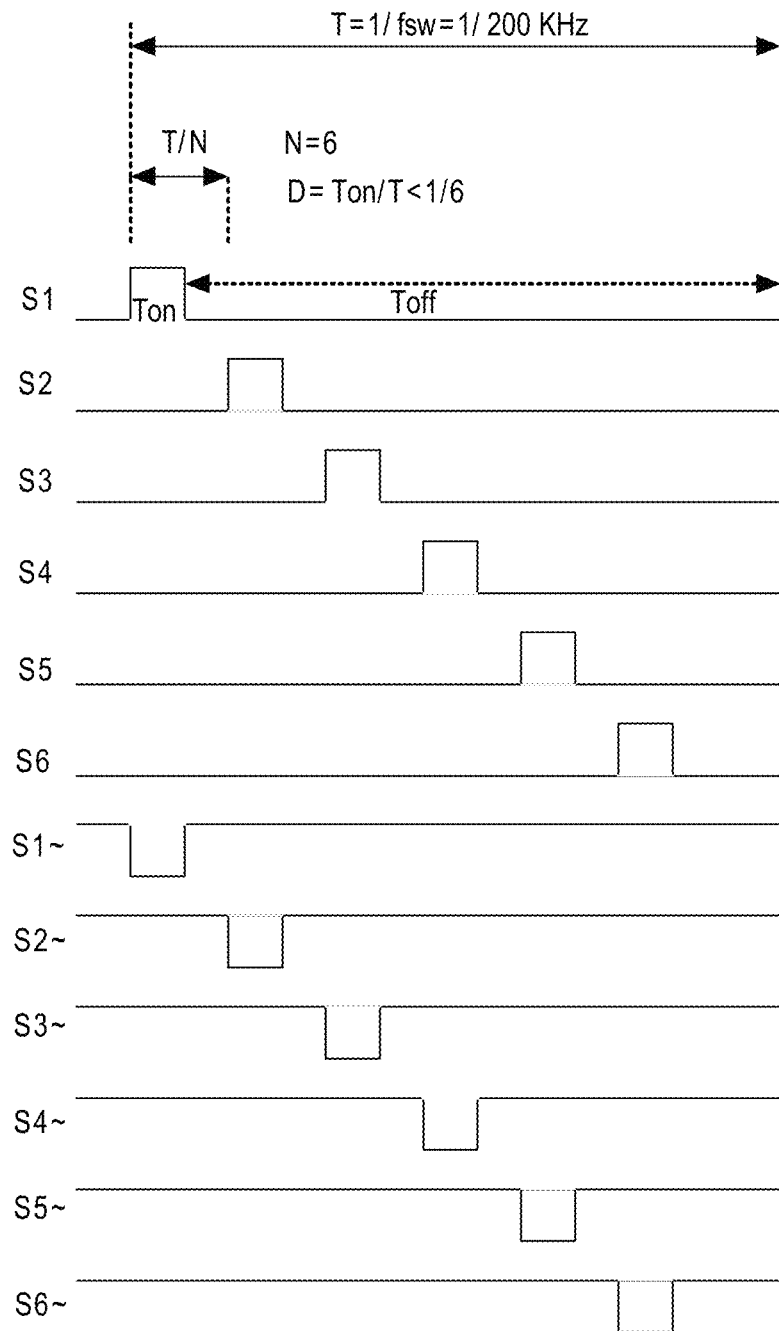

FIG. 2B illustrates a more detailed diagram of low duty cycles where there is no overlap. The figure includes both control signals S1 through S6 respectively for switches S1A-S6A and signals S1~ through S6~respectively for switches S1B-S6B.

Figure 1E:
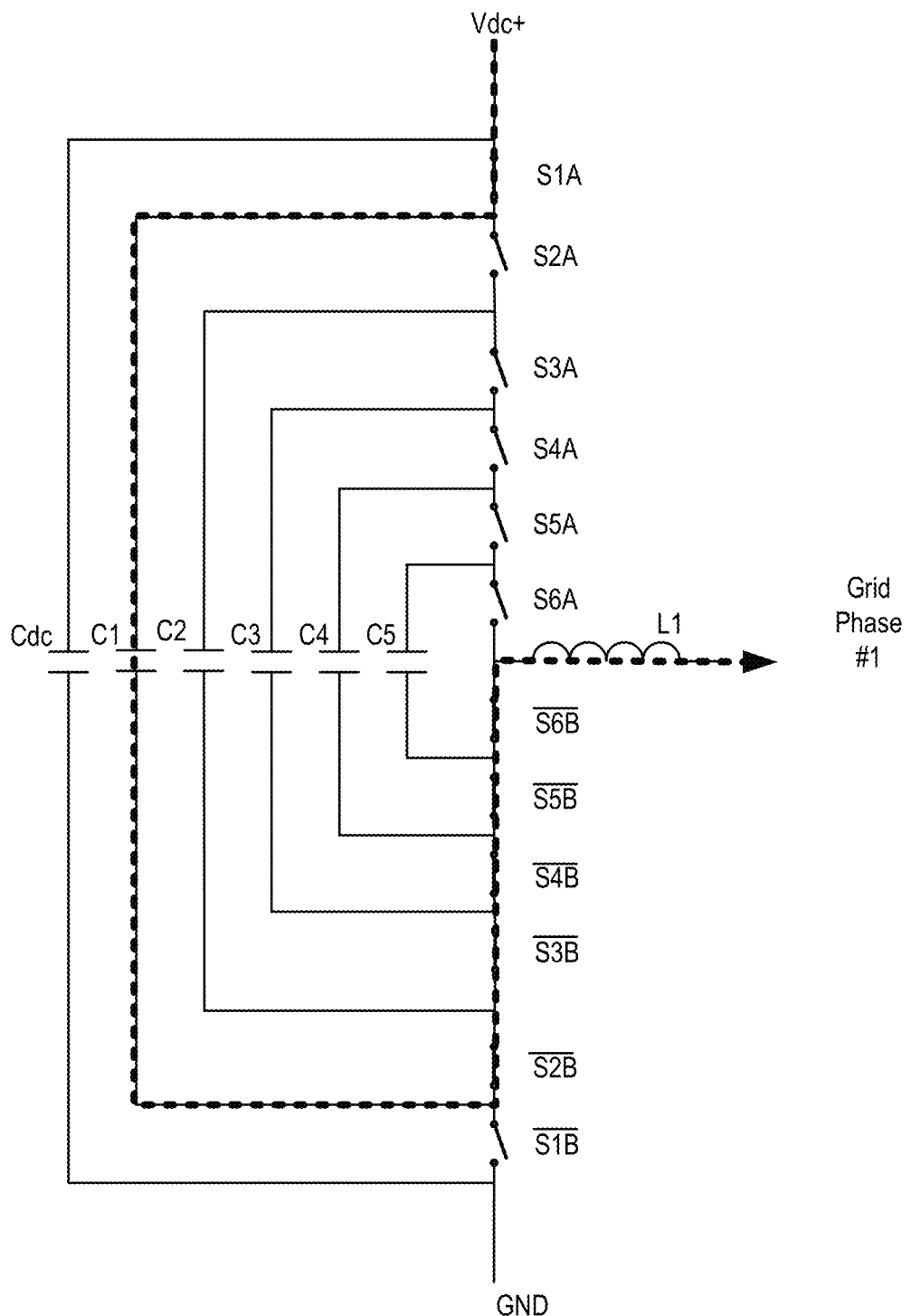

When there is no overlap of the control signals, only one out of six MOSFET is ON (i.e., closed) on the high-side while only one out of six MOSFETS is OFF (i.e., open) on the low side as shown in FIG. 1E. FIG. 1E is illustrated with the MOSFETS represented as switches, with switch states corresponding to signal S1 On in FIG. 2B. As shown by the dotted line, the current flow is from Vdc+ towards the output (Grid phase #1) while passing through the MOSFETs that are ON and passing through capacitor C1, resulting in C1 charging with some ripple current. Since C1 is charged with ⅚*Vdc the total output voltage in this case, the output voltage is Vdc−⅚*Vdc=⅙*Vdc. When S1 goes off in FIG. 2B, S1=S2=S3=S4=S5=S6=0 which yields an output voltage of 0. Subsequently S2 will be on resulting in an output being the voltage difference between C1 and C2 (⅚*Vdc−⅚*Vdc=⅙*Vdc). The pattern continues with ⅙*Vdc at the output occurring when each switch is turned on. Therefore, during the multiplexing between the on state of one switch and the off states, any voltage between 0 to ⅙*Vdc can be generated with PWM. This occurs for any case where the duty cycles are below ⅙, resulting in no overlap in ON signals between the MOSFETs.

Figure 2C:
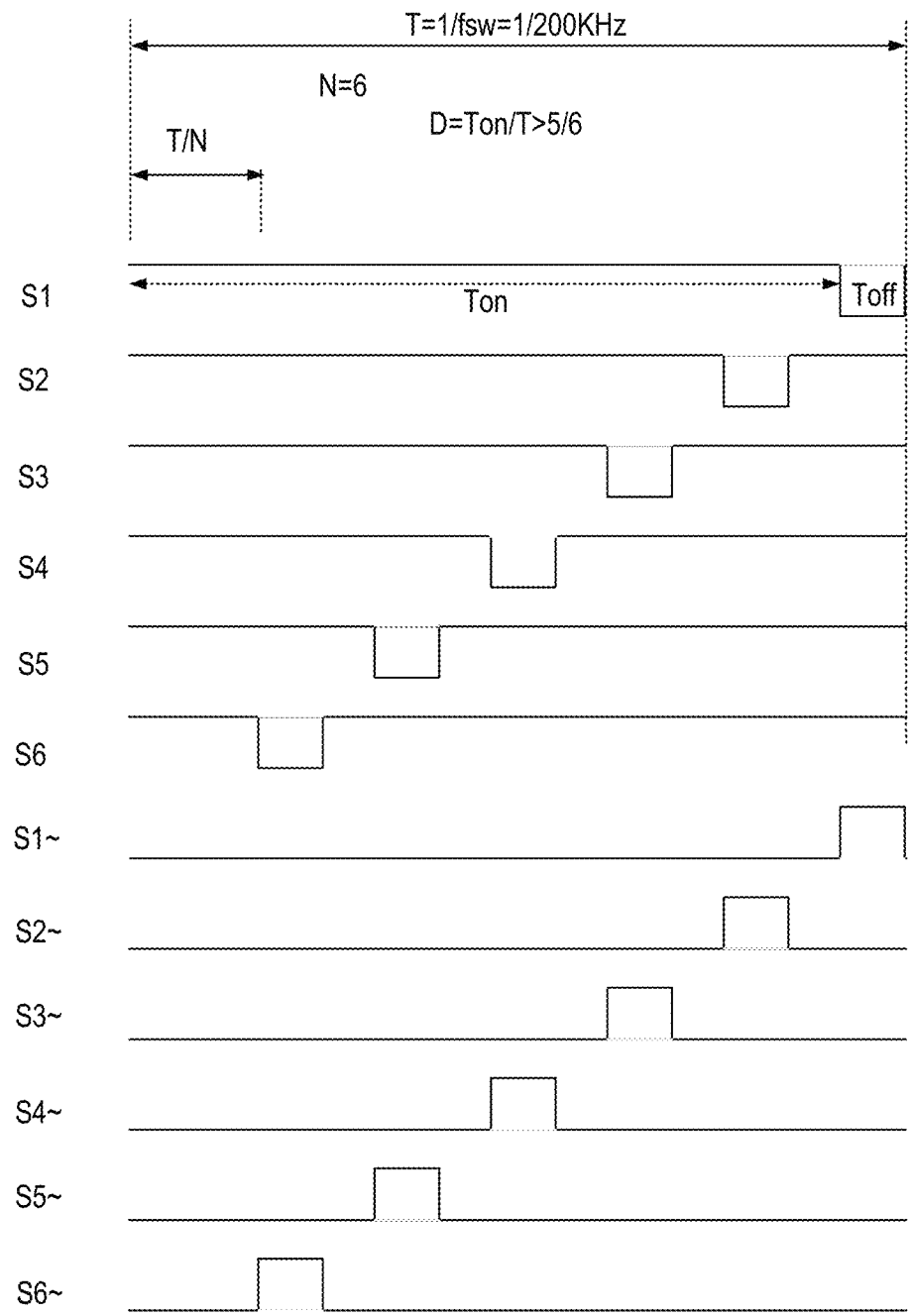

FIG. 2C illustrates another example of a timing diagram with a high duty cycle where there is an overlap between all the MOSFETs besides one (when the duty cycle is higher than ⅚).

Figure 1F:
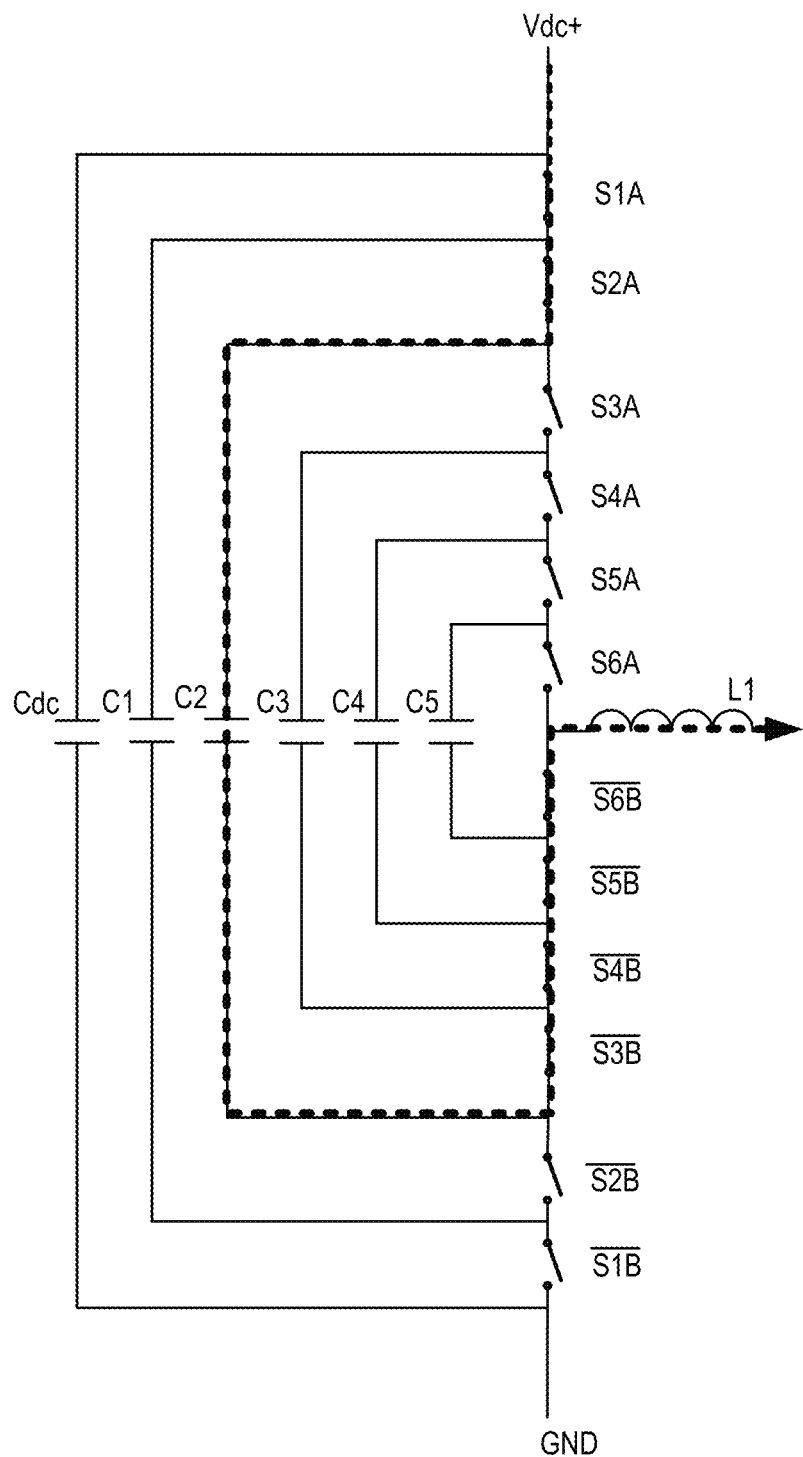

As another example, FIG. 1F shows the switch states and current flow when there is an overlap between S1 and S2 (due to a duty cycle between ⅙ and ⅖ in this specific example. The dotted line again shows the path from Vdc towards the output, and in this case capacitor C2 is used. C2 is charged to a voltage of ⅘*Vdc, and therefore the output is Vdc−⅘*Vdc=⅖*Vdc. In this specific case the PWM multiplexing will be between ⅙*Vdc (as in the previous case of a single MOSFET in the ON state) and ⅖*Vdc, corresponding to a duty cycle that is between ⅙ and ⅖.

Figure 1G:
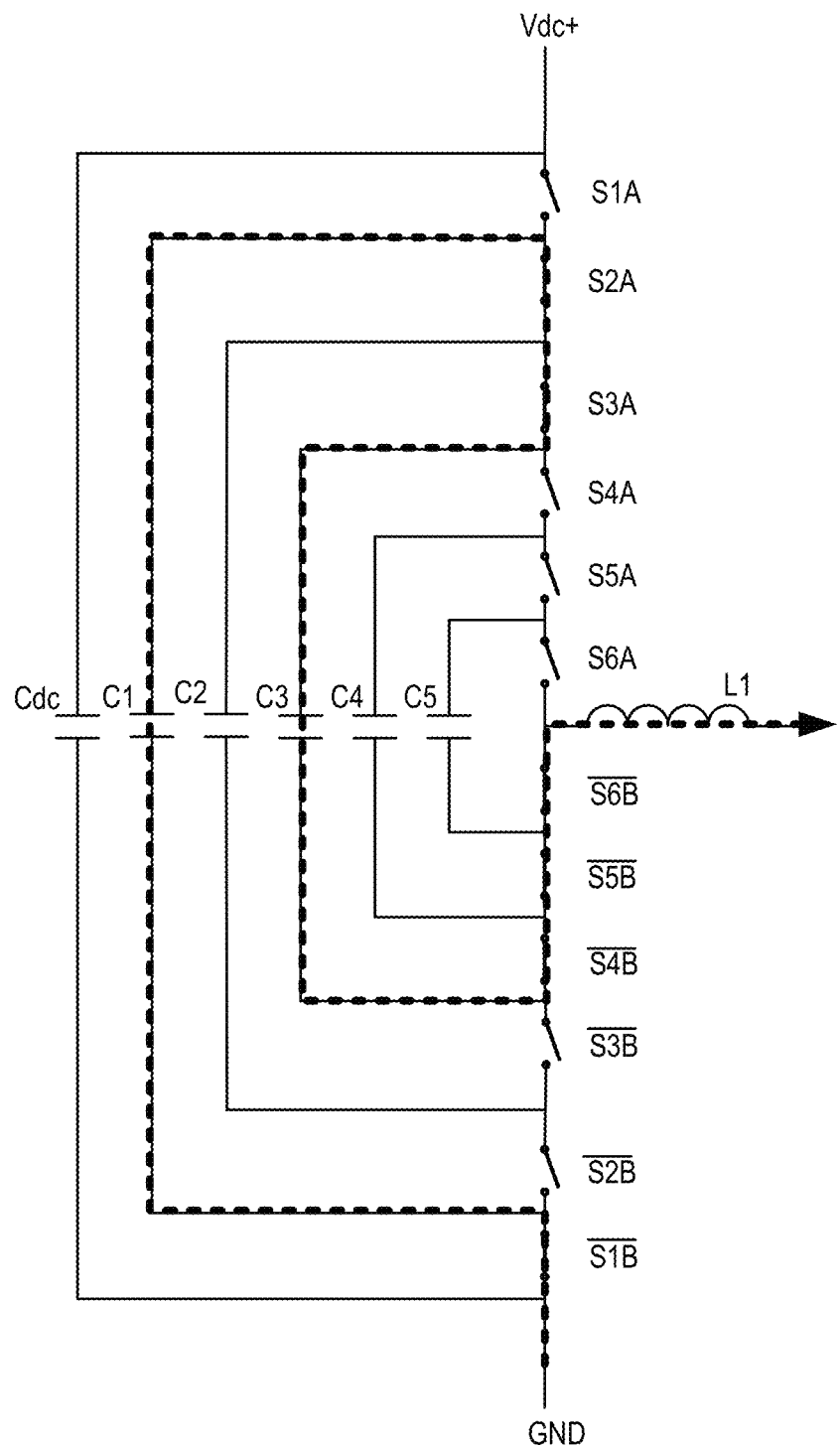

Another example of a duty cycle between ⅙ and ⅖ is shown in FIG. 1G where two capacitors are used in the same path towards the output. This is a case of overlap between S2 and S3, again for duty cycles between ⅙ and ⅖. The path goes through capacitor C1 (Vdc*⅚) and capacitor C3 (Vdc*⅗) but in different directions, such that the output voltage is Vdc*⅚-Vdc*⅗=Vdc*⅖, which is the same as the previous case. Now, however, capacitor C3 gets charged with ripple current and capacitor C1 gets discharged with ripple current. It is noted that capacitor C1 was charged in the previous case now gets discharged and eventually can ripple about the same value (⅝Vdc).

In various embodiments, the basic timing diagram that was presented is built such that the same duty cycle is used for all six MOSFETs and there is a phase delay of T/N between these MOSFETs which will eventually yield the required voltages according to the duty cycles while keeping all of the capacitors charged and discharged to the same average value.

Figure 2D:
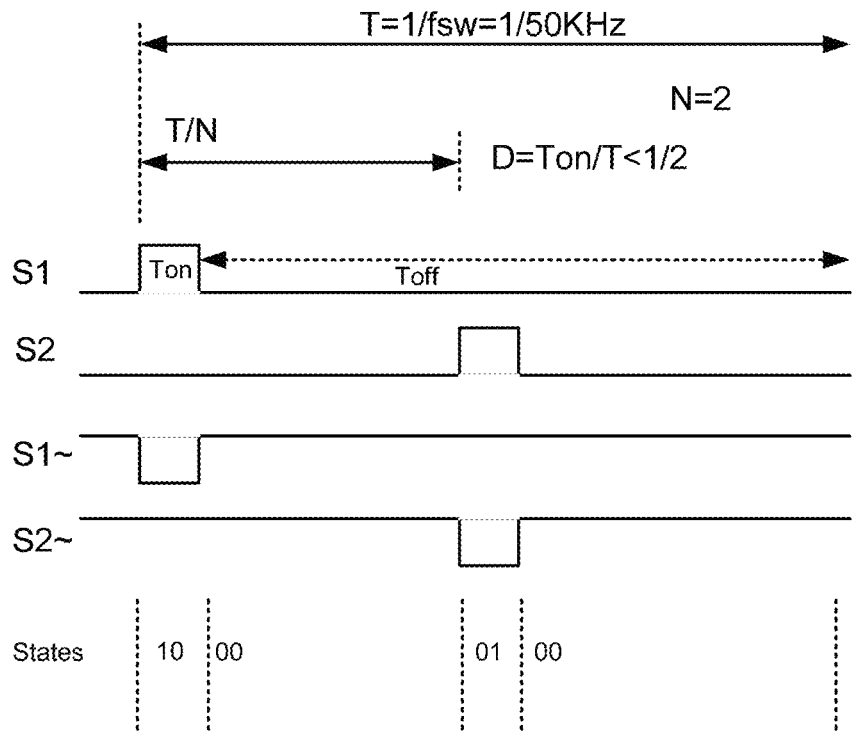
Figure 2E:
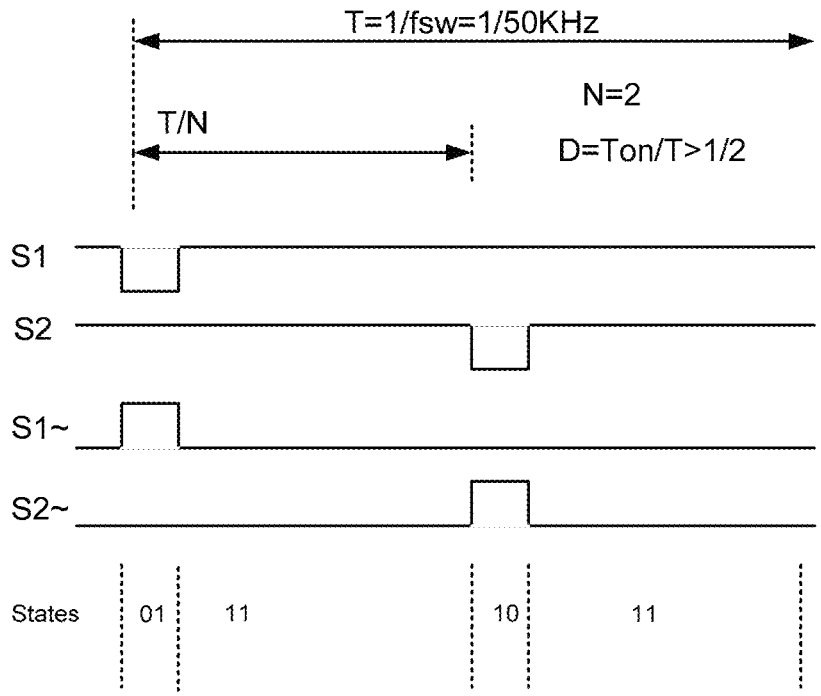

As further examples, FIGS. 2D and 2E illustrate timing diagrams for low duty cycles and high duty cycles, respectively for the circuit implementation of FIG. 1D based on N=2 (two MOSFETs in series). For each of these cases (low duty cycle, high duty cycle), there are several states (00, 01, 10, 11) where 0 and 1 denote which of the switches [S1,S2] are ON or OFF (and S1~ and S2~follow them as complementary signals).

Figure 1H:
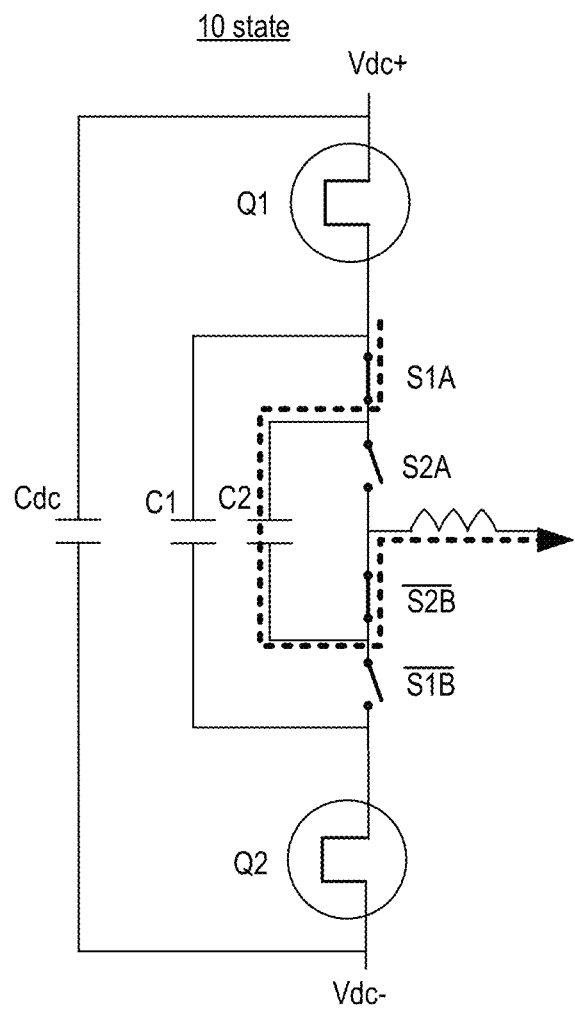
Figure 1I:
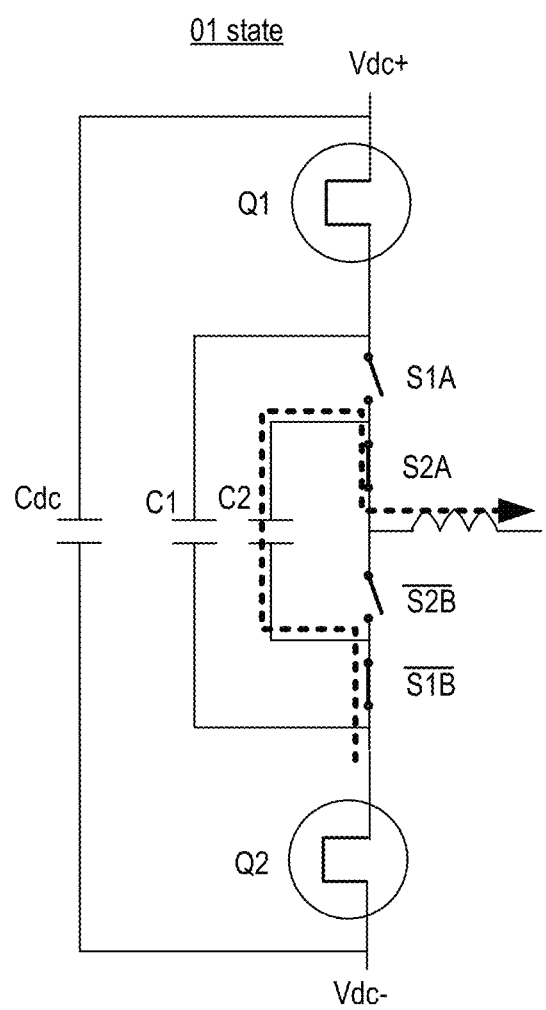

For states 00 (S1 and S2 OFF) and 11 (S1 and S2 ON), current flows directly from Vdc or GND, without going through the capacitor C2 (also identified as the flying capacitor). However, states 01 and 10 flow current into the capacitor where each of these states is opposite in the current direction as shown in FIGS. 1H and 1I. In the timing diagrams shown FIGS. 2D and 2E, the dwell time in state 01 and state 10 is the same and therefore the capacitor C2 gets charged and discharged by the same portion and eventually stays balanced. However, due to possible mismatches and drifts there is a need to actively tune the capacitor voltage.

Figure 2F:
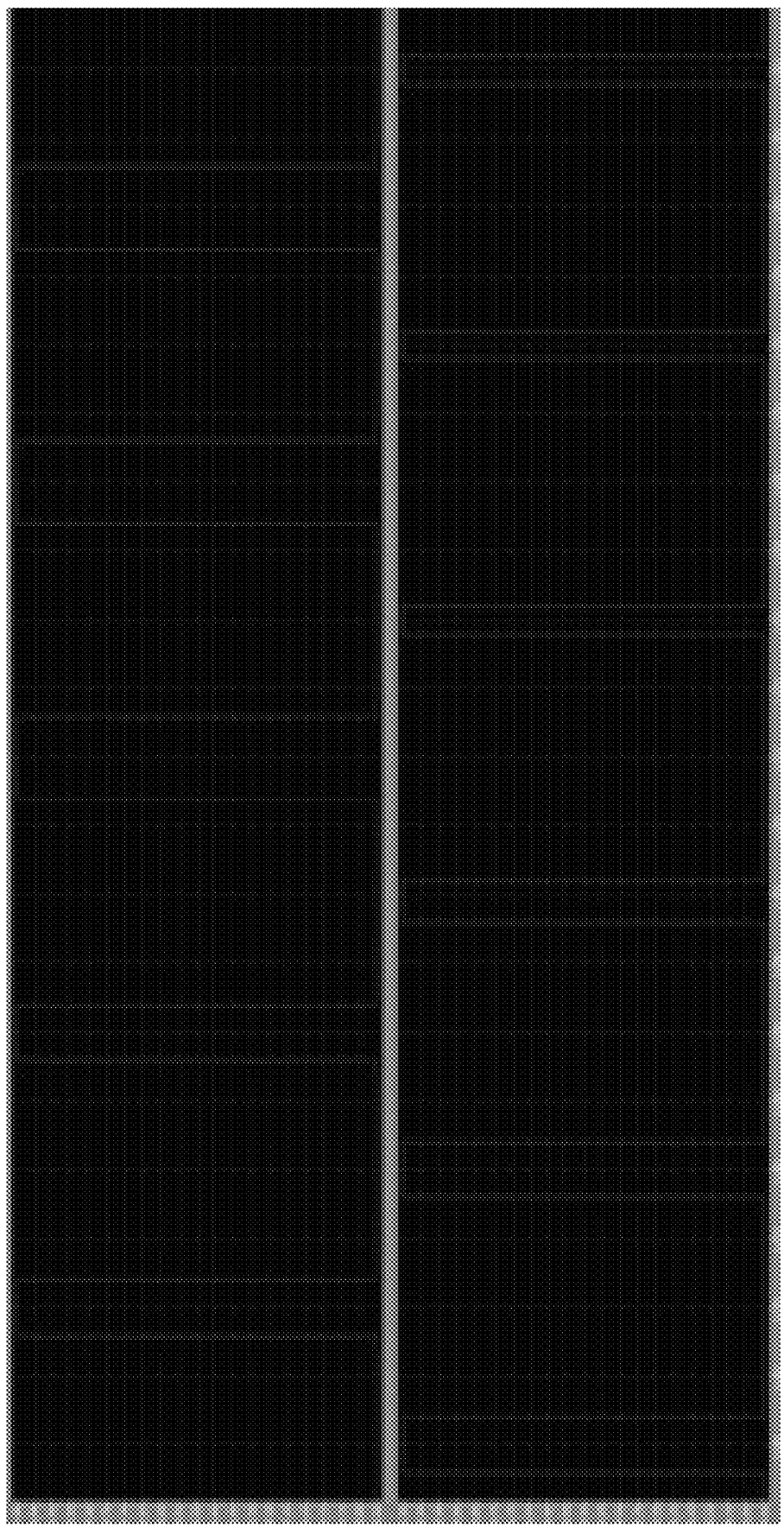

One method for balancing the flying capacitor drifts is by changing the dwell time of each of the states 01 and 10 such that in average we will have the required dwell time which fixes the required duty cycle but the dwell time difference will allow more charge than discharge or the opposite. FIG. 2D illustrates a timing diagram that has a 20% duty cycle for each S1 and S2 signals. In FIG. 2F, the timing of S1 and S2 are illustrated, with the timing of S1 being changed to a 30% duty cycle and the timing of S2 being changed to 10% such that the average is 20% as required but a drift of the capacitor C2 voltage is towards its required steady state value.

Another method for balancing capacitors is to change the timing diagram such that the state 01 is switched to more times than state 10. This type of balancing solution is more generic and can be used more easily in cases of more than two states (e.g., in the case of more MOSFETs in series) where a particular state is chosen in any time in order to drift the flying capacitors to their pre-charged steady-state value.

In addition to the conduction and switching losses advantages discussed above, another major benefit of the embodiment shown herein is the reduction of passive components (e.g., main choke and output filter sizes). Due to the multi-level voltages, a factor of N (e.g. 6 in the example) can be reduced in size/cost. In addition, the effective frequency within the main choke is N times the switching frequency (e.g. 6*200 kHz in this case). The result of embodiments in accordance with this example is that the main choke can be smaller by a factor of N^2 (e.g. 36) relative to a standard design using 200 kHz. Since usual inverters use much smaller switching frequencies (e.g. 16 kHz) due to limitations of the 600V switches, the overall gain in the main choke size is 200 kHz/16 kHz*36=450 which makes it negligible while in a standard inverter it is about 20% of the size and cost of the inverter. A similar calculation can be made for the output filter showing even greater advantage.

Embodiments of the present invention switch at a higher frequency such as 16 KHz or 33 KHz or preferably 50 kHz, 100 kHz, 150 kHz, 200 kHz, 250 kHz, 300 kHz or even higher), and the manner in which the switches are modified in accordance with, for example, FIGS. 2A-2F. The gain in accordance with inverters of the present examples gain a factor of n squared. This unusual result is achieved in part by switching only one component at a time instead of switching all of them in one cycle. Using low voltage MOSFETs, it is possible to switch all of the switches in the same output voltage cycle while still achieving comparatively low switching losses which allows further gains and efficiencies.

Usually about 20% of both size and cost of an inverter are related to the main choke. In embodiments described herein, increasing the frequency to, for example, 6*16 kHz and increasing the number of switches to 6 can result in an additional gain factor of 36 relative to the original 16 KHz because of the multi-level components. In these embodiments, the cost of the main choke can be as little as one percent or even less than that of the overall inverter cost. In addition, because of switching method described herein, the inverter will be much more efficient and also the production of the output voltage will be much better which gains substantial efficiency. It means that the enclosure and the inverter can be dimensionally much lower and therefore a much smaller and cheaper enclosure can be used. The size and cost of the enclosure is reduced both because of reduction of the main choke, reduction in the filter, and because of improved efficiency, which provides a smaller and more compact enclosure.

The control shown in FIGS. 2A-2F has been demonstrated to have substantial efficiencies over conventional control circuits. For example, the control illustrated in FIG. 2A allows the switches S1A-S6A, S6B-S1B, S1C-S6C, and S6D-S1D to be switched all within one period, in this embodiment with the switching of switches in one bank to be offset as shown in FIG. 2A. In these embodiments, the switches operate six times higher than other control mechanisms.

Referring again to FIG. 1A, an inverter is may comprise two halves with symmetry on each side of the inverter. In the embodiment of FIG. 1A, there are 4 banks of six switches each for 24 switches which operate at a lower voltage (e.g., 80V) and a higher frequency (e.g., 200 kHz). The higher frequency switching allows staggered switching of each switch in each bank (e.g., all six switches) in one cycle, which is six times faster than conventional modulators.

For voltage, where the absolute voltage is around 350V (which may be a voltage received from a DC source such as a bank of solar panels), this voltage may be utilized to produce an AC voltage of, for example, 230V. The switching elements in each bank when coupled with the capacitors C1-C5 and C6-C10 may be switched such that the voltages across switching banks A and B and switching banks C and D may sum to a voltage of approximately 350V in this example. Because the voltage across any one switch can be much lower than 350V because the voltage is spread over each of the switch/capacitor combinations, the voltage of the switches can be much smaller (e.g., 350 divided by 6 which or around 60V). This voltage can be made lower and/or higher depending upon the number of switches in each bank.

Referring to FIG. 2A-2F, the switches may be configured to switch all during the same cycle. For example, the switches may each be switched at, for example, 200 kHz. This allows each switch to turn "on" for a predetermined period such as 1/200 kHz or around 5 microseconds, during which time each switch turns on and off. In a conventional multi-level inverter, only one switch will switch at one cycle of one of the 16 kHz. However, in embodiments described herein, the low voltage MOSFETs may be switched at a much higher rate (e.g., 200 kHz) and additionally all of the switches in one bank may be switched during the same period. This example effectively increases the speed to 6 times the switching period, without actually increasing the switching frequency. Further, the design is scalable in that it can be increased more and more by adding more transistors to the switching banks; the multi-level switching in each bank allows the switching to increase in frequency without driving the MOSFET faster (e.g., six times faster).

This is an advantage of multi-level inverters in the examples herein in that you can switch six, eight, ten, twelve, or more times faster depending on the number MOSFETs in a series in each switching bank. One advantage associated with certain embodiments, is that it is possible to switch 6, 8, 10, 12, or more times faster by switching all of the MOSFETs during the same period, without actually switching any one of the MOSFETs faster than the original speed. This is a structural advantage cannot be achieved in inverters today because the switching ability of conventional designs cannot achieve this result. By controlling the control switches to operate in accordance with FIGS. 2A-2F, for example, it is possible to super charge a multi-level inverter to switch all the switches during the same cycle time and thus achieve an effective frequency of, for example, six times higher without actually switching any of the switches (e.g., MOSFETs) at a higher frequency.

Because of the higher switching frequency in accordance with the present embodiments, in addition to a smaller choke, the capacitors between the switches will be smaller. This is part of the size and cost reduction. Additionally, the inductors L1 and L2 are also made smaller. In general, there are many components that shrink by going to a higher frequency, which is being increased, also by the factor of 36.

Again referring to FIGS. 2A and 3, the control into S1A-S6A is inverted from the control input into switches S1B-S6B (e.g., when S1A is closed, S1B is open). With respect to switches S1C-S6C, the control inputs to these switches are inverted from the control inputs to switches S1A-S6A (e.g., when S1A is closed, S1C is open). With respect to switches S1D-S6D, these switches have the same control input as those of switches S1A-S6A (e.g., when S1A is closed, S1D is closed). While the processor needs to control 24 switches, because banks A and D receive the same six control signals and banks B and C receive the opposite six control signals, it is possible to have only six output control signals input respectively to each of S1A-S6A and S1D-S6D and the inverse of these six control signals sent to S1B-S6B and S1C-S6C.

In these embodiments, S1C-S6C are inverted and S1D-S6D are not inverted with respect to the control input signal. Further, S1A-S6A are not inverted and S1B-S6B are inverted. Thus, 24 switches may be controlled with only six different control outputs from the processor. See, for example, the exemplary control structure shown in FIG. 3.

Various alternate embodiments may also be employed. For example, referring to FIG. 4, an alternate embodiment is shown which includes a single leg of multi-level MOSFETs that may be configured to generate a rectified sine-wave by performing DC/DC operation (buck) during a sine-wave cycle. In this embodiment, the output of the leg may be inverted by a low-frequency full-bridge operated at AC line frequency (e.g., 50 Hz).

With this variation, the switching losses at the high-frequency are reduced by a factor of two relative to a full-bridge implementation and the conduction losses are a combination of the single multi-level leg and the slow-switching full-bridge. It is possible to reduce the conduction losses of the slow-switching full-bridge by using improved components (e.g Super-junction MOSFETs or a series-stack of low-voltage MOSFETs) while not increasing switching losses due to low switching frequency.

Another benefit of this variation is that the component cost may be further reduced since there is only one multi-level leg with all the drivers and balancing capacitors and the full-bridge components can be made much cheaper than the cost of another multi-level leg.

Again referring to FIG. 4, the output of the high frequency stage is a rectified sine-wave (e.g., whenever the sine-wave is positive, it is the same, whenever the sine-wave is negative, it's still positive). The high frequency stage may be configured to generate a sine-wave but it is always positive. The low frequency stage inverts the rectified sine-wave to positive and negative, to create a true sine-wave. The low-frequency stage may be configured to invert the signal whenever it is needed. In this embodiment, the low frequency stage has a number of switches such as four switches S10, S11, S12, S13. In this example, the positive cycle of the sine-wave can be achieved by having the top-left S10 and bottom right S11, switching to on. When the other half of the signal is processed, the control can switch on the other diagonal, e.g., the upper right switch S12 and the bottom left switch S13 to invert the signal completing a sine-wave. These switches may be controlled via a processor such as processor 10 shown in FIG. 3.

The use of MOSFETs for the first high frequency stage controlled as discussed herein in order to shape the rectified sine-wave is another example of the invention. The advantages discussed above with respect to FIGS. 1A-1I, 2A-2F, and 3 can be achieved in the embodiment of FIG. 4 with only 16 switches as opposed to the 24 switches of FIG. 1A. Thus, substantial advantages can be achieved and further reduced costs and components.

Figure 5:
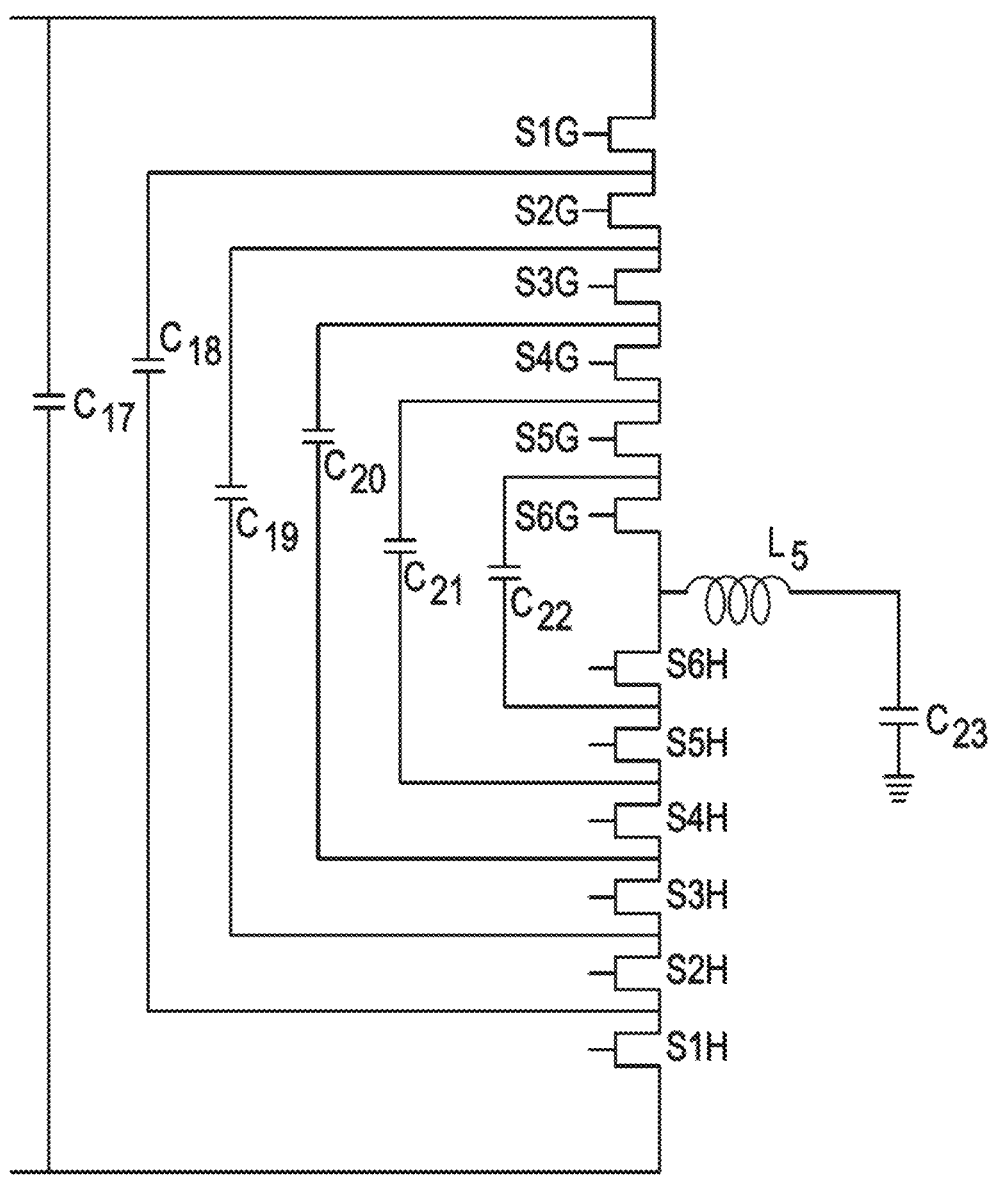
FIG. 5 illustrates aspects of the multi-level inverter in accordance with embodiments herein.

Still another embodiment is shown in FIG. 5. In the embodiment of FIG. 5, S1G-S6G and S6H-S1H and C17-C22 operate above as discussed with respect to FIGS. 1A-1I, 2A-2F, and any of the other embodiments discussed below. In this embodiment, a single phase inverter adds an additional multi-level leg at the input of the inverter. In other words, the circuit of FIG. 5 may in FIG. 1A (or any of the other embodiments) be connected across the Vdc (e.g., 350 v) input (e.g., C17 of FIG. 5 is connected across the 350 v input bus). As further discussed herein, this architecture may be referred to as the active capacitor concept. The additional leg may be configured to act to transfer capacitive charge between the DC link capacitor (C17) and the storage capacitor (C23) in order to compensate for the low frequency pulsation, such as a low frequency pulse of around 100 Hz. Since the storage capacitor C23 may be configured to fluctuate with full voltage swing, its size can be reduced considerably relative to the original size of the input bus capacitance. The size of C17 can be very small.

This type of solution for reducing the DC link capacitor C17 when implemented using multi-level topology with low-voltage MOSFETs as shown can be very efficient (0.2% losses) and therefore reduce both size and cost without a high impact on the performance.

In FIG. 5, the capacitor C17 on the input takes the difference between the output power and the input power. The input power is DC and the output power is AC. The output power is fluctuating and the DC power does not fluctuate because it is DC. Some capacitors absorb over/ under power in view of sine-wave fluctuations. Usually, the input capacitor, on such an inverter is very big and can be 10 percent of the cost of the inverter. With respect to the embodiment shown in FIG. 5, instead of having a very big capacitor which is C17, using this embodiment, C17 can be very small and actually performing DC to DC conversion between C17 and C23 due to the low power MOSFETs and control switching topology discussed herein. For example, whenever there is too much power on the AC side, then C17 needs to provide more power, then it takes it from C23 and whenever there is too much power on the DC side, then C17 gives that redundant power to C23. So, everything is going back and forth between C17 and C23. But eventually it compensates for the difference between the DC power and the AC power. By using the techniques described herein of low-voltage multi-level component with the associated control, embodiments gain the ability to reduce the capacitances of the input of the inverter.

Figure 4:
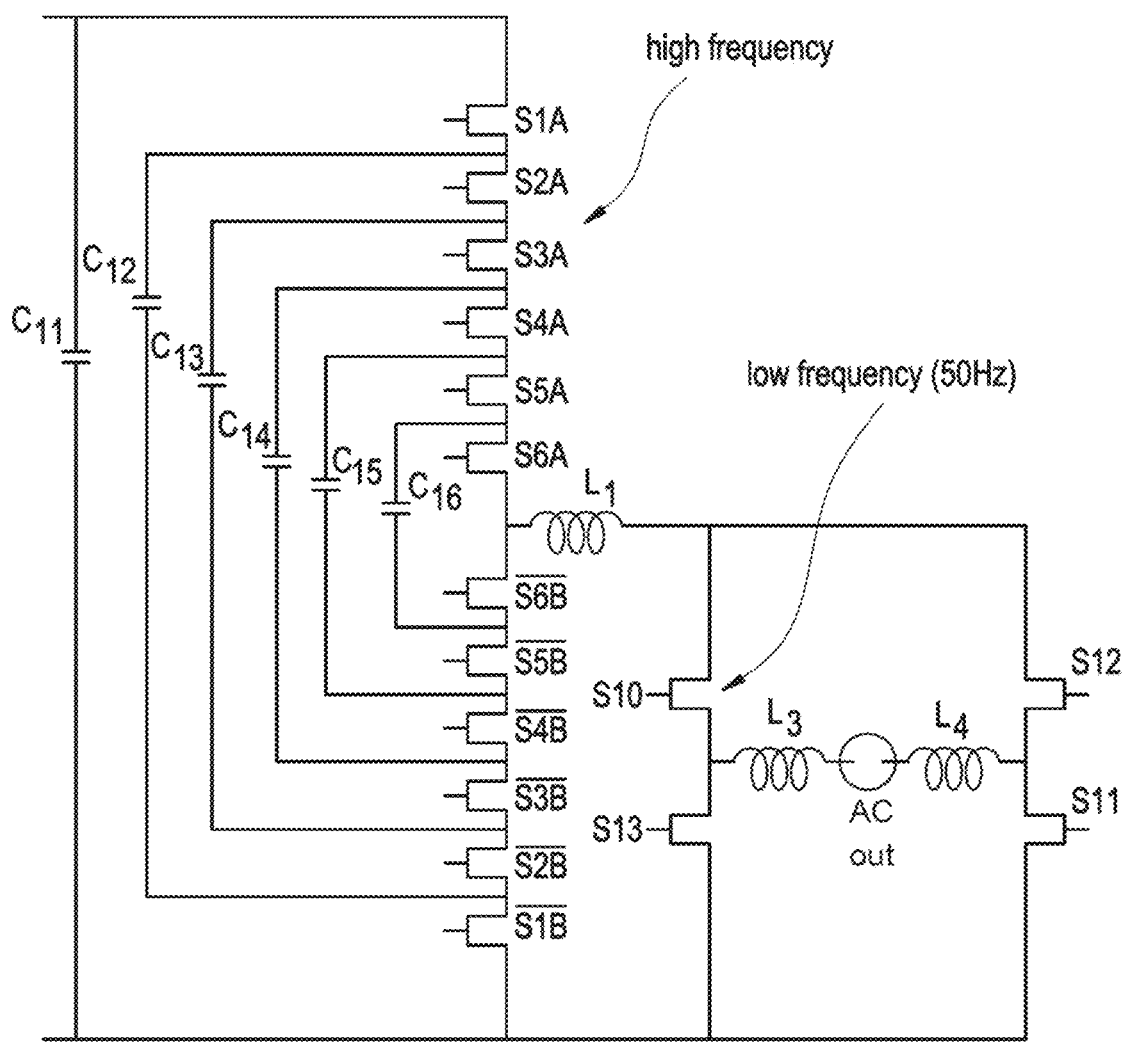
FIG. 4 illustrates another example of a multi-level inverter in accordance with embodiments herein.

In still further embodiments, the capacitor C11 of FIG. 4 can be replaced with the circuit shown in FIG. 5 (e.g., e.g., connected to C17 of FIG. 5). With these examples, the modified FIG. 1A would now have 36 MOSFETs as opposed to 24 MOSFETs. Similarly, for the example where FIG. 4 is modified, the circuit would have 24 MOSFETs as opposed to 12 MOSFETs, but the large capacitor C11 is no longer present. Thus, the circuit shown in FIG. 5 can serve as replacement for the capacitor on the left-hand side of FIG. 1A (not shown) and/or for a replacement for the capacitor shown on the left-hand side of FIG. 4 (C11).

In still further embodiments, such as three phase embodiments, there may be more banks of MOSFET transistors. For example, referring to FIG. 1A, there may be additional banks of MOSFET transistors S1E-S6E and S1F-S6F and associated capacitors. These MOSFET transistors would be controlled in the same manner as the other legs and transistor banks discussed herein. In this example, instead of just two legs shown in FIG. 1A, one on the left and one leg on the right, you may have three legs similarly configured.

Figure 6:
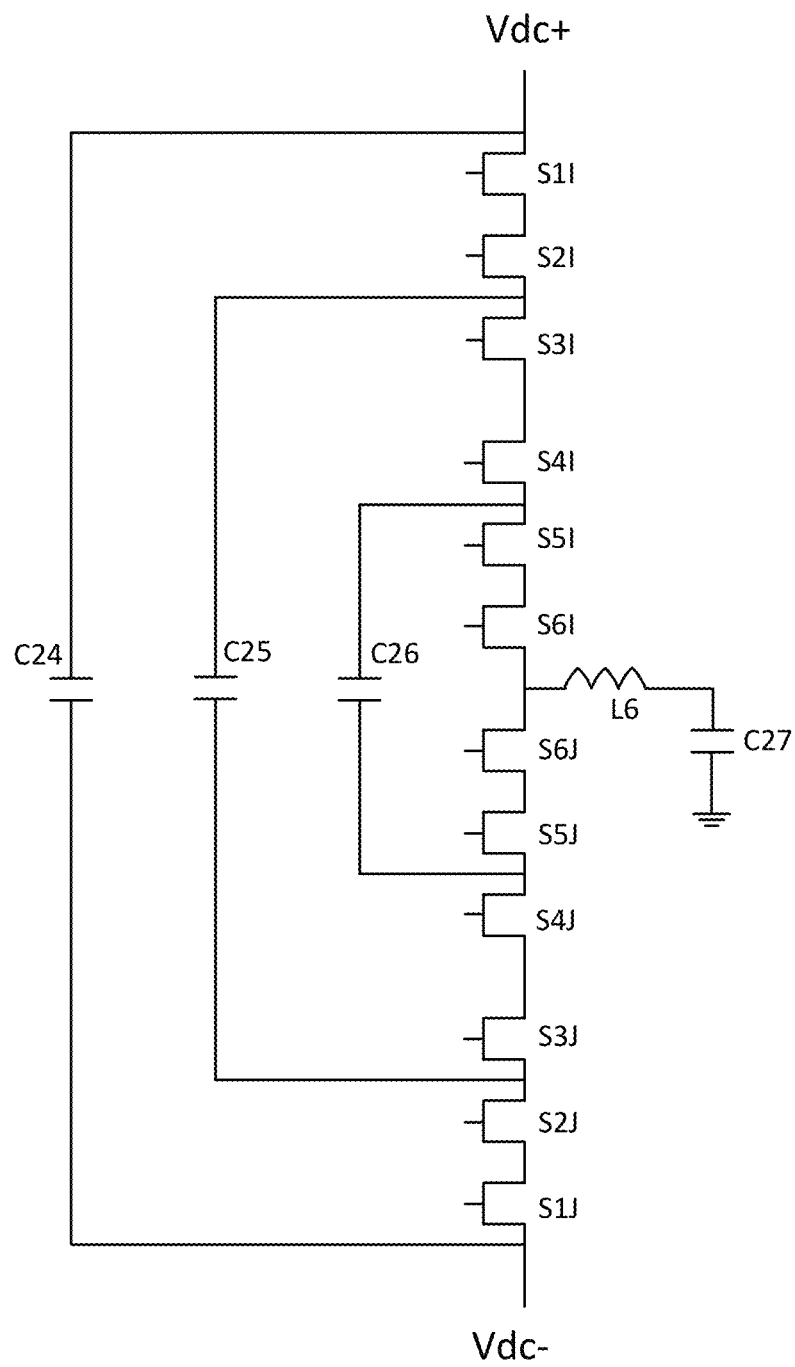
FIG. 6 illustrates aspects of the multi-level inverter in accordance with embodiments described herein.

FIG. 6 shows another embodiment similar to the flying capacitor topology or the capacitor-clamped multi-level inverter topology shown in, for example, FIG. 1B or 5. In the configuration shown in FIG. 5, two banks G, H of series connected switches are connected to each other between a high voltage and a low voltage and capacitors C17-C22 are nested within each other between the two banks. The capacitors are nested within each other by connecting the ends between corresponding switches in each bank. For example, capacitor C18 is connected at a first end between S1G and S2G and at a second end between S1H and S2H. Similarly, capacitor C19 is connected at a first end between S2G and S3G and at a second end between S2H and S3H.

The circuit shown in FIG. 6 reduces the number of capacitors used in the circuit compared to the embodiment shown in FIG. 5. For example, capacitors C18, C20, and C22 from the circuit of FIG. 5 are absent in the circuit shown in FIG. 6. Each two MOSFET transistors in series may be considered as one switch with only one mutual PWM control signal. For example, switches S1I and S2I may be considered as one switch and be controlled by a single PWM control signal. Similarly, switches S3I and S4I, S5I and S6I, S6J and S5J, S4J and S3J, and S2J and S1J may be paired. Capacitor C25 is connected at a first end between S2I and S3I and at a second end between S2J and S3J. The series connection of these two MOSFET transistors allows spreading of the voltage stress between the two MOSFET transistors assuming they are balanced at OFF state and transition times. This balancing may be accomplished with either by biasing the drives of any two adjacent MOSFETs or by still keeping C18, C20, and C22 from FIG. 5 with small capacitance and driving the two adjacent MOSFETs (e.g., S1I and S2I, S3I and S4I, S5I and S6I, S6J and S5J, S4J and S3J, S2J and S1J) at similar timing such that C18, C20, and C22 will be kept balanced for the transition period only. The implementation of FIG. 6 may be applied to any of the embodiments herein.

Figure 7:
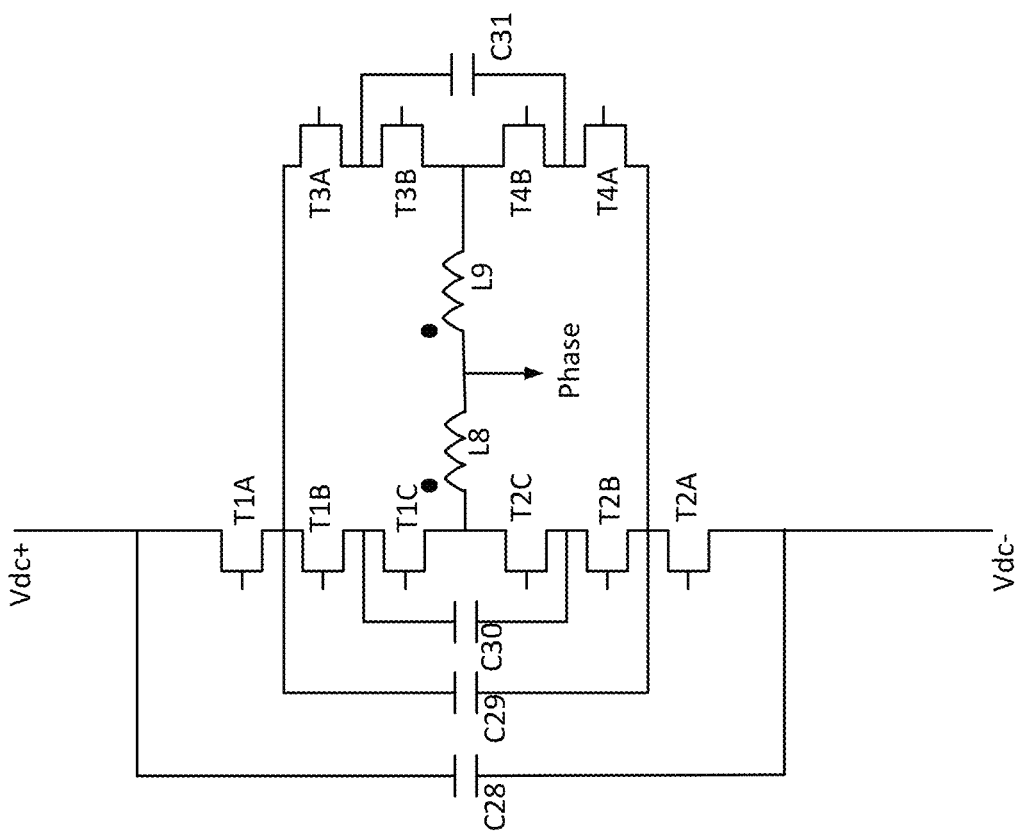
FIG. 7 illustrates aspects of the multi-level inverter in accordance with embodiments described herein.

FIG. 7 shows another embodiment that is able to reduce the capacitance of one of the flying capacitors. In this embodiment, standard multi-phase techniques are used by having parallel switches in the middle of the phase leg such that each parallel switch leg is switched in a time-shifted manner versus the other switch leg in order to provide multi-phasing (e.g. 180° in the shown case of two parallel phase legs). In FIG. 7, the parallel switch legs may be a first leg of switches T1B, T1C, T2B, T2C and a second leg of switches T3A, T3B, T4A, T4B. Multi-phasing enables reduction of the ripple voltage in the flying capacitor C29 by a factor of four, which allows the reduction of the capacitance of the flying capacitor C29 by the same factor. Additionally, the phase inductor L6 as shown in FIG. 6 can be split into two inductors L8, L9 where mutual coupling eventually allows the reduction of the inductors' size below the original required inductor L6 in the case where multi-phasing is not used.

Multi-phasing may be used between parallel phase legs in order to achieve benefits in the input capacitance and output inductance. In the embodiment shown in FIG. 7, the multi-phase technique is employed on a sub-set of the phase leg in order to reduce the flying capacitors and not just the main capacitance of the whole phase leg.

More generally, multi-phasing can be applied to each of the flying capacitors separately and then also applied to the whole leg thereby achieving a hierarchical structure of multi-phasing.

Figure 8:
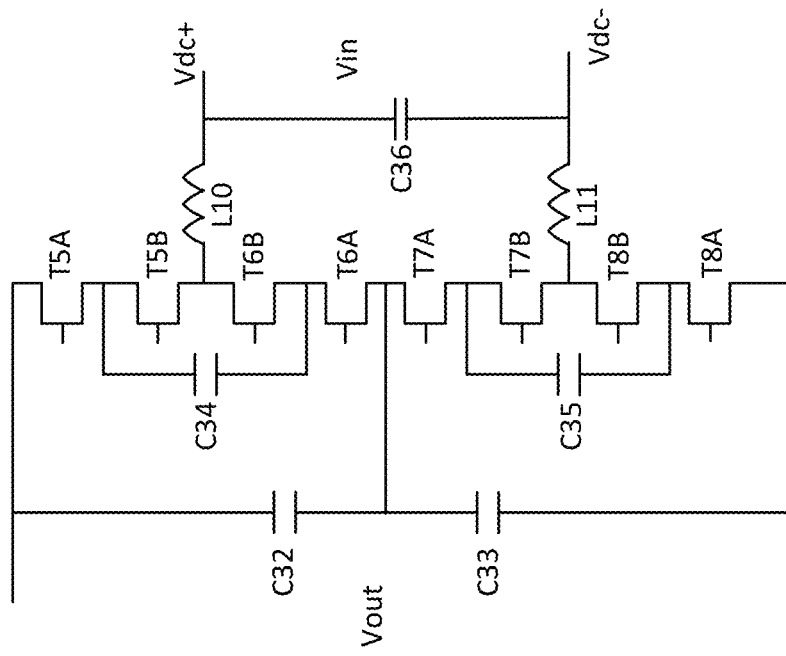
FIG. 8 illustrates aspects of the multi-level inverter in accordance with embodiments described herein.

FIG. 8 shows another embodiment that may be applied on a high voltage boost converter (e.g. as a front-end subsystem of a photovoltaic panel inverter or not necessarily related to an inverter) utilizing the multi-level inverter topology and using low-voltage MOSFET transistors at high switching speeds with staggered timing in the same manner as described herein.

This structure is split into two halves where each half of the structure handles half of the input voltage by using multi-level techniques (in the case of FIG. 8, three-level). It can be of course extended to higher numbers of switches in series thereby increasing the number of levels in each half. For example, in FIG. 8, the switches T5A, T5B, T6A, T6B may form the first half, and the switches T7A, T7B, T8A, T8B may form the second half. The control signals to switches T6A-B may an inverted version of the control signal to switches T5A-B, respectively. For example, the control signal to switch T6A may be inverted from the control signal to switch T5A, and the control signal to switch T6B may be the inverted version of the control signal to switch T5B. The timing of the control signals to the A switches (T5A, T6A) may be the delayed version or the same as the controls signals to the B switches (T5B, T6B). Control signals similar to the first half may be applied to the second half. For example, the control signals to the A switches (T7A, T8A) may be inverted versions of each other, and the control signals to the B switches (T7B, T8B) may be inverted versions of each other. The control signals to the T7 switches may be the same or different than the control signals to the T5 switches. Similarly, the control signals to the T8 switches may be the same or different than the T6 switches.

Figure 9:
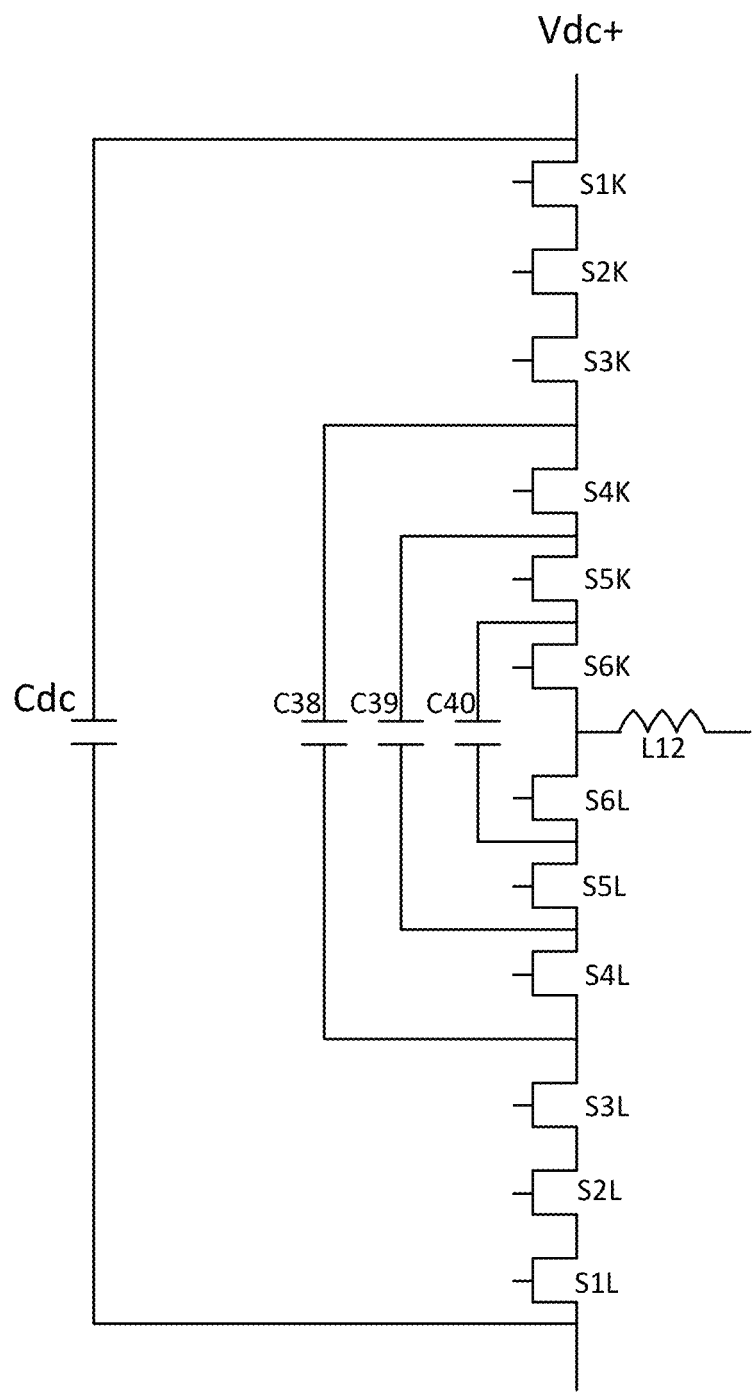
FIG. 9 illustrates aspects of the multi-level inverter in accordance with embodiments described herein.

FIG. 9 shows another embodiment reducing the number of capacitors used in the circuit. For example, capacitors C18 and C19 from FIG. 5 or C1 and C2 from FIG. 1B may be removed or used as a small capacitance for balancing purposes such that the three switches S1K-S3K above capacitor C38 in FIG. 9 and the three switches S1L-S3L below capacitor C38 become low frequency switches that can operate at, for example, 50 Hz complementarily while the other 6 switches S4K-S6K, S4L-S6L connected to capacitors C38-40 act as fast switches (e.g., high frequency switches) using a flying capacitor control method as described herein where the control signals to the switches S4L-S6L are inverted versions of the control signals to the switches S4K-S6K.

Figure 10:
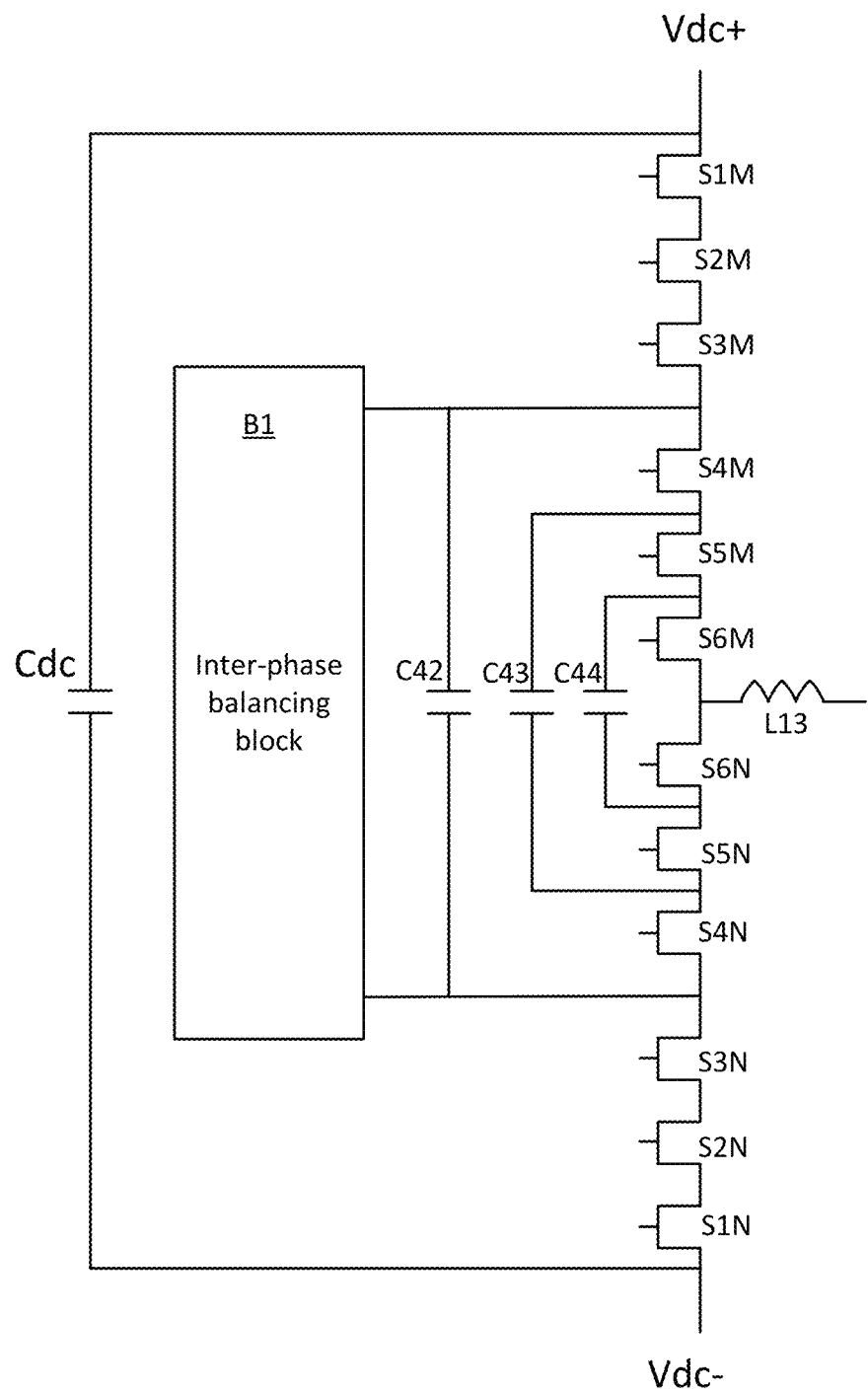
FIG. 10 illustrates aspects of the multi-level inverter including an interphase balancing block in accordance with embodiments described herein.

FIG. 10 shows another version of a multi-level inverter circuit including an inter-phase balancing block. The circuit of FIG. 10 is similar to the circuit of FIG. 9 with the addition of the inter-phase balancing block B1. Similar to FIG. 9, the three switches S1M-S3M above capacitor C42 and the three switches S1N-S3N below capacitor C42 may be low frequency switches. Switches S4M-S6M, S4N-S6N may be fast switches using a flying capacitor control method described herein. The inter-phase balancing block B1 may be connected in parallel to capacitor C42 which is connected at each end between a low frequency switch S3M, S3N and a high frequency switch S4M, S4N. The inter-phase balancing block can share current over capacitor C42 to remove a low frequency (e.g., 50 Hz) ripple over capacitor C42 from the switches S1M-S3M and S1N-S3N being switched at 50 Hz. The circuit shown in FIG. 10 maintains seven levels since, in each 50 Hz half cycle, the circuit shown in FIG. 10 provides three different levels resulting in six levels in addition to the zero level.

The circuit shown in FIG. 10 may comprise a leg of an inverter. An inverter may contain several legs. For example, a single phase inverter may have two legs with the legs connected via the interphase balancing block B1. Specifically, capacitor C42 of each phase may be connected in parallel to the same interphase balancing block B1 or an inter-phase balancing block B1 shared with another phase. As another example, a three phase inverter may include three legs connected to each other via inter-phase balancing block B1. The addition of the interphase balancing block mechanism connected to capacitor C42 of each phase and sharing the currents can remove the 50 Hz ripple over capacitors C42 of each phase. The addition of the interphase balancing block allows a topology that uses only capacitors C42-C44 while maintaining the original seven levels.

FIG. 11 shows an example of an interphase balancing block B1 for a single phase inverter circuit which can have two legs. The interphase balancing block B1 shown in FIG. 11 allows the current that was supposed to flow downwards through capacitor C42 and the current that was supposed to flow upwards through capacitor C42 to cancel one another such that no current will flow through these capacitors. This block B1 enables the 50 Hz ripple to be negated when switch T7 is ON and switch T8 is OFF. Switches T7 and T8 are complementary (e.g., receive inverted control signals of each other) and follow the same polarity as the low frequency switches S1M-S3M, S1N-S3N in FIG. 10. For example, switch T7 may follow switches S1N-S3N, and switch T8 may follow switches S1M-S3M. Switches T7 and T8 may represent any number of switches in series that support the voltage of 6 switches (e.g., MOSFET transistors). The inductors L14 and L15 may be included in the circuit to slow the transition between the two legs or to filter high frequency PWM currents flowing between the legs.

FIG. 12 shows another example of an inter-phase balancing block B1 for a single phase inverter. In the circuit shown in FIG. 12, two control signals with mutual dead-time may be used. One control signal may be used for the switches of T7A and T7B and another control signal can be used for the switches of T8A and T8B.

Figure 13:
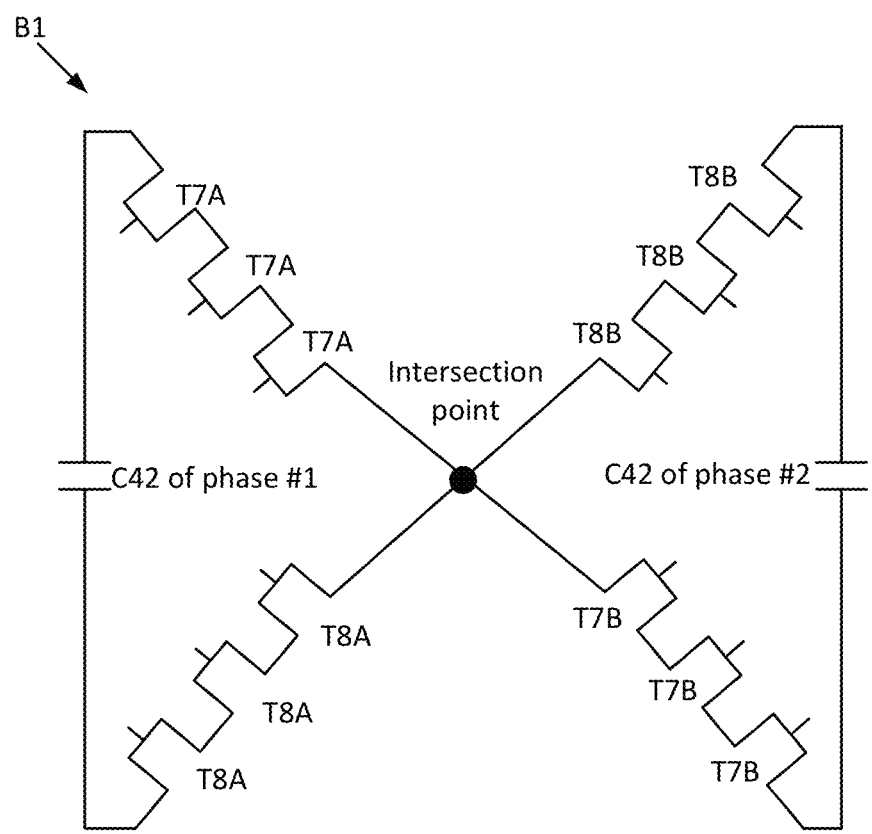
FIG. 13 illustrates an example of an inter-phase balancing block in accordance with embodiments described herein.

FIG. 13 shows another example of an inter-phase balancing block B1 which may be used with different PWM control signals. An even number of switches between the capacitors may be used. Control signals with dead time between the switches of T7A and T8A, the switches of T7A and T7B, and the switches of T7A and T8B may be used.

Figure 14:
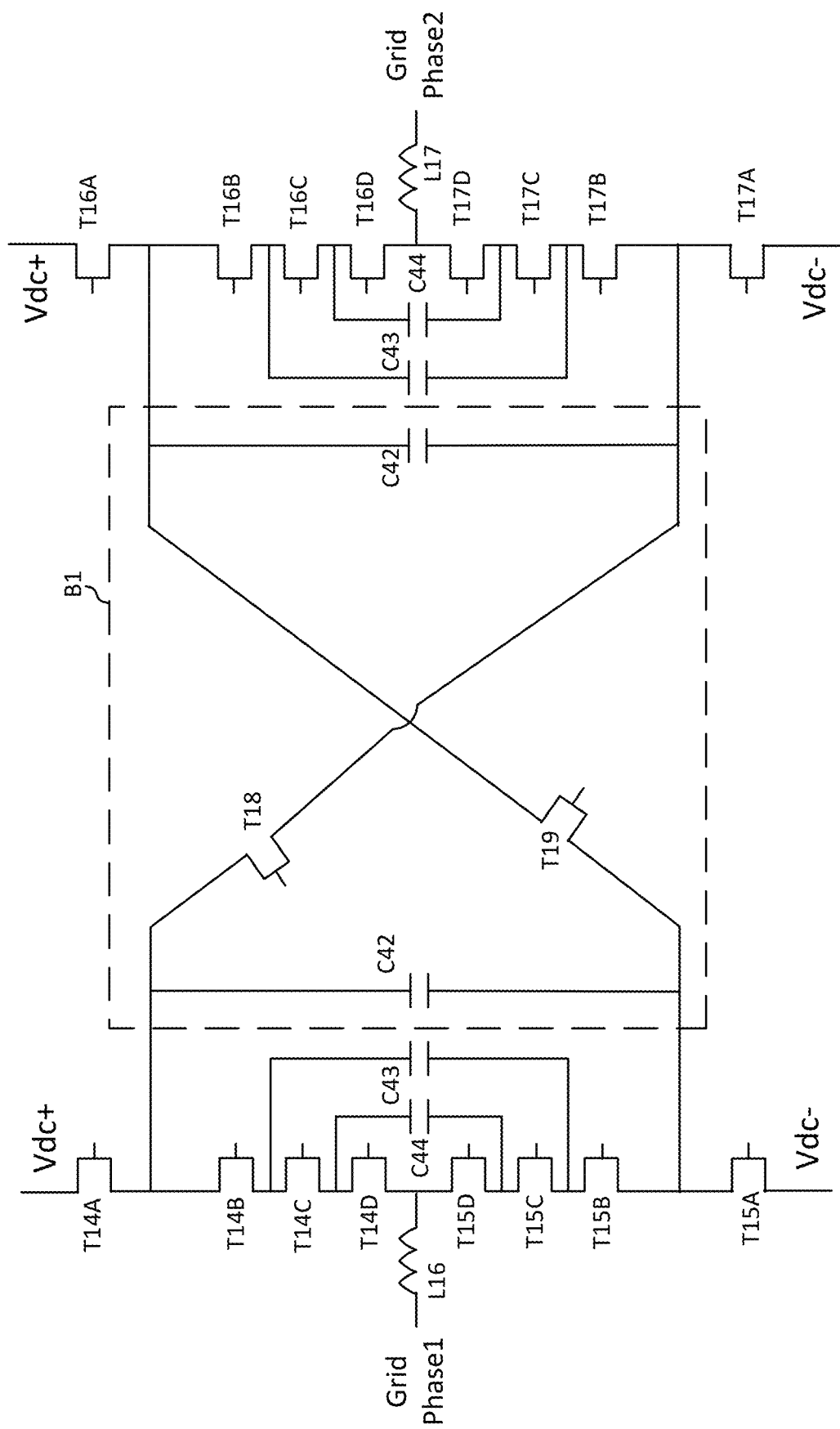
FIG. 14 illustrates an example inverter incorporating an inter-phase balancing block with embodiments described herein.

FIG. 14 shows an exemplary circuit incorporating an inter-phase balancing block B1 in a single phase inverter between the two legs of the single phase inverter. A single switch T14A as shown in FIG. 14 may be used in place of multiple slow switching (e.g., low frequency) series-connected switches (e.g., MOSFET transistors) such as switches S1M-S3M as shown in FIG. 10.

Figure 15:
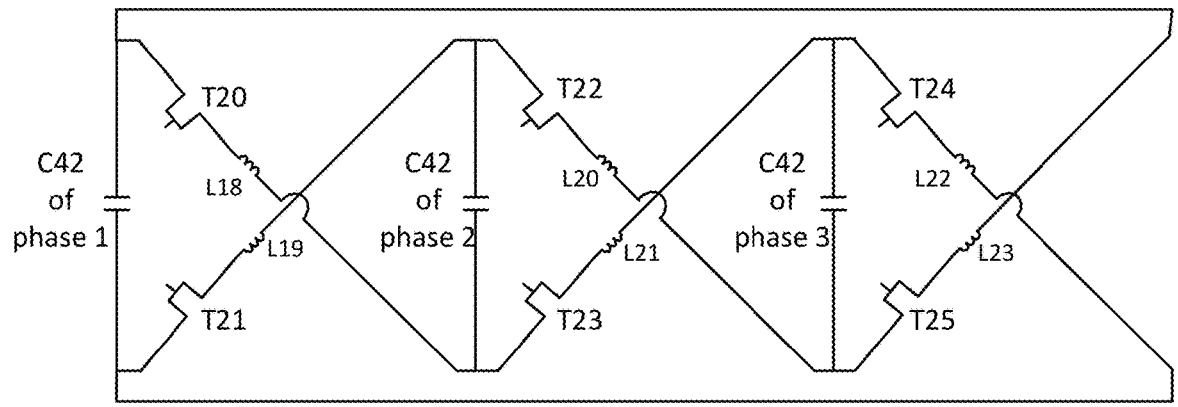
FIG. 15 illustrates an example of an inter-phase balancing block for a three phase inverter in accordance with embodiments described herein.

FIG. 15 shows an exemplary balancing block B1 for a three phase inverter similar to the balancing block B1 shown in FIG. 12 for the single phase inverter. Each capacitor C42 may be connected to the next capacitor C42 or the capacitor C42 of another phase by two switches to cancel out the three ripple currents through the capacitor C42 of each of the three phases such that current does not flow through any of the capacitors C42.

Figure 16:
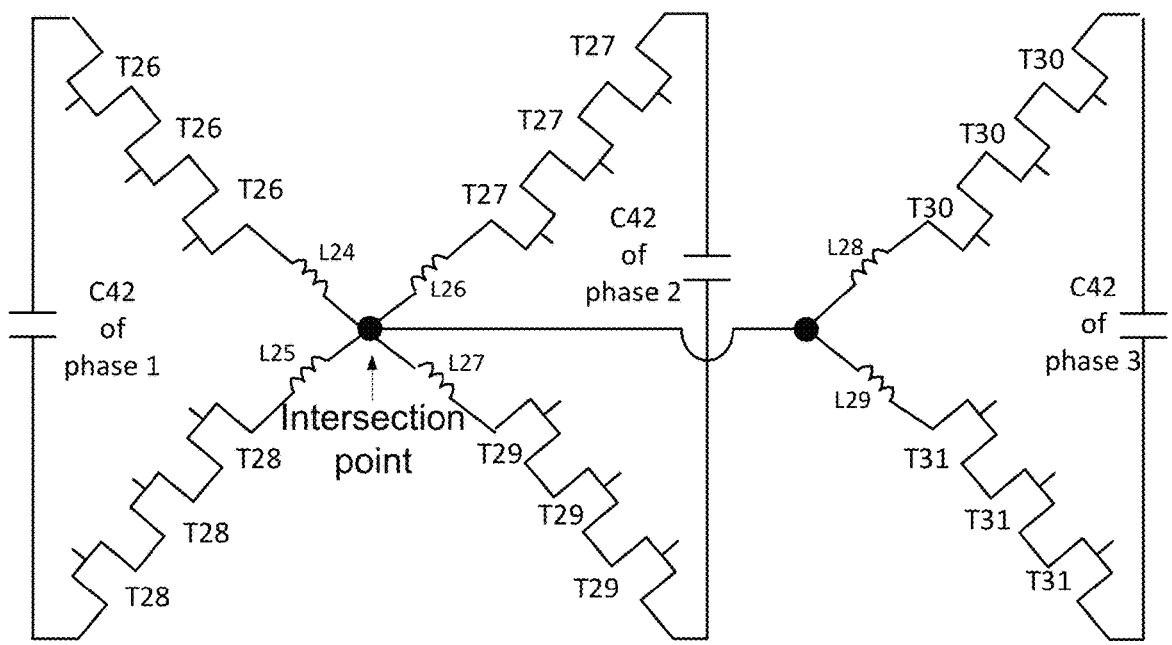
FIG. 16 illustrates an example of an inter-phase balancing block for a three phase inverter in accordance with embodiments described herein.

FIG. 16 shows a variation of a balancing block B1 for a three phase inverter. The balancing block shown in FIG. 16 includes an intersection point. This variation of the balancing block may be used with an even number of switches in series with dead time controlled signals.

Figure 17:
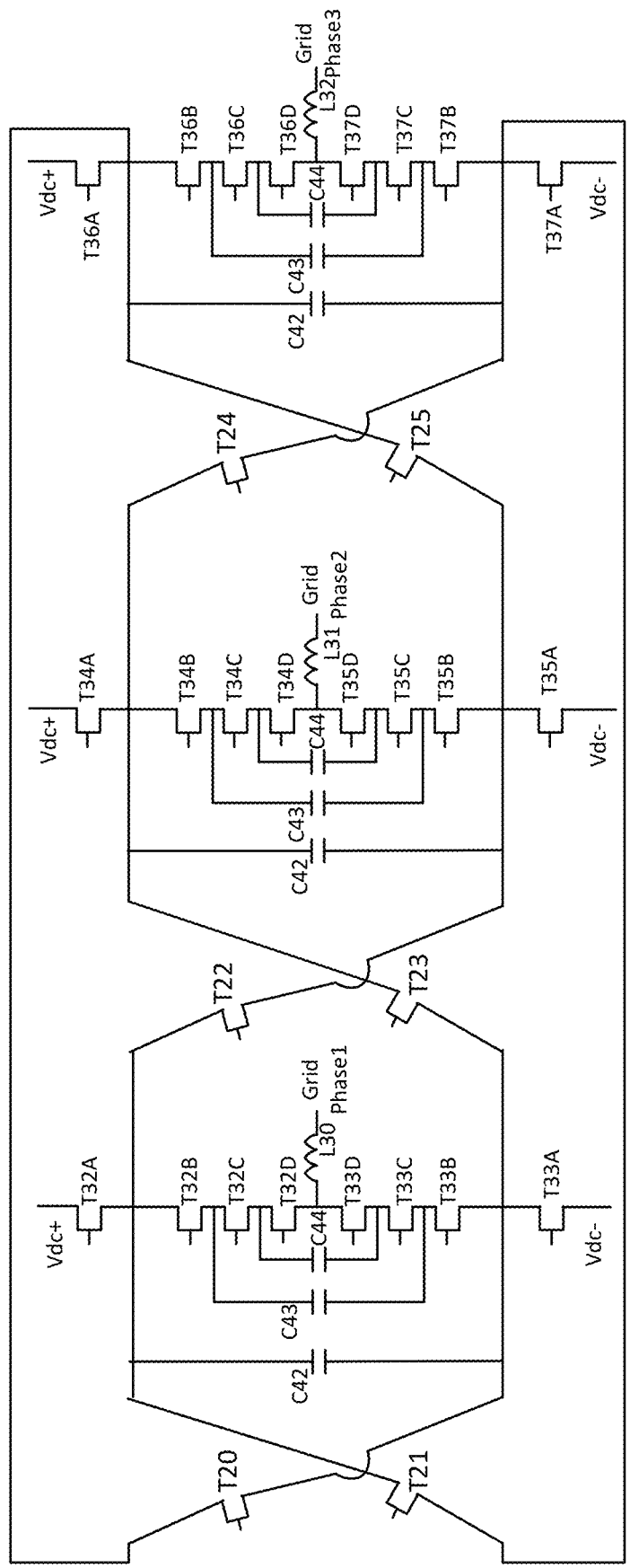
FIG. 17 illustrates an example of a three phase inverter including the balancing block of FIG. 15 in accordance with embodiments described herein.

FIG. 17 shows an example of a three phase inverter including the balancing block shown in FIG. 15. A single switch may be used in place of several slow switching (e.g., low frequency) switches (e.g., MOSFET transistors) in series.

Although the previous examples were directed mainly to either single phase or three phase inverters, the interphase balancing block B1 can be extended to any number of phases such that the balancing blocks in each phase are connected together by a balancing block in each of the phases. In order to maintain balance, the phases should complement to 360 degrees.

FIG. 18 shows an example of a six phase balancing block which may include three phases in a first position and three phases in a position opposite of the first position, where each two phases pair is 180 degrees apart. Instead of having a balancing block per phase and connecting all six balancing blocks together in a similar manner to the three phase case, it is possible to connect each two phases together via their balancing blocks regardless of the other four phases. Each structure contains two phases (having one capacitor C42 for each phase).

As a more generic case, any even number of phases can be used such that each pair of phases are 180 degrees shifted such that they can be balanced one against the other without relation to other phases. For examples, twelve phases can be used such that there are six phases spaced at 60 degrees apart at the AC line frequency and each pair is spaced at 180 degrees apart at the AC line frequency to allow balancing within each pair.

FIG. 19 shows an overall structure of another embodiment of the multi-level inverter. The example structure of FIG. 19 includes three phases having three phase blocks P1 and a balancing block B2 connected to all three phase blocks P1 via the capacitor Cin of each phase block P1. While FIG. 19 shows three phase blocks P1, any number of phase blocks may be used. For example, a single phase having two phase blocks or a six phase having six phase blocks may be used. A phase block may be formed of a half-bridge structure or a flying capacitor structure.

Figure 20:
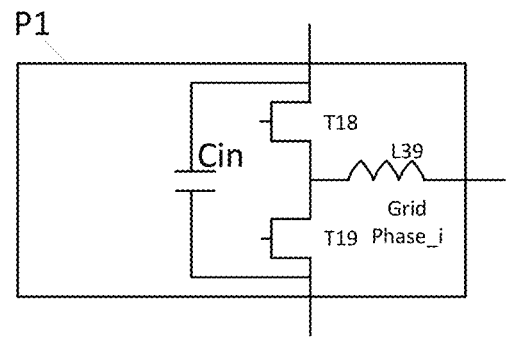
FIG. 20 illustrates an example of a phase block in accordance with embodiments described herein.
Figure 21:
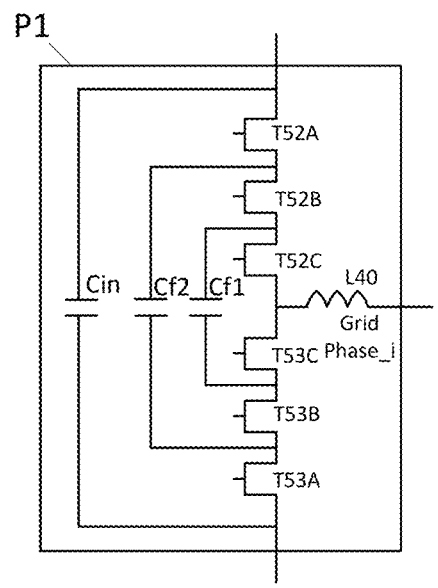
FIG. 21 illustrates another example of a phase block in accordance with embodiments described herein.

Examples of phase blocks P1 are shown in FIGS. 20 and 21. A phase block may be a half-bridge structure as shown in FIG. 20 or a flying capacitor structure as shown in FIG. 21. The half-bridge structure shown in FIG. 20 includes two series connected switches T18, T19 in parallel with capacitor Cin.

In general, each phase block can be a DC/DC converter that is able to output a smoothed PWM output between a high voltage Vh and a low voltage Vl. The DC/DC converter can use the half voltage capacitor to provide the output voltage relative to the half voltage in order to be able to use half of the switches relative to a DC/DC converter spanning the full voltage from Vh to Vl.

The input capacitor Cin of each phase block can provide the half voltage since the switches to Vh and Vl may slowly switch according to the polarity of the 50 Hz sine-wave of each phase. Each phase may transition polarity at a different time. Since the input capacitors Cin will be charged and discharged at a slow rate, a high capacitance may be needed.

The multi-phase system described herein is advantageous in that a sum of currents in all phase blocks is zero such that by using the balancing blocks as described herein the currents in the capacitors can be balanced without the need for capacitance to compensate for low frequencies.

Figure 22:
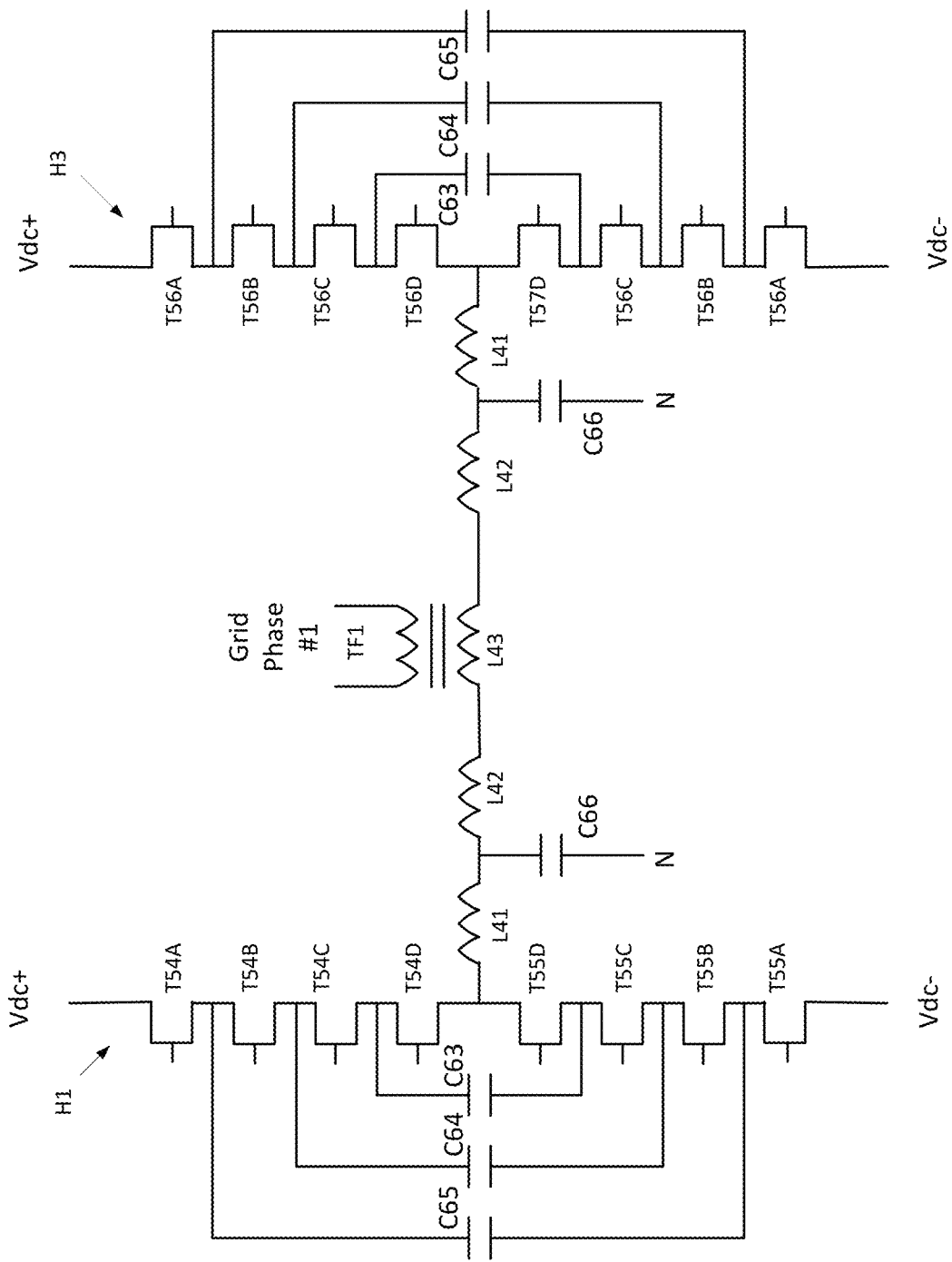
FIG. 22 illustrates another embodiment of a multi-phase multi-level inverter in accordance with embodiments described herein.

FIG. 22 shows another aspect of the multi-phase inverters. FIG. 22 shows an example of an inverter including a transformer TF1 that transforms six legs or phases into a three phase system. Each phase of the three phase system may include the dual-legs or full-bridges as shown in FIG. 22. Each leg H1, H3 of the multi-level, multi-phase inverter may include switches or transistors (e.g., MOSFET transistors) with capacitors (e.g., capacitors C63, C64, C65) in a flying capacitor configuration. An output AC voltage is produced at the input of the transformer TF1 which is part of circuit of a first grid phase.

Figure 23:
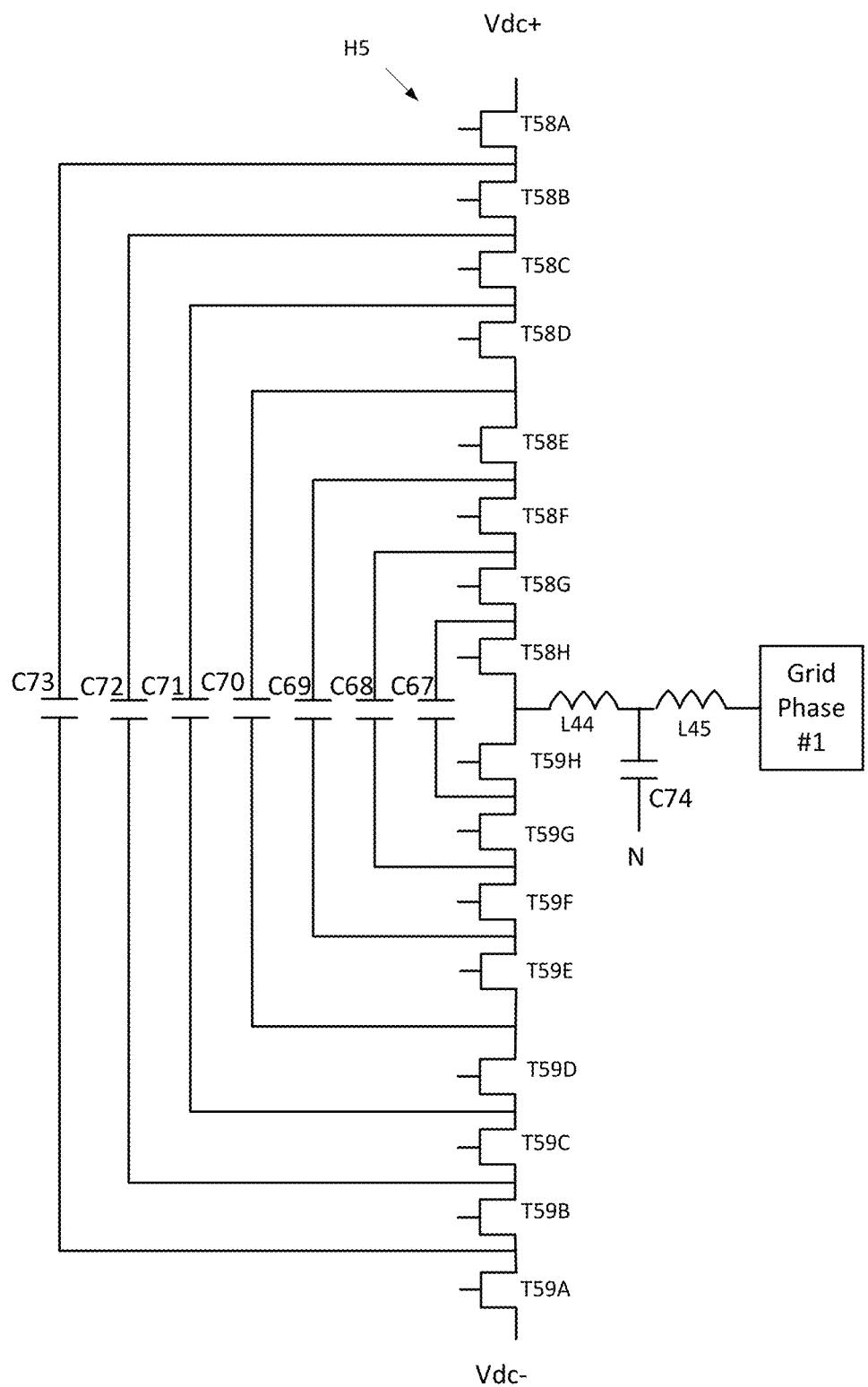
FIG. 23 illustrates another embodiment of a multi-phase multi-level inverter in accordance with embodiments described herein

FIG. 23 shows another embodiment of the three phase system in the form of a circuit of a half-bridge leg H5 without a transformer. The leg H5 includes two banks of switches T57A-H, T58A-H with capacitors C67-C73 in a flying capacitor arrangement. The output of the leg H5 is located at the node between the two banks of switches, specifically, the node between switch T57H and switch T58H. The AC output of the H5 may be connected to a grid phase. The circuit shown in FIG. 22 produces an AC output voltage at the input of the transformer that is the same as the AC output voltage generated by the half-bridge leg H5 shown in FIG. 23. The circuit of FIG. 22 can use half the input DC voltage of the circuit of FIG. 23 and use the same number of MOSFETs as that of FIG. 23.

Figure 24:
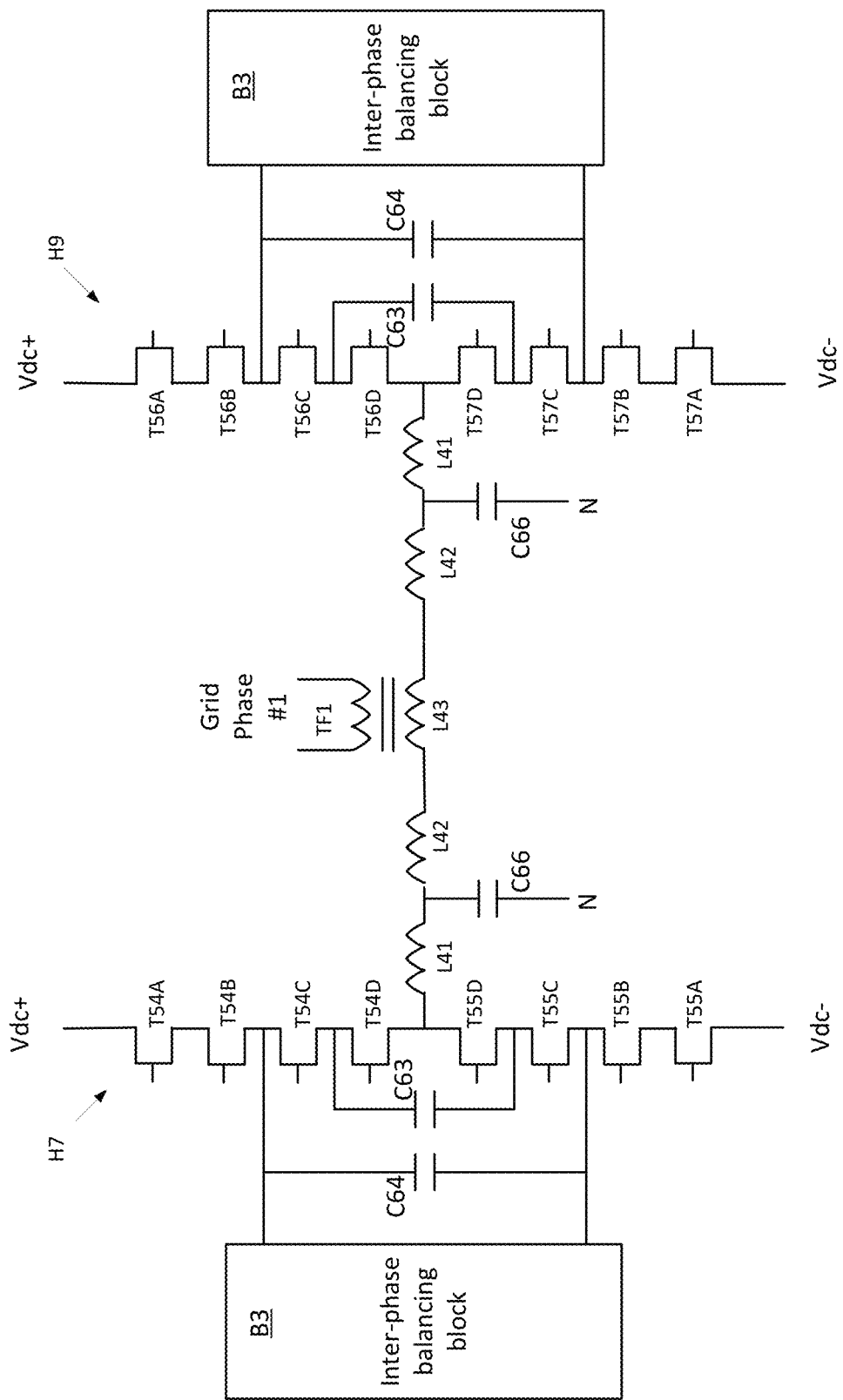
FIG. 24 illustrates an embodiment of a phase of an inverter in accordance with embodiments described herein.

FIG. 24 shows another variation of the multi-phase inverter including six phases. The inverter of FIG. 24 is similar to the embodiment shown in FIG. 22 and uses three dual-leg or full bridge configurations including inter-phase balancing blocks B3. In this case, the inter-phase balancing blocks B3 are located between and connect pairs of phases. The inter-phase balancing block B3 advantageously avoids triple AC line frequency harmonics (e.g. 3*50 Hz) on the middle voltage capacitors (e.g., capacitors C64) that are usually present when balancing these capacitors between three phases (e.g. like in standard Neutral Point Clamped (NPC) topologies) instead of balancing these capacitors between each leg of a phase pair as in the case of the six phase topology. It can be of course generalized to more phases such that the middle voltage capacitor (e.g., capacitor C64) is balanced internally within each pair regardless of the number of pairs in the circuit, which can be standard the three phases (each phase has a pair and therefore a total of 6 phases), six phases (where each phase has a pair and therefore a total of 12 phases), or a higher number of phases. In general, the multi-phase inverter can be extended to any 2*N number of phases, where N=3 is one preferable implementation.

Figure 25:
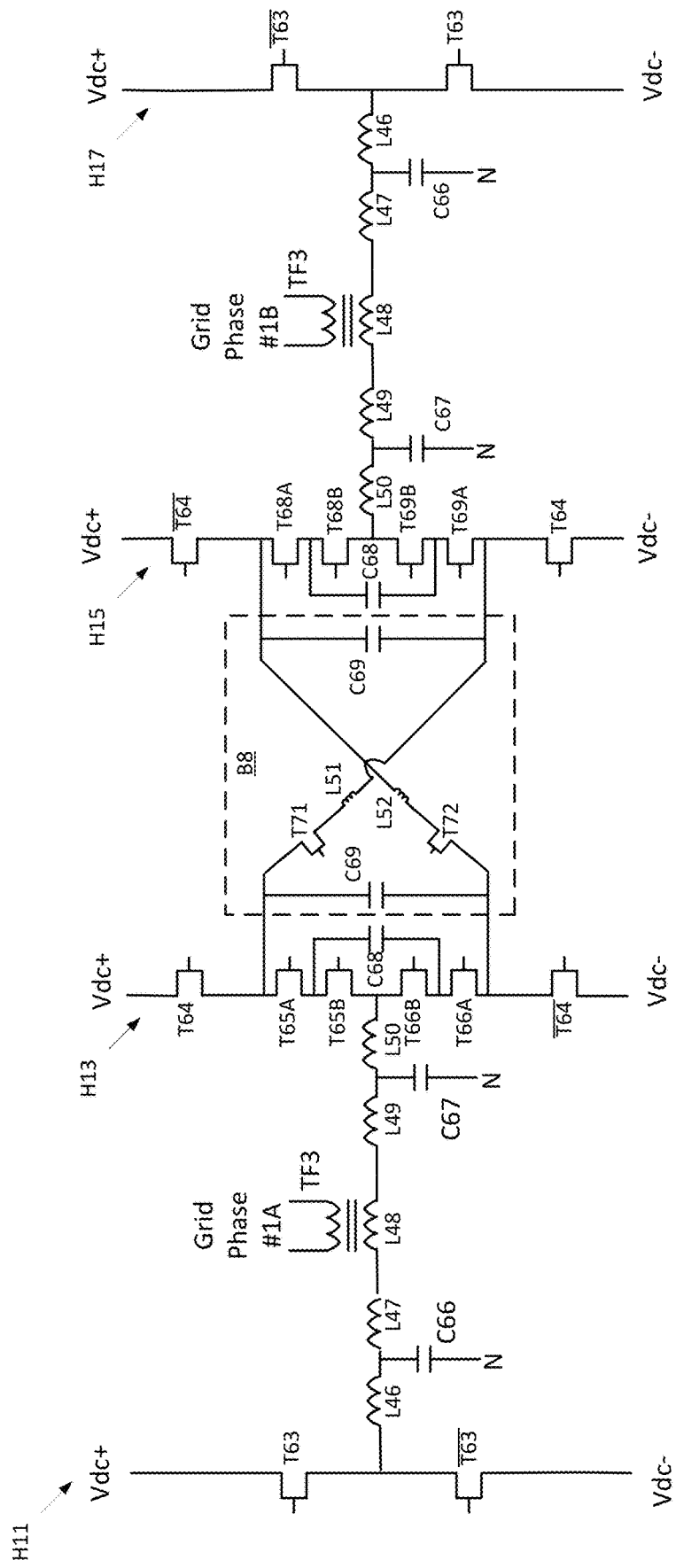
FIG. 25 illustrates another embodiment of a phase of an inverter in accordance with embodiments described herein.

FIG. 25 shows another variation of the multi-phase inverter including six phases (or in more general, any even number of phases such that each two phases are a pair of phases spaced at 180° from each other). The variation shown in FIG. 25 uses balancing between the pairs of phases similar to FIG. 24. In the variation shown in FIG. 25, there are four legs H11, H13, H15, H17 for each AC phase (which means 12 legs in the case of a three-phase inverter), and it can be extended to any 4*N phases, where N=3 is one preferable implementation. The switches T63 and $\overline{T63}$ are present at both slow switching legs H11, H17. The switches T63 and $\overline{T63}$ switch at 50 Hz and form either a negative or positive Vac output whereas T64 and $\overline{T64}$ switch at 100 Hz and divide the half-sine waveform into two halves (e.g. in case of T63=1, we get Vac of 0.5-0.75 or 0.75-1 depending on T64). The middle capacitors C69 of both fast switching phase legs are balanced between the two phases by a balancing block B8 (one example of a balancing block is shown in the main circuit) without the need to connect to legs of other phases, and the balancing block B8 also removes the 150 Hz harmonics (e.g., 3*50 Hz ripple) as described herein. The advantages are that the slow switching phase legs can be formed of ultra low resistance switches regardless of their switching characteristics and that the total output AC voltage Vac is multiplied by four relative to a regular leg, thus enabling higher total power.

Figure 26:
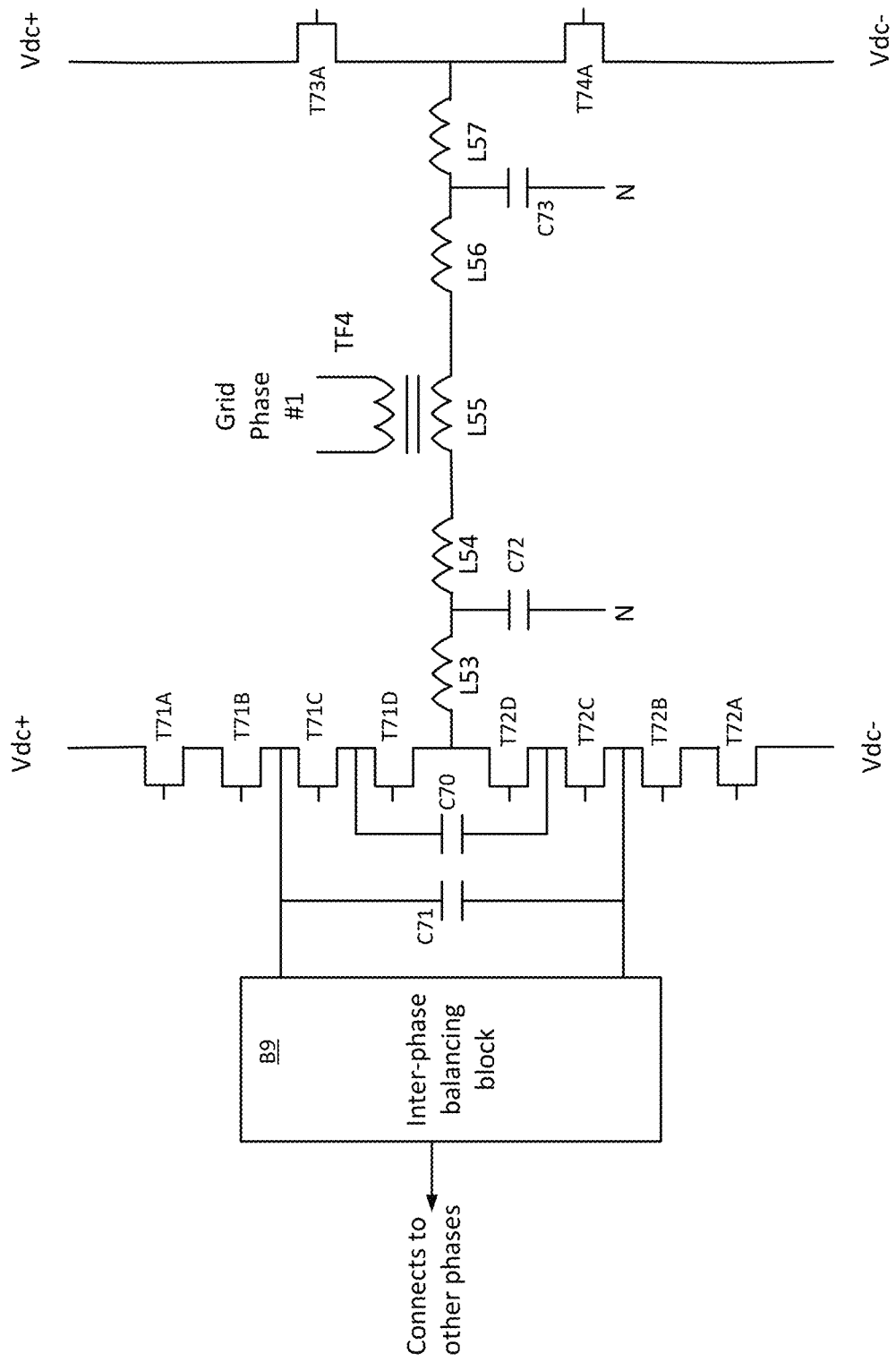
FIG. 26 illustrates yet another embodiment of a phase of an inverter in accordance with embodiments described herein.

Another variation is shown in FIG. 26. In this case, balancing cannot be achieved between the pair of fast switching phase legs. Instead, balancing blocks B9 are connected between the fast switching phase legs of all three phases (or more phases in a more generic case). The balancing blocks B9 are able to reduce the ripple on the middle capacitors C71, though not able to balance them completely.

Figure 27:
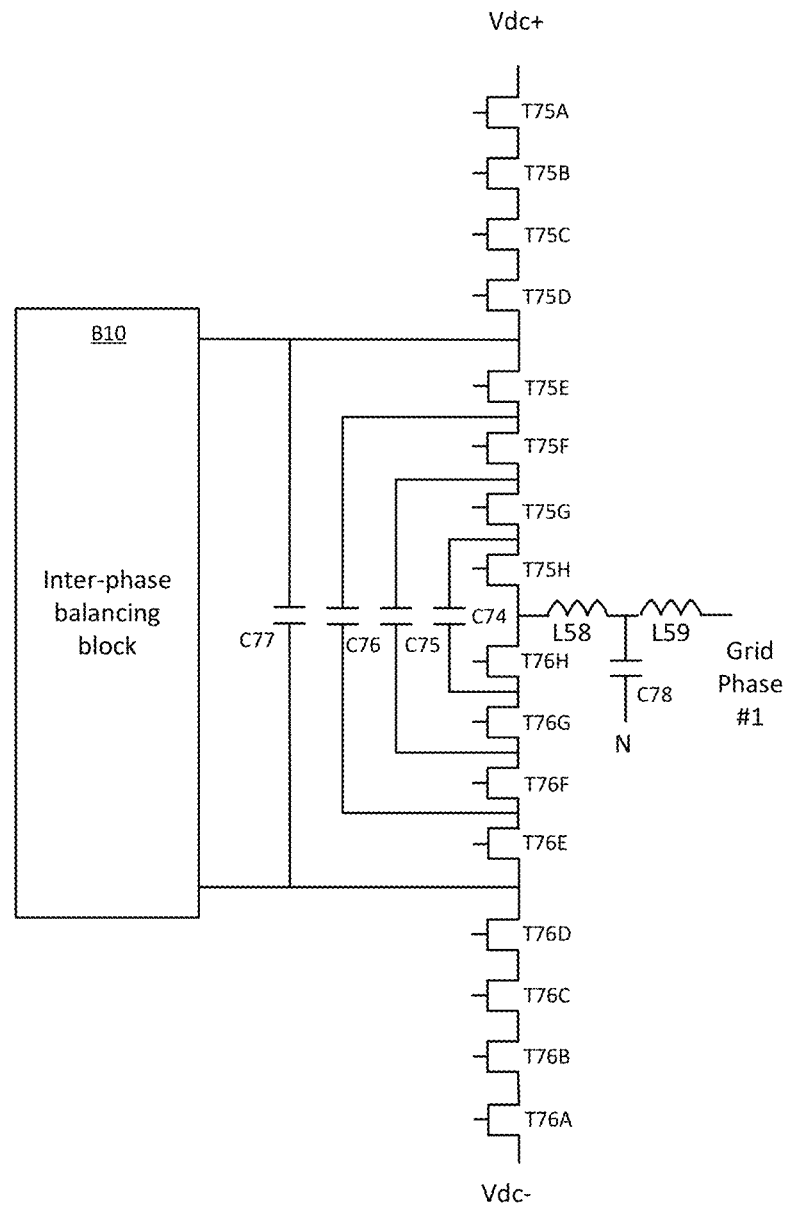
FIG. 27 illustrates another embodiment of a phase of an inverter in accordance with embodiments described herein.

Another variation of the multi-phase inverter includes six phases using a single leg or full bridge for each phase as shown in FIG. 27. Similar to other embodiments, the legs are connected to other legs via the inter-phase balancing block B10.

Figure 28:
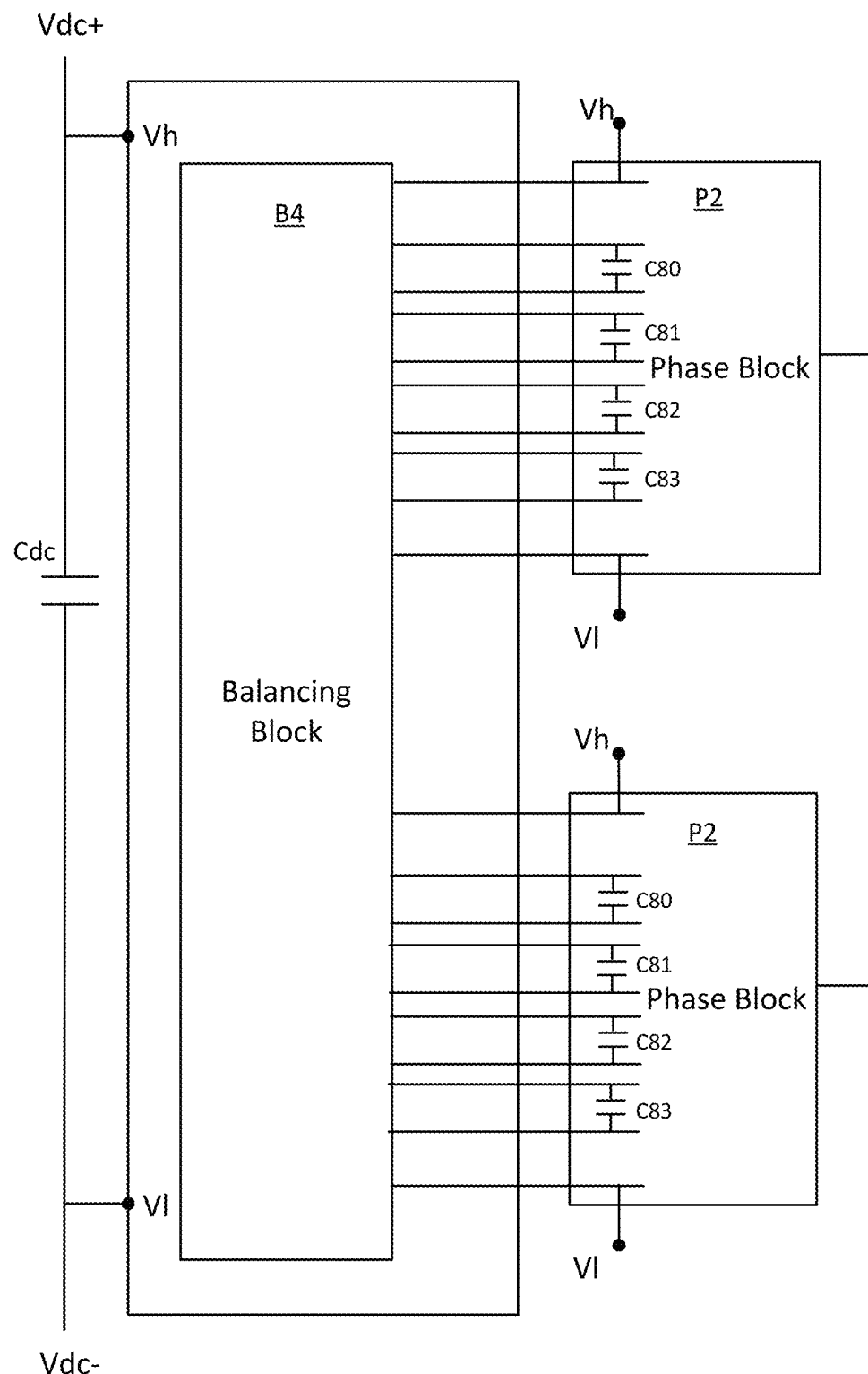
FIG. 28 illustrates an example of a general multi-phase multi-level inverter including a balancing block in accordance with embodiments described herein.

FIG. 28 shows a general multi-phase inverter including a balancing block B4 and two phase blocks P2. FIG. 28 shows an example of two phase blocks, but any number of phase blocks may be used. Each phase block may have an input DC voltage and current paths to Vh and Vl. For example, Vh may be Vdc+, and Vl may be Vdc−. Each phase block P2 may be formed by any DC/DC converter which uses multiple capacitors to form partial DC voltages. For example, the partial DC voltages may be Vdc/N where Vdc=Vdc+ minus Vdc− and N is the number of capacitors in the phase block P2 plus 1.

Figure 29:
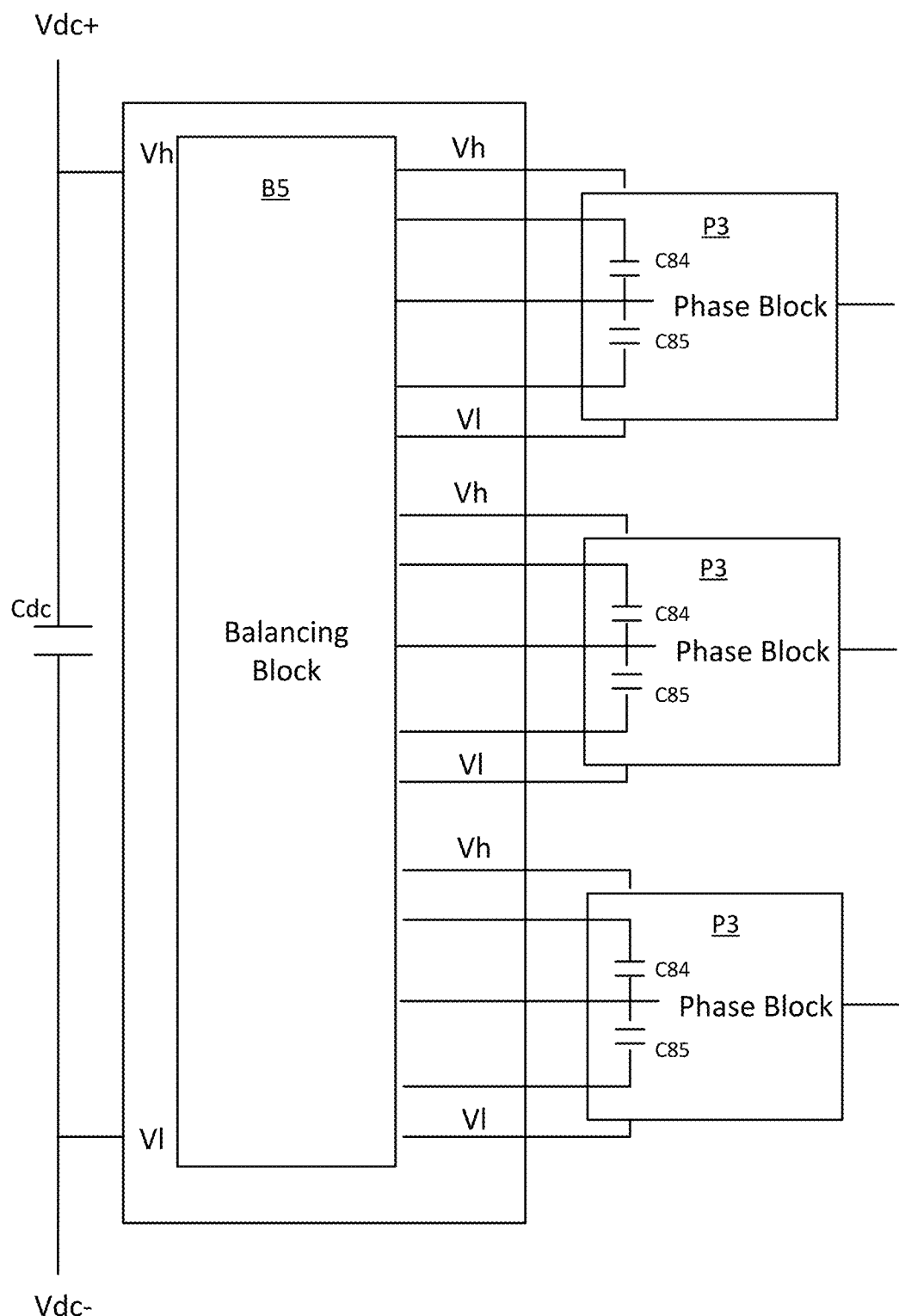
FIG. 29 illustrates another example of a general multi-phase multi-level inverter including a balancing block in accordance with embodiments described herein.

FIG. 29 shows an illustrative general multi-phase inverter including a balancing block B5 and three phase blocks P3. Each phase block P3 may have two input capacitors which each form a voltage equal to Vdc/3. When the two input capacitors are connected in series, the voltage may be 2*Vdc/3.

Figure 32:
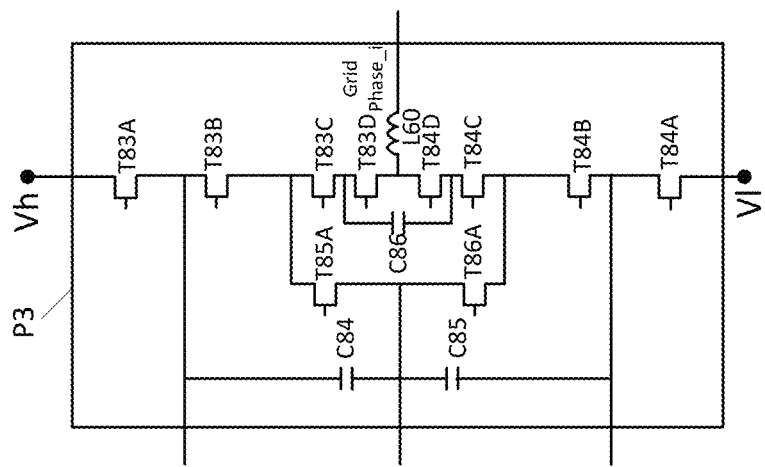
FIG. 32 illustrates an example of a phase block that may be used with the example inverter of FIG. 29 in accordance with embodiments described herein.
Figure 31:
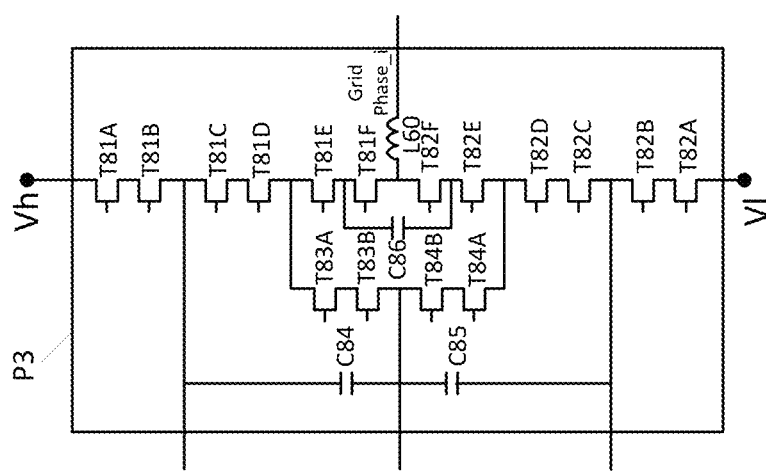
FIG. 31 illustrates an example of a phase block that may be used with the example inverter of FIG. 29 in accordance with embodiments described herein.
Figure 30:
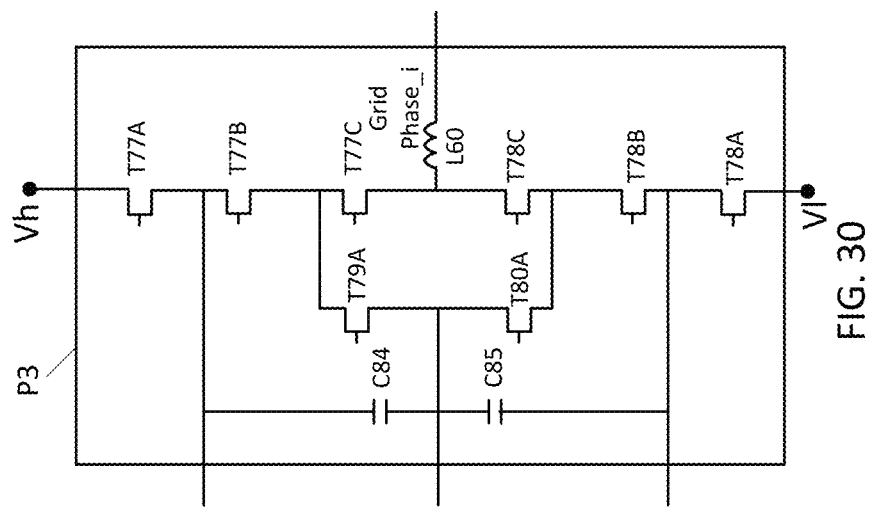
FIG. 30 illustrates an example of a phase block that may be used with the example inverter of FIG. 29 in accordance with embodiments described herein.

FIGS. 30-32 show examples of phase blocks that may be used in the general multi-phase inverter shown in FIG. 29.

The phase block illustrated in FIG. 30 enables the forming of a voltage between a high voltage Vh and low voltage Vl. The two capacitors which each have a voltage of Vdc/3 may be used to form a portion of the amplitude of the voltage. The voltage below Vdc/3 may be provided by using smoothed PWM switching.

In the phase block illustrated in FIG. 31, an additional flying capacitor C86 may be used to form a voltage of Vdc/6 by splitting the switches (e.g., MOSFET transistors) in the phase block shown in P3 into two switches (e.g., MOSFET transistors) in series. For example, switch T77A is replaced with switches T81A and T81B which are connected in series.

The phase block of FIG. 32 shows the example of using a single switch in place of two switches connected in series from the phase block illustrated in FIG. 31.

In the phase blocks P3 of FIGS. 30-32, switches (e.g., MOSFET transistors) T77A, T81A, T81B, T83A, T77C, T81E, T81F, T83C, T83D, T78A, T82A, T82B, T84A, and T78C, T82C, T82E, T82F, T84C, T84D may be fast switching while the remaining switches are switched slowly according to the polarity of a 50 Hz sine wave.

To compensate for the slow switching where two capacitors will either be charged or discharged in a low frequency, the balancing block B5 may be used to balance the current flowing between the capacitors between different legs or phases. The balancing block B5 also enables the use of lower capacitance capacitors.

Figure 33:
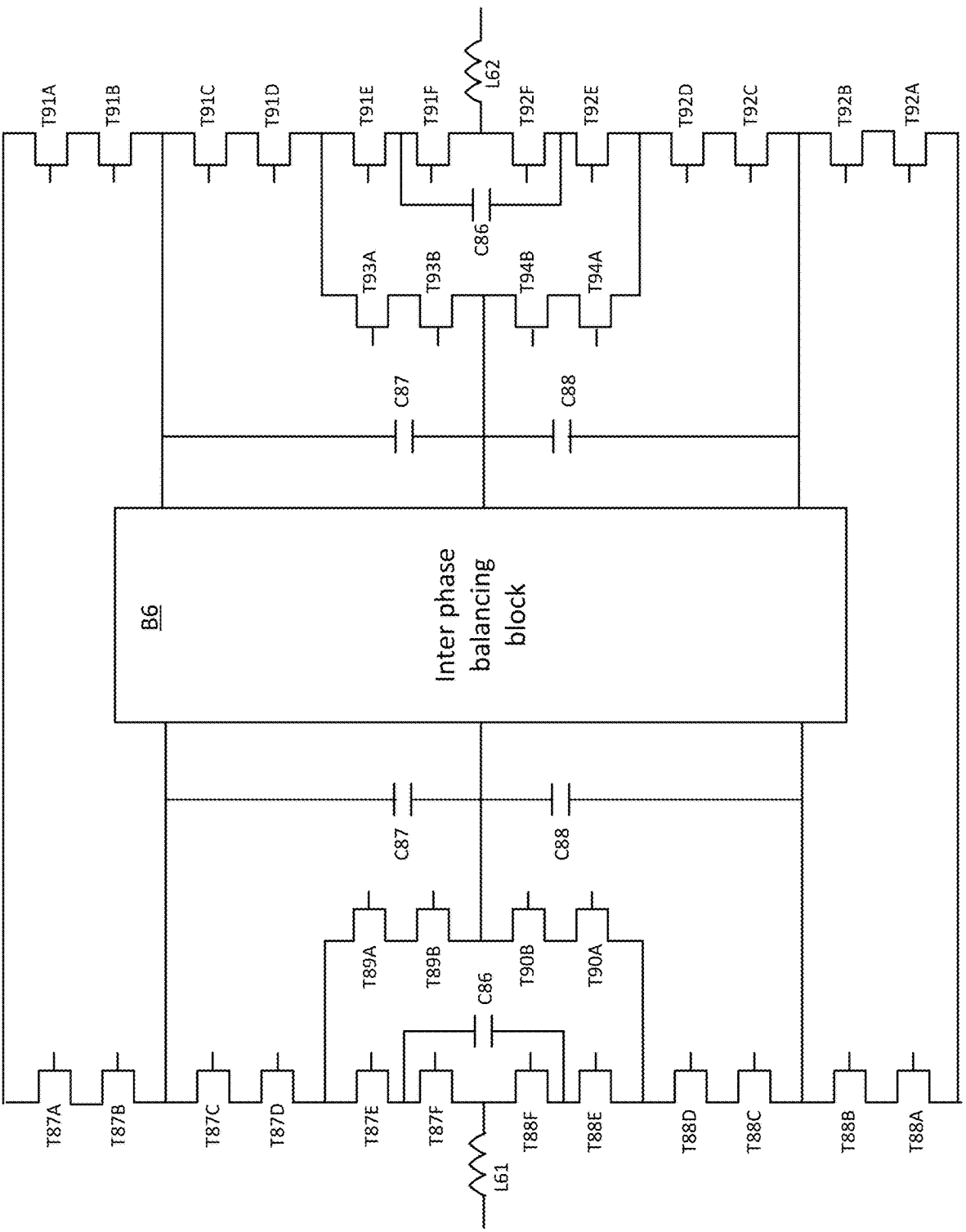
FIG. 33 illustrates an example of a single phase inverter in accordance with embodiments described herein.

FIG. 33 provides an example of a single phase inverter having two legs that require balancing between the legs. An interphase balancing block B6 located between the legs may be used to balance the two legs.

Figure 34:
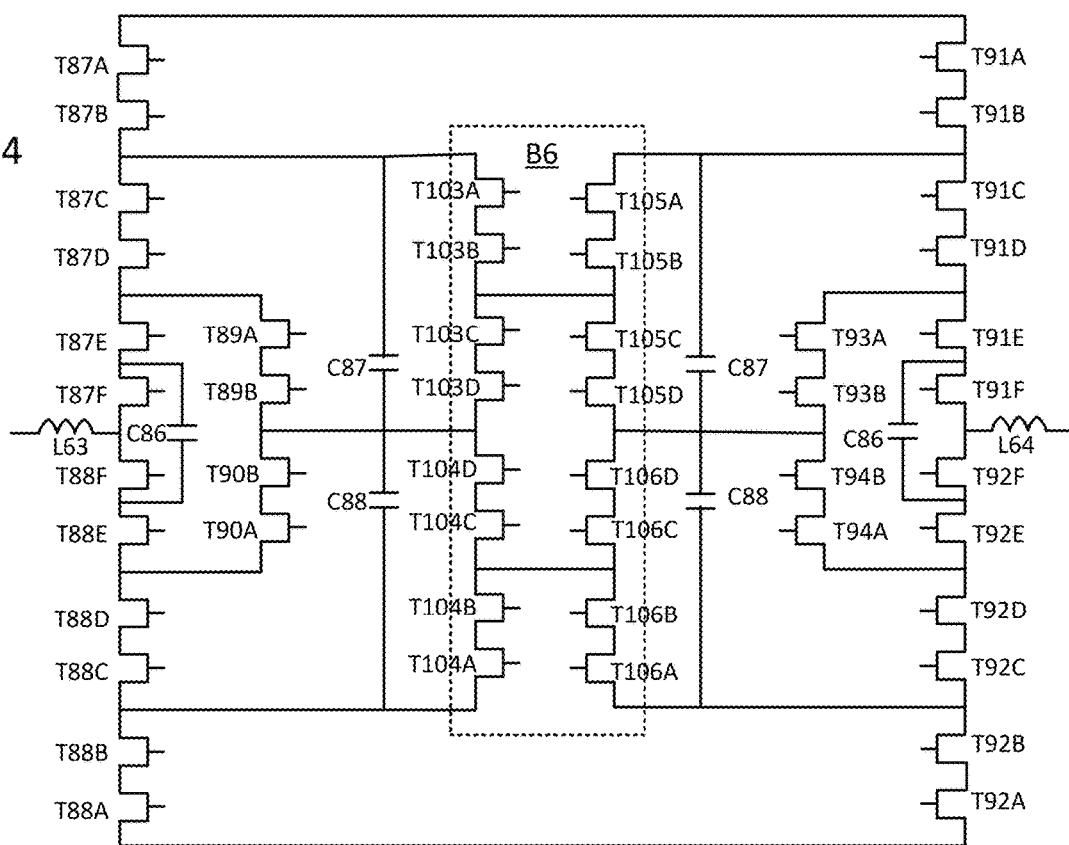
FIG. 34 illustrates another example of a single phase inverter in accordance with embodiments described herein.

FIG. 34 shows an example of an interphase balancing block B6 that can be used in the single phase inverter of FIG. 33.

Figure 35:
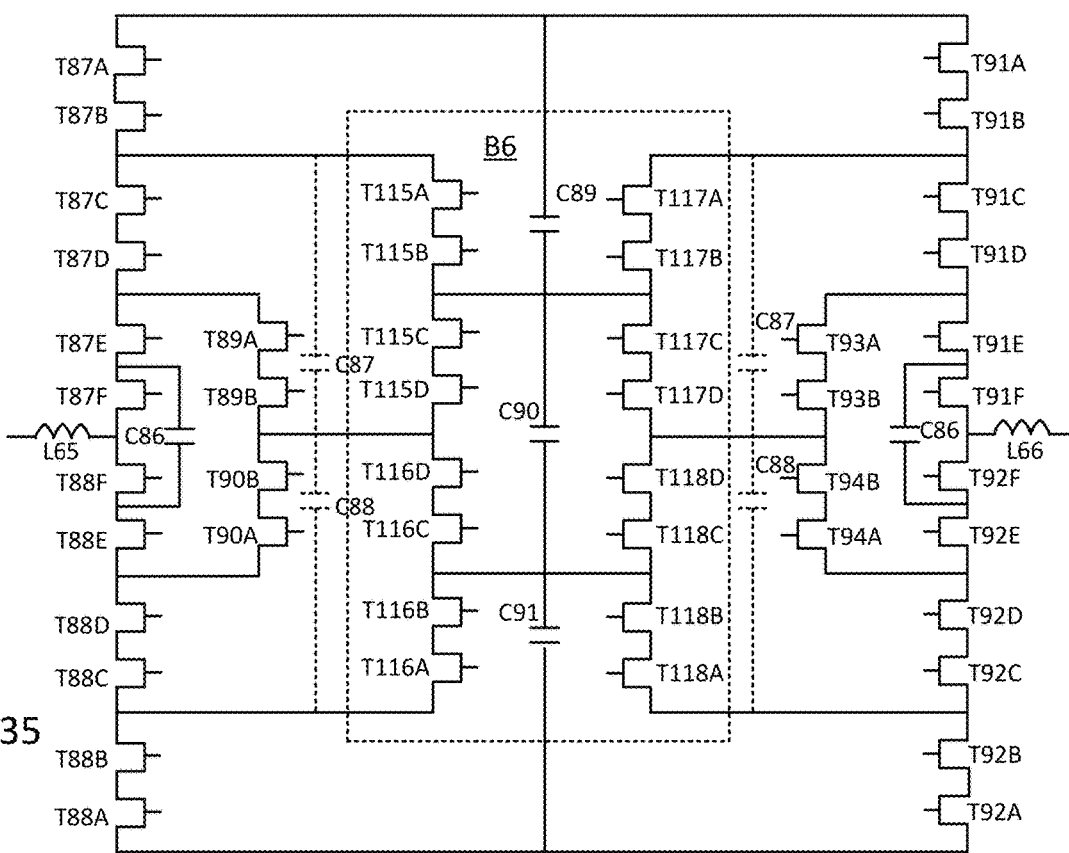
FIG. 35 illustrates another example of a single phase inverter in accordance with embodiments described herein.

FIG. 35 shows another example of an interphase balancing block B6 that may be used in the single phase inverter of FIG. 33. The three center capacitors C89-C91 may be used in addition to or in place of the two pairs of capacitors C87, C88 illustrated with dotted lines.

Figure 36:
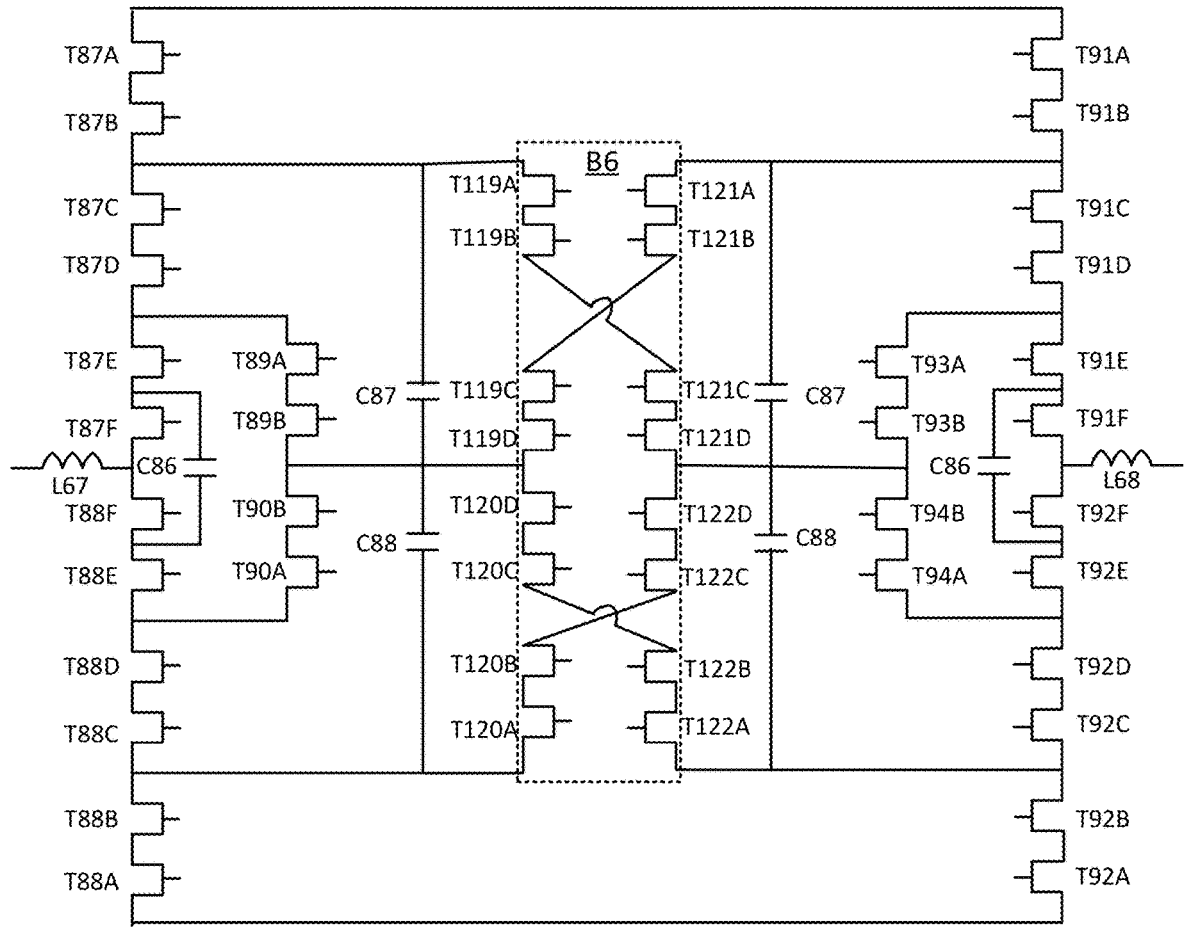
FIG. 36 illustrates another example of a single phase inverter in accordance with embodiments described herein.

FIG. 36 shows an example inter-phase balancing block B6 where there are no intersection points between the two legs. While FIG. 36 shows the use of two switches in each leg forming a series connection of four switches between the two legs, any number of switches may be used including a single switch.

Figure 37:
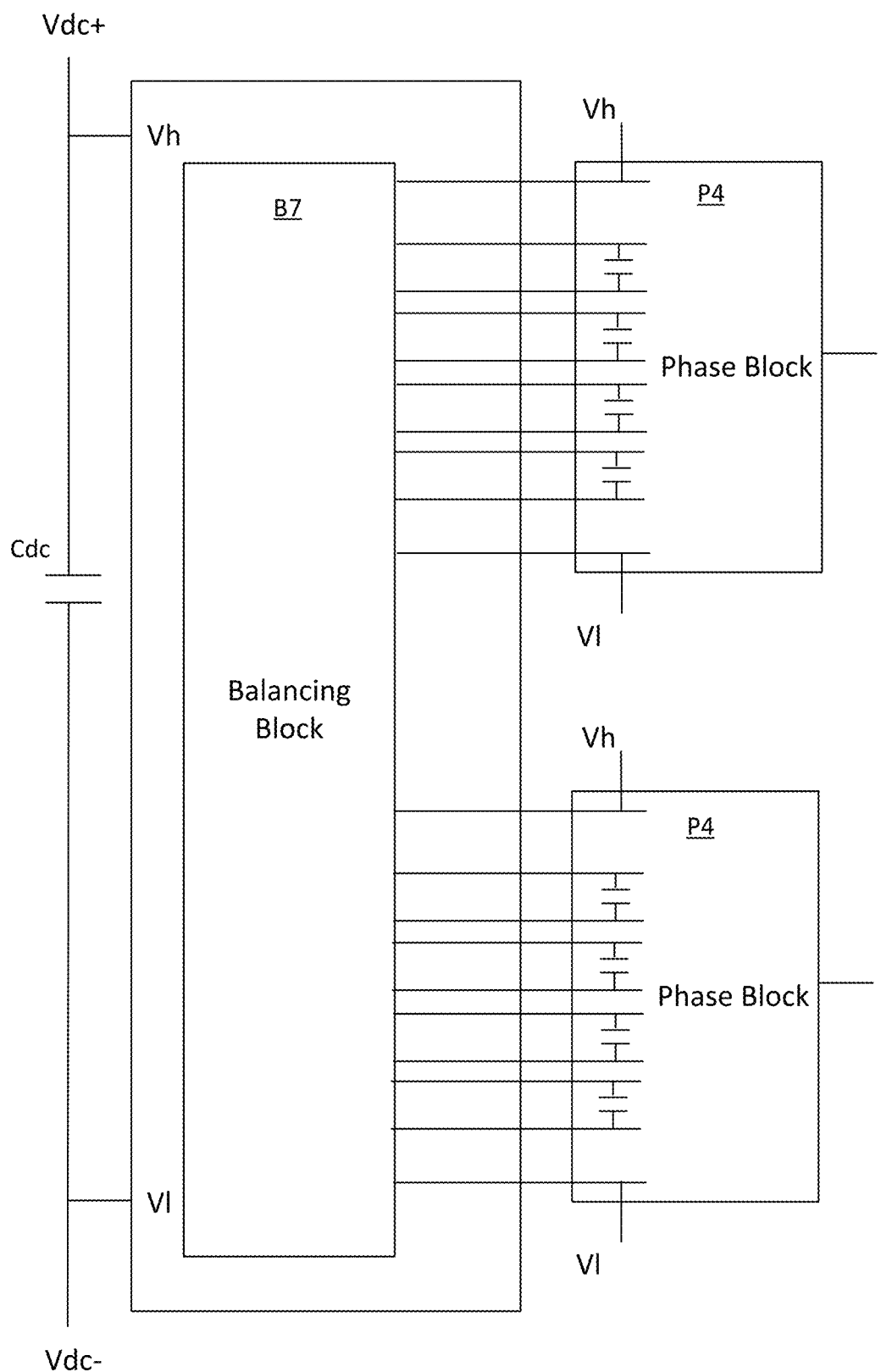
FIG. 37 illustrates another example of a general multi-phase multi-level inverter including a balancing block in accordance with embodiments described herein.

Similarly, the variations described herein may be used for phase blocks having multiple capacitors in each phase block forming partial voltage as shown in FIG. 37. Phase blocks similar to those used for the two capacitor phase blocks shown in FIGS. 30-32 may be used with the modification of including 4 capacitors. A balancing block similar to those shown in FIGS. 34-36 may also be used.

Figure 38:
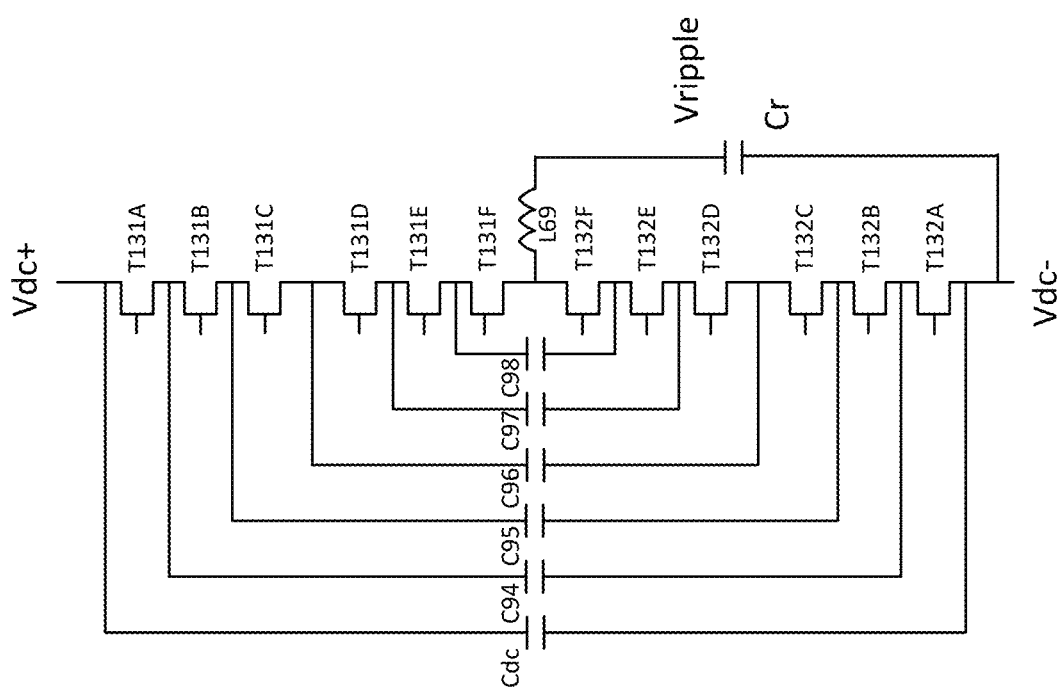
FIG. 38 illustrates an embodiment of a single phase inverter with reduced capacitance in accordance with embodiments described herein.

FIG. 38 shows another embodiment of a single phase inverter with reduced capacitance similar to FIG. 5. The reduced capacitance may be accomplished by using a DC/DC converter between the input voltage (Vdc+ to Vdc− (e.g., GND)) and a rippled voltage Vripple over a capacitor Cdc on the rippled voltage $V_{ripple}$.

Figure 39:
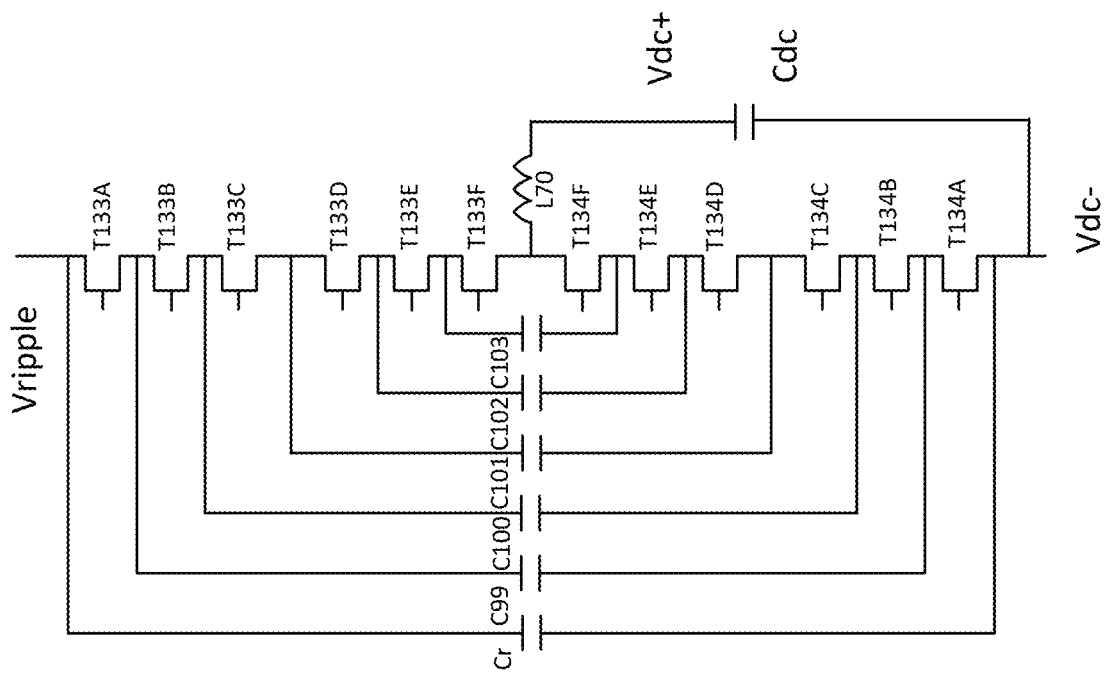
FIG. 39 illustrates another embodiment of a single phase inverter with reduced capacitance in accordance with embodiments described herein.

FIG. 39 shows a variation of the single phase inverter with reduced capacitance. A boost DC/DC- may be used. The variation shown in FIG. 39 is advantageous in that a higher voltage ripple capacitor may be used, so the size may be reduced. More switches or higher rating switches are used in this variation to reach the higher voltage. For example, to boost the ripple voltage up to twice the DC average voltage requires total withstand voltage of twice the DC voltage on each half-leg.

Figures 40, 41:
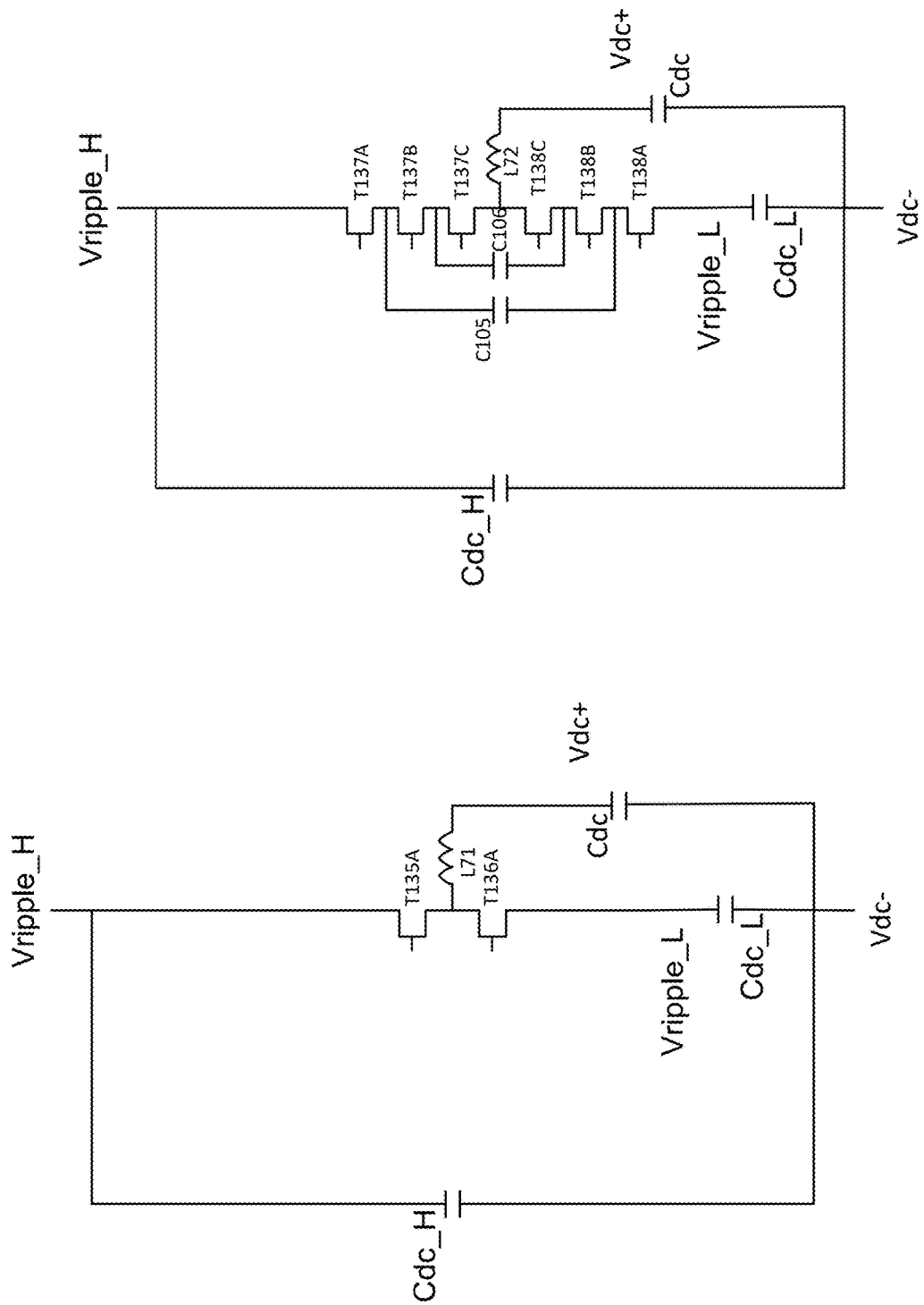
FIG. 40 illustrates an embodiment of an inverter including a buck-boost aspect in accordance with embodiments described herein.
FIG. 41 illustrates another embodiment of an inverter including a buck-boost aspect in in accordance with embodiments described herein.

FIG. 40 shows a variation including a buck-boost aspect centered around the input DC voltage by two switches. The ripple capacitance is spread over two ripple capacitors Cdc_H and Cdc_L. Since this variation requires less switches than other buck or boost embodiments, this variation is cheaper and has less losses. The addition of Cdc_L enables the circuit to achieve a full voltage rating (Vdc+ to Vdc−) without placing all of the switches in series. The circuit can boost voltages to twice the DC voltage while having withstand voltage of the DC voltage in each half-leg. The gain boost of this variation may be up to twice the DC voltage.

FIG. 41 shows another variation including a buck-boost aspect with two switches implemented as flying capacitor switches. Using this variation, low-voltage MOSFET transistors may be used as the switches with a capacitance reduction. Similar to the previous variation, the addition of Cdc_L enables the circuit to achieve a full voltage rating (Vdc+ to Vdc−) without placing all of the switches in series. The circuit can boost voltages to twice the DC voltage while having withstand voltage of the DC voltage in each half-leg. In another variation, three or four switches in series may be used while using small capacitance values for Cdc_H and Cdc_L. This enables the reduction of conduction switching losses considerably while still being able to reduce the total capacitance of Cdc_H and Cdc_L lower than the DC capacitance usually required without a swing mechanism of swinging the ripple between the capacitors Cdc_H and Cdc_L.

Figure 42:
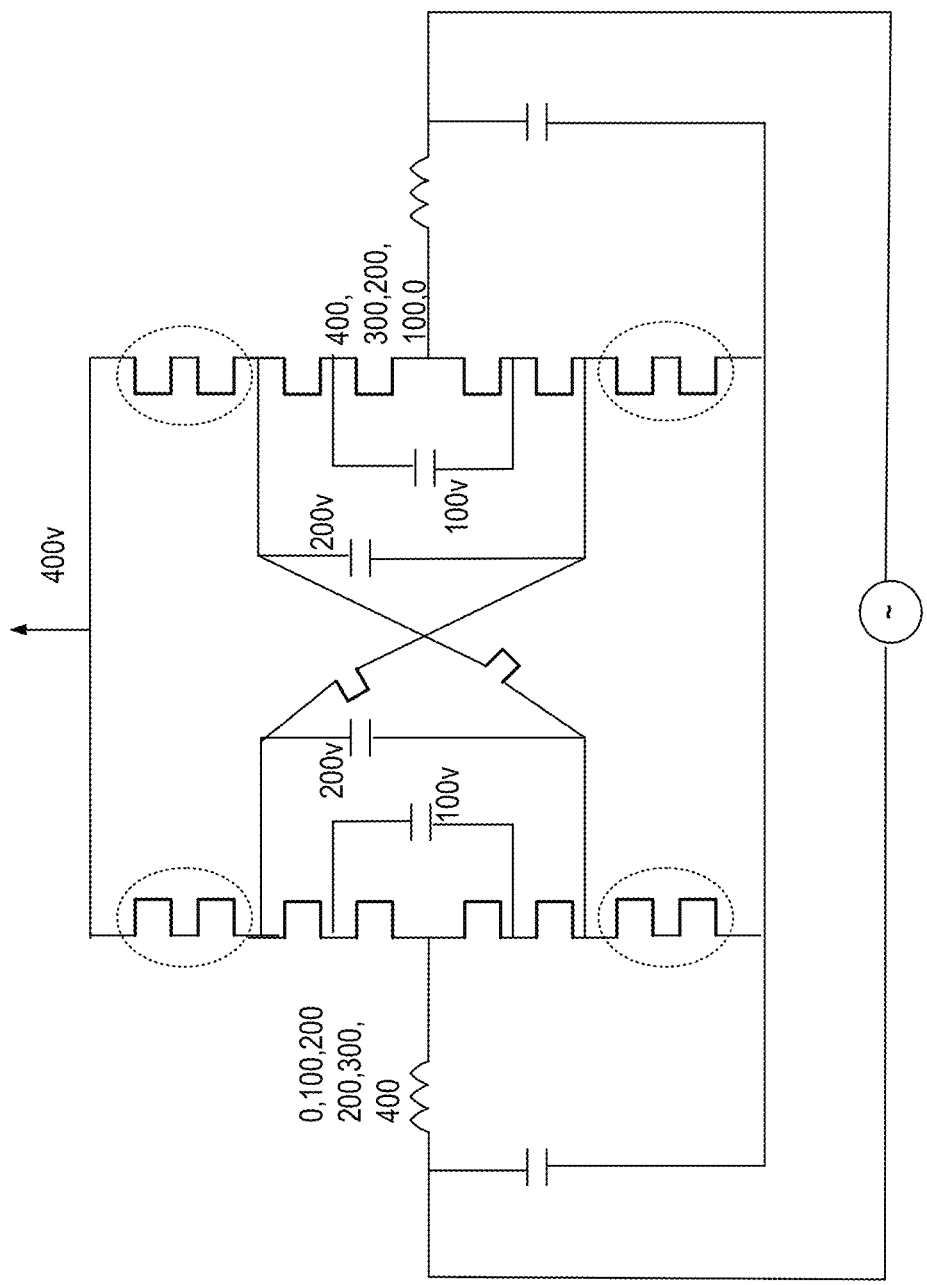
FIG. 42 illustrates another embodiment of an inverter topology in accordance with embodiments described herein.

FIG. 42 illustrates a further embodiment including, for example, a DC voltage (400V in the diagram) divided into 200V capacitors and 100V flying capacitors. The balancing block concept previously presented (e.g., FIGS. 11-14) is implemented by the two cross MOSFETs to balance the 200V capacitor between the two phases. The output voltages at any of the two phase outputs can be 0, 100, 200, 300, 400V utilizing all the states of the flying capacitor structure. The 100V capacitor is a flying capacitor that is balanced by a proper timing diagram as described previously (e.g., by an adjustment of each of the 01 and 10 states relative timing (while keeping the average duty cycle fixed). In certain variations, 150V low-voltage MOSFETs are used for the switches (e.g., BSB165N15 from Infineon with very low Rds on of 13 mohm).

The switching frequency for the circuit in FIG. 42 may include as one example, 50 KHz for each MOSFET, such that the switching losses are still low enough and yet the total output inductor ripple is at 2*50 KHz=100 KHz, thereby allowing a very small inductor (e.g., a PQ40 core). At 100 KHz total inductor frequency is 6 times higher than prior inverter switching frequencies, and the utilization of low-voltage MOSFETs at this high frequency enables several inverter benefits, including:

1. Much smaller passive components (reduced by 6 due to frequency and by 4 due to the use of 150V rated parts instead of 600V rated parts required for typical inverters). This is a gain of ×24 of the passive components size and cost (which is mostly magnetics).
2. Much lower power losses and therefore superb efficiency (above 99%) which allows passive cooling (without fans) even for high power levels (such as 15 KW, 20 KW, 50 KW, 80 KW, 100 KW, etc.).

3. Much smaller inverter size due to the above mentioned benefits, including reduced passives size and reduced cooling requirements.

Figure 43:
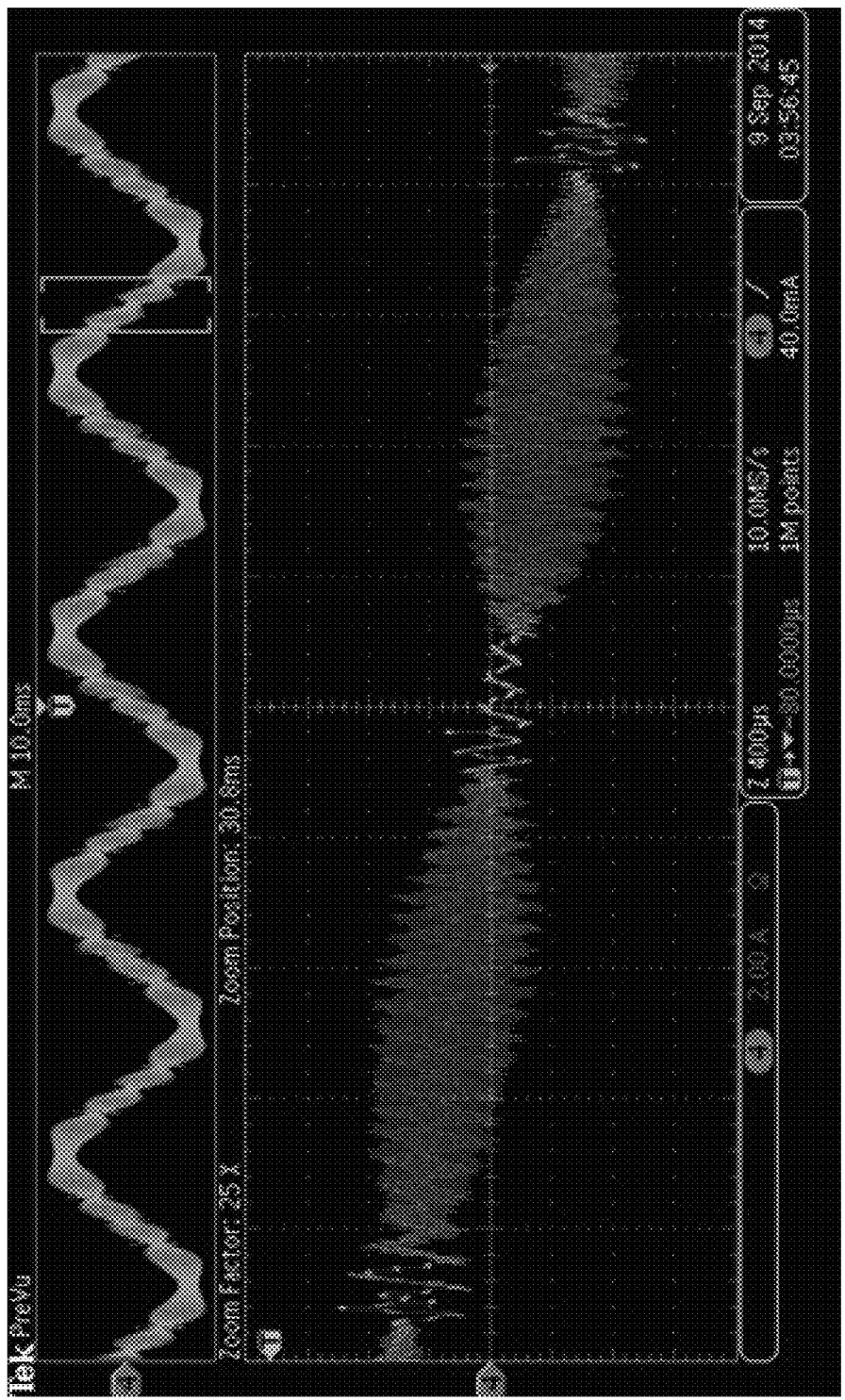
FIG. 43 illustrates operational results of the inverter topology shown in FIG. 42 in accordance with embodiments described herein.

For the circuit in FIG. 42, the current through the inductor is shown in the test results illustrated in FIG. 43. It can be seen that throughout the 50 Hz sine wave current, there are four stages where each one of them is composed of fluctuating current from zero current to a maximum peak-to-peak ripple current. These four stages relate to the levels of the multi-level implementation (according to 0 v, 100 v, 200 v, 300 v) as was previously described with respect to the circuit in FIG. 42.

Figure 44:
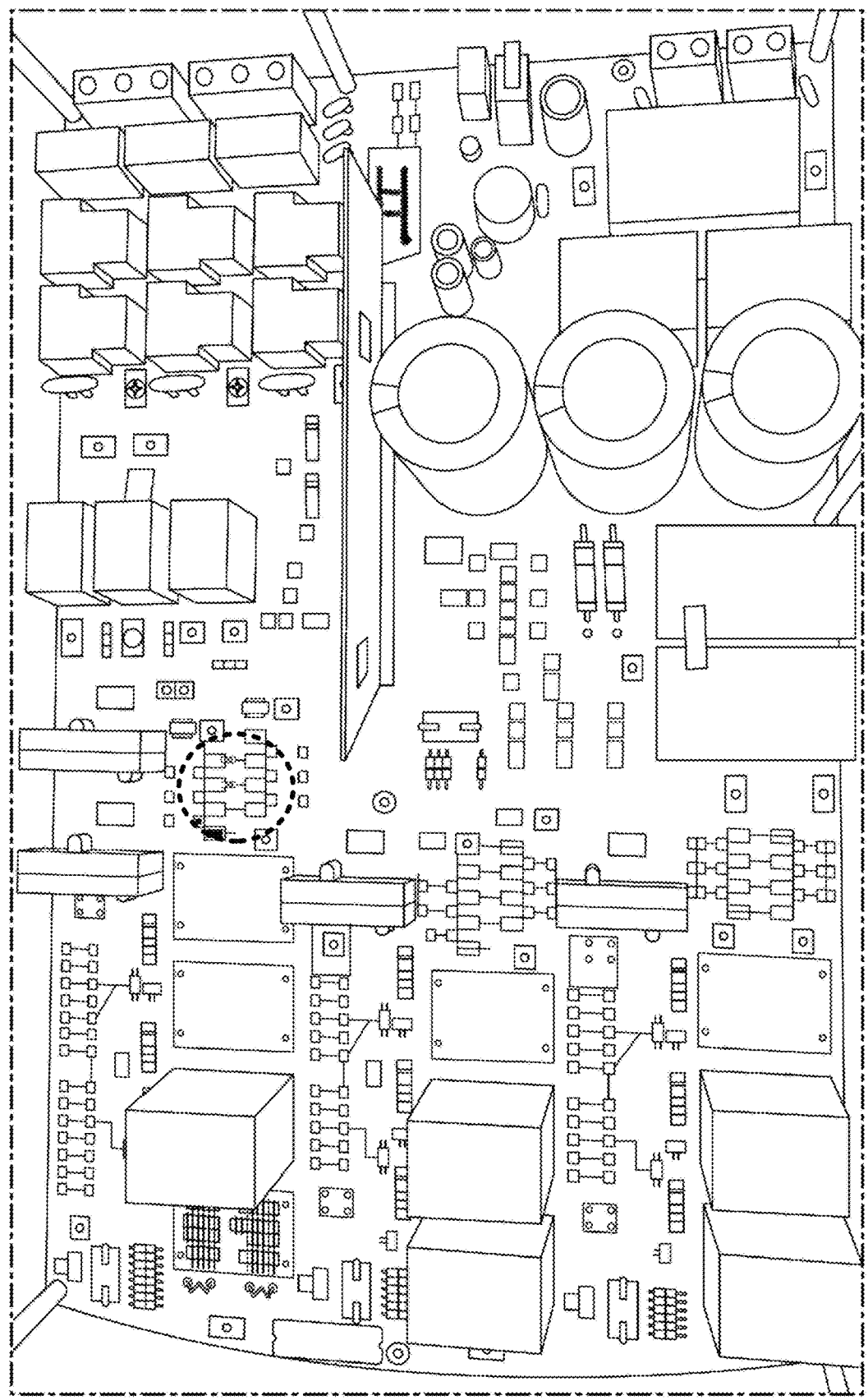
FIG. 44 illustrates an example circuit board in accordance with embodiments described herein.

FIG. 44 shows a picture of an electronic circuit board of the circuit in FIG. 42. The board includes various options (number of MOSFETs in series), several types of capacitors etc. to implement the circuit configuration of the FIG. 42 circuit and other circuits described herein. The image is annotated with a dotted circle that identifies the MOSFETS in the FIG. 42 circuit.

Figure 45:
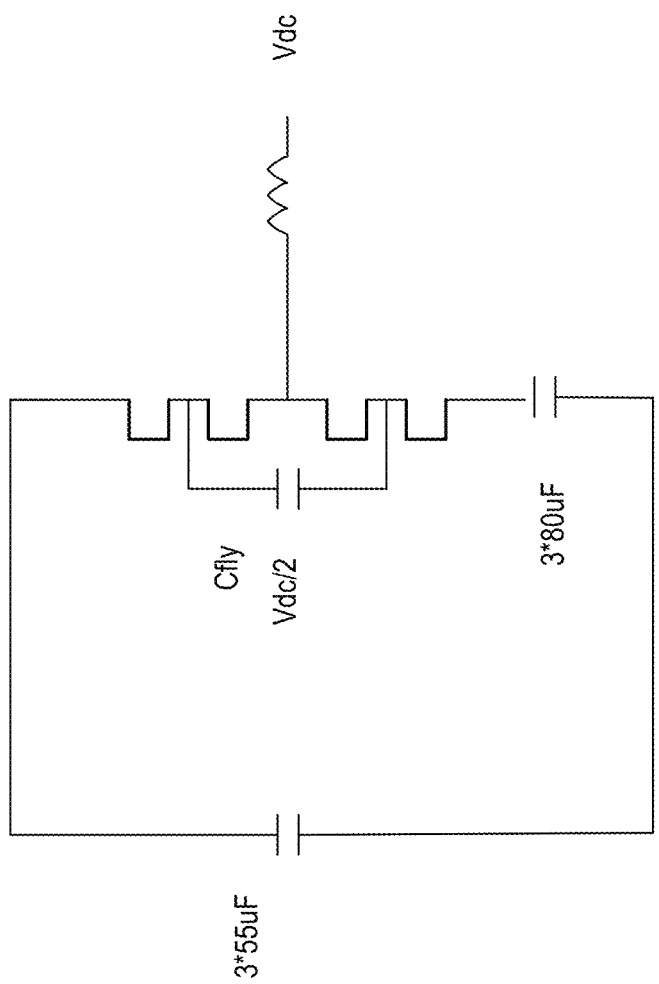
FIG. 45 illustrates aspects of a multi-level inverter in accordance with embodiments described herein.

In various embodiments, the FIG. 42 circuit includes the active capacitor concept that was described with respect to FIG. 5. According to these embodiments, instead of having the line frequency (50/60 Hz) ripple on the input capacitor (not shown in FIG. 42) of Vdc (labeled 400V), which previously limited its ripple to about 10%, the circuit of FIG. 45 is connected to Vdc of FIG. 42. In this case, the Vdc ripple is redirected to other capacitors that may have a very high ripple (e.g. between 0 to their rated voltage), and therefore, can use much smaller capacitance (about 1/10 of the original capacitance).

In one embodiment 150V BSB165N15 MOSFETS from Infineon are used and the previously described flying capacitor topology is utilized such that Cfly is balanced to Vdc/2. In an embodiment, 575V capacitors (3*80 uF) and 700V capacitors (3*55 uF) are used, with a total of about 400 uF at 575-700V range instead of having about 4000-5000 uF rated for 500V, as is conventional prior systems. With this embodiment, up to 200V of ripple voltage is possible on the capacitors, which allows for a considerable reduction of the required capacitance.

Figure 46:
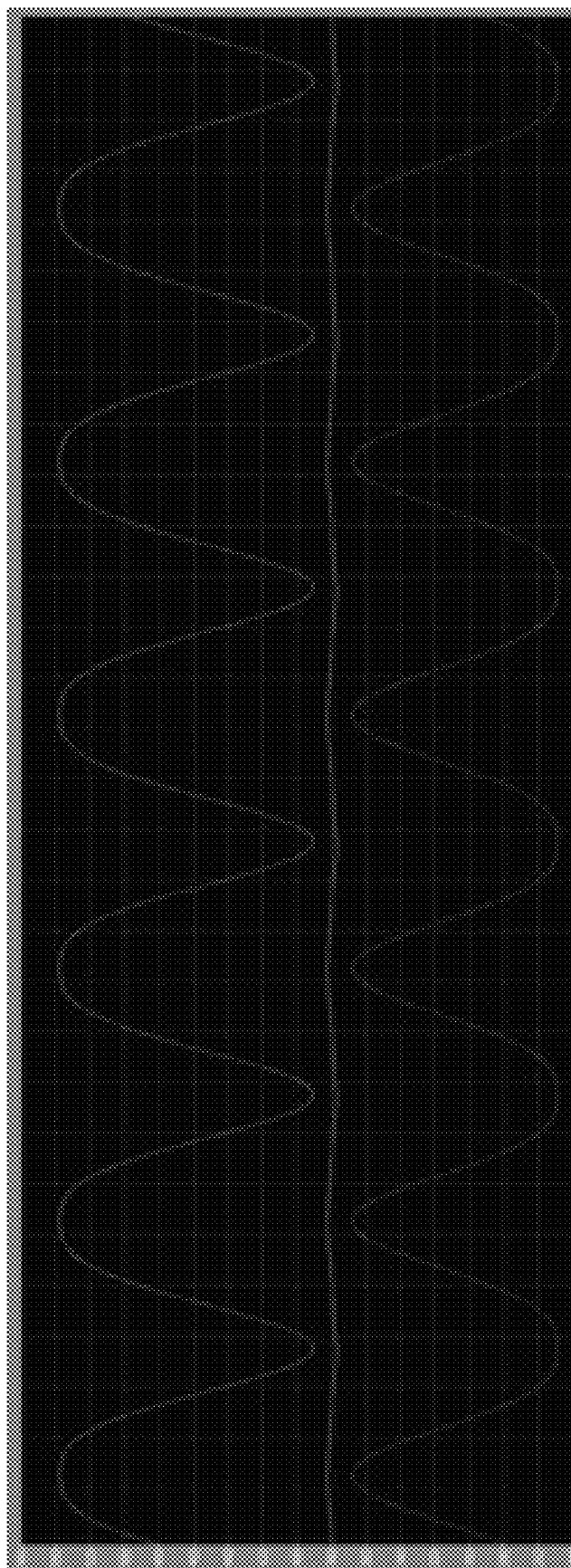
FIG. 46 illustrates operational results of the inverter topology shown in FIG. 45 in accordance with embodiments described herein.

In the signal plot illustrated in FIG. 46, the capacitor voltages are shown for the active capacitor input circuit of FIG. 45. The middle line is the average Vdc input, the top line is the voltage of the capacitor that fluctuates above Vdc (3*55 uF), and the bottom line is the voltage of the capacitor that fluctuates below Vdc (3*80 uF).

This reduced capacitance of the various embodiments disclosed herein allows for the use film capacitors instead of aluminum electrolytic capacitors. Film capacitors are less dense and less cost effective for the same capacitance level, but due to the reduction in capacitance, the same level of cost and volume is obtained while gaining much higher reliability and lifetime due to the properties of film capacitors (typically 20-25 years lifetime instead of 5-12 years for an electrolytic capacitor).

Further, by leverage the flying capacitor topology with low-voltage MOSFETs at high frequency, very low losses, high efficiency and much smaller converters with passive cooling can be achieved, which is not possible with current standard solutions. Prior solutions required the use of high-voltage IGBTs/IGCTs operating at very low frequencies, resulting in high losses that necessitated the use of fans or other active cooling resources that reduced efficiency further.

Although example embodiments are described above, the various features and steps may be combined, divided, omitted, and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

We claim:

1. An apparatus comprising a single phase multi-level inverter configured to output, between a first AC output and a second AC output of the single phase multi-level inverter, an AC voltage for a grid operated at an AC line frequency, the single phase multi-level inverter comprising:
   a first phase circuit comprising a first flying capacitor circuit comprising a first bank and a second bank of series connected switches and configured to be switched at a frequency, and a capacitor connected between one of the series connected switches in the first bank and a corresponding one of the series connected switches in the second bank;
   a second phase circuit comprising a second flying capacitor circuit comprising a third bank and a fourth bank of series connected switches and configured to be switched at the frequency, and a capacitor connected between one of the series connected switches in the third bank and a corresponding one of the series connected switches in the fourth bank, wherein the first bank and the second bank are connected in series, and the third bank and the fourth bank are connected in series;
   a first set of switches connecting the first phase circuit between voltage inputs and configured to be switched at the AC line frequency;
   a second set of switches connecting the second phase circuit between the voltage inputs and configured to be switched at the AC line frequency; and
   an interphase balancing circuit comprising a first pair of terminals connected in parallel across the first phase circuit and a second pair of terminals connected in parallel across the second phase circuit.

2. The apparatus of claim 1, wherein the interphase balancing circuit further comprises:
   a first switch configured to be switched at the AC line frequency by a control signal; and
   a second switch configured to be switched at the AC line frequency by an inverted version of the control signal.

3. The apparatus of claim 2, wherein
   the first switch is configured to connect a first input terminal of the first phase circuit to a fourth input terminal of the second phase circuit; and
   the second switch is configured to connect a third input terminal of the second phase circuit to a second input terminal of the first phase circuit.

4. The apparatus of claim 1, wherein the interphase balancing circuit is configured to remove ripple voltage at the AC line frequency across the first phase circuit and across the second phase circuit.

5. The apparatus of claim 4, wherein the interphase balancing circuit is configured to remove the ripple voltage at the AC line frequency across the first phase circuit and across the second phase circuit by sharing current between the first phase circuit and the second phase circuit.

6. The apparatus of claim 1, wherein each switch of the first bank, the second bank, the third bank, and the fourth bank is configured to be switched according to a duty-cycle ratio.

7. The apparatus of claim 6, wherein the duty-cycle ratio varies according to a sine wave.

8. The apparatus of claim 7, wherein the sine wave is a sine wave of the grid operated at the AC line frequency.

9. The apparatus of claim 1, wherein each switch of the first bank, the second bank, the third bank, and the fourth bank is a low-voltage transistor having a voltage rating of less than 600V.

10. The apparatus of claim 1, wherein each switch of the first bank, the second bank, the third bank, and the fourth bank is a 150V transistor.

11. The apparatus of claim 1, wherein the frequency is greater than the AC line frequency.

12. The apparatus of claim 1, wherein the frequency is greater than 16 kHz.

13. The apparatus of claim 1, wherein
a first switch of the first bank and a respective first switch of the fourth bank are configured to be switched by a first control input, and
a first switch of the second bank and a respective first switch of the third bank are configured to be switched by a second control input.

14. The apparatus of claim 13, wherein
a second switch of the first bank and a respective second switch of the fourth bank are configured to be switched by a third control input, and
a second switch of the second bank and a respective second switch of the third bank are configured to be switched by a fourth control input.

15. The apparatus of claim 14, wherein the second control input is an inverted version of the first control input, and the fourth control input is an inverted version of the third control input.

16. The apparatus of claim 1, wherein
each of the first bank, the second bank, the third bank, and the fourth bank comprises N switches,
the switches of first bank and the fourth bank are configured to be switched according to N control signals, and
the switches of the second bank and the third bank are configured to be switched according to inverted versions of the N control signals.

17. The apparatus of claim 1, wherein the switches of the first bank are configured to be switched at staggered times.

18. The apparatus of claim 1, wherein
each switch of the first bank has a first duty-cycle that is common to a duty-cycle of a corresponding switch of the fourth bank, and
each switch of the second bank has a second duty-cycle that is common to a duty-cycle of a corresponding switch of the third bank.

19. The apparatus of claim 18, wherein the second duty-cycle is complementary with respect to the first duty-cycle.

20. The apparatus of claim 1, wherein a switch of the first bank is configured to be switched simultaneously with a corresponding switch of the fourth bank and wherein a respective switch of the second bank is configured to be switched simultaneously with a corresponding switch of the third bank.

21. The apparatus of claim 1, wherein
N is a number of the series connected switches of the first bank; and
each switch of the series connected switches of the first bank is configured to be sequentially shifted by 1/N of a switching period of the frequency.

22. The apparatus of claim 1, wherein the first bank comprises two series connected switches and the second bank comprises two series connected switches;
the third bank comprises two series connected switches and the fourth bank comprises two series connected switches; and
in each of the first, second, third, and fourth banks, each switch of the two series connected switches is configured to be switched by a control signal shifted by 180 degrees with respect to a control signal of the other switch of the two series connected switches.

23. The apparatus of claim 1, wherein each switch of the first and fourth banks is switched at a first common duty-cycle, and each switch of the second and third banks is switched at a second common duty-cycle that is complementary to the first common duty-cycle.

24. The apparatus of claim 1, wherein each switch of the first, second, third, and fourth banks is configured to be switched within one period of the frequency.

25. The apparatus of claim 1, wherein the voltage inputs are configured to receive a DC voltage;
the first phase circuit further comprises first and second input terminals;
the second phase circuit further comprises third and fourth input terminals;
during a first half cycle of the AC voltage, a first high switch of the first set of switches is configured to connect a first voltage input to the first input terminal, and a second low switch of the second set of switches is configured to connect a second voltage input to the fourth input terminal, and the interphase balancing circuit is configured to connect the second input terminal to the third input terminal; and
during a second half cycle of the AC voltage, a second high switch of the second set of switches is configured to connect the first voltage input to the third input terminal, and a first low switch of the first set of switches is configured to connect the second voltage input to the second input terminal, and the interphase balancing circuit is configured to connect the fourth input terminal to the first input terminal.

26. The apparatus of claim 25, wherein
a first switch of the interphase balancing circuit is configured to follow the second high switch such that, during said second half cycle of the AC voltage, the interphase balancing circuit connects the fourth input terminal to the first input terminal; and wherein
a second switch of the interphase balancing circuit is configured to follow the first high switch such that, during said first half cycle of the AC voltage, the interphase balancing circuit connects the second input terminal to the third input terminal.

27. The apparatus of claim 1, wherein the first flying capacitor circuit comprises a plurality of capacitors, and each of the plurality of capacitors is connected between one of the series connected switches in the first bank and a corresponding one of the series connected switches in the second bank.

* * * * *